United States Patent
Mori et al.

(10) Patent No.: US 10,690,084 B2
(45) Date of Patent: Jun. 23, 2020

(54) INTERNAL COMBUSTION ENGINE WITH AN ELECTRONICALLY CONTROLLED TUMBLE CONTROL VALVE

(71) Applicant: TOYOTA JIDOSHA KABUSHIKI KAISHA, Toyota-shi, Aichi-ken (JP)

(72) Inventors: Sachio Mori, Mishima (JP); Koshiro Kimura, Susono (JP); Satoshi Tsuda, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 851 days.

(21) Appl. No.: 14/916,658

(22) PCT Filed: Sep. 3, 2014

(86) PCT No.: PCT/IB2014/001701
§ 371 (c)(1),
(2) Date: Mar. 4, 2016

(87) PCT Pub. No.: WO2015/033205
PCT Pub. Date: Mar. 12, 2015

(65) Prior Publication Data
US 2016/0208732 A1    Jul. 21, 2016

(30) Foreign Application Priority Data

Sep. 6, 2013  (JP) .................. 2013-185308
Mar. 25, 2014 (JP) .................. 2014-062292

(51) Int. Cl.
*F02P 5/00*    (2006.01)
*F02D 43/00*   (2006.01)
(Continued)

(52) U.S. Cl.
CPC .............. *F02D 43/00* (2013.01); *F02B 23/08* (2013.01); *F02B 31/06* (2013.01); *F02D 31/001* (2013.01);
(Continued)

(58) Field of Classification Search
CPC .... F02D 43/00; F02D 35/026; F02D 41/0002; F02D 41/005; F02D 41/0072;
(Continued)

(56) References Cited

U.S. PATENT DOCUMENTS 5,190,008 A * 3/1993 Yamasaki ............... F02D 37/02
                                                         123/306
5,609,132 A * 3/1997 Minowa .................. F02D 11/10
                                                         123/306
(Continued)

FOREIGN PATENT DOCUMENTS

DE  102011013481 A1   9/2012
JP  2002349335 A      12/2002
(Continued)

OTHER PUBLICATIONS

Related U.S. Appl. No. 16/037,533, filed Jul. 17, 2018, 110 pages.

*Primary Examiner* — Hung Q Nguyen
*Assistant Examiner* — Anthony Donald Taylor, Jr.
(74) *Attorney, Agent, or Firm* — Hunton Andrews Kurth LLP

(57) ABSTRACT

An internal combustion engine includes an ignition plug and an electronic control unit. The electronic control unit is configured to: (i) execute a lean-burn operation in a first operation region, (ii) execute an operation in a second operation region at an air-fuel ratio lower than an air-fuel ratio during the lean-burn operation, and (iii) control a gas flow in a cylinder so that a ratio of a change in a gas flow speed around the ignition plug during ignition to a change in
(Continued)

an engine rotation speed in a first engine rotation speed region within the first operation region is smaller than the ratio in a second engine rotation speed region within the second operation region.

11 Claims, 35 Drawing Sheets

(51) Int. Cl.
*F02D 41/00* (2006.01)
*F02D 41/14* (2006.01)
*F02B 23/08* (2006.01)
*F02B 31/06* (2006.01)
*F02D 35/02* (2006.01)
*F02D 31/00* (2006.01)
*F02P 5/04* (2006.01)
*F02P 5/145* (2006.01)
*F02D 41/18* (2006.01)
*F02B 23/10* (2006.01)
*F02B 31/00* (2006.01)
*F02B 75/12* (2006.01)

(52) U.S. Cl.
CPC ....... *F02D 35/026* (2013.01); *F02D 41/0002* (2013.01); *F02D 41/005* (2013.01); *F02D 41/0072* (2013.01); *F02D 41/1454* (2013.01); *F02P 5/045* (2013.01); *F02P 5/145* (2013.01); *F02B 2023/106* (2013.01); *F02B 2031/006* (2013.01); *F02B 2075/125* (2013.01); *F02D 41/18* (2013.01); *F02D 2041/0015* (2013.01); *Y02T 10/125* (2013.01); *Y02T 10/146* (2013.01); *Y02T 10/42* (2013.01); *Y02T 10/47* (2013.01)

(58) Field of Classification Search
CPC ................ F02D 41/1454; F02D 41/18; F02D 2041/0015; F02B 23/08; F02B 31/06; F02B 2023/106; F02B 2031/006; F02B 2075/125; F02P 5/045; F02P 5/145; Y02T 10/125; Y02T 10/146; Y02T 10/42; Y02T 10/47
USPC ...................................................... 123/406.46
See application file for complete search history.

(56) References Cited

U.S. PATENT DOCUMENTS

| | | | | |
|---|---|---|---|---|
| 5,964,200 | A | * | 10/1999 | Shimada ................ F02D 37/02 123/305 |
| 6,006,718 | A | * | 12/1999 | Ishihara ................ F02B 31/085 123/295 |
| 6,092,502 | A | * | 7/2000 | Atago .................... F02B 31/06 123/301 |
| 2001/0022169 | A1 | * | 9/2001 | Tokuyasu ............... F02B 31/06 123/301 |
| 2002/0011234 | A1 | * | 1/2002 | Yoshida ................ F02B 17/005 123/301 |
| 2002/0134346 | A1 | * | 9/2002 | Yamauchi ............ F02B 23/104 123/295 |
| 2007/0169746 | A1 | * | 7/2007 | Irisawa ................. F02D 41/008 123/431 |
| 2012/0227704 | A1 | * | 9/2012 | Omura ................ F02D 41/0002 123/306 |

FOREIGN PATENT DOCUMENTS

| | | |
|---|---|---|
| JP | 2005-171815 A | 6/2005 |
| JP | 2008-303798 A | 12/2008 |
| JP | 2012-021501 A | 2/2012 |
| JP | 5196030 B2 | 5/2013 |

* cited by examiner

ORDINARY TUMBLE FLOW PATTERN
(CENTER CROSS SECTION)

ωTUMBLE FLOW PATTERN
(CENTER CROSS SECTION)

INTAKE STROKE

COMPRESSION STROKE

INTAKE STROKE

INTERNAL COMBUSTION ENGINE WITH AN ELECTRONICALLY CONTROLLED TUMBLE CONTROL VALVE

CROSS-REFERENCE TO RELATED APPLICATIONS

This is a national phase application based on the PCT International Patent Application No. PCT/162014/001701 filed Sep. 3, 2014, claiming priority to Japanese Patent Application Nos. 2013-185308 and 2014-062292 filed Sep. 6, 2013 and Mar. 25, 2014, respectively, the entire contents of all of which are incorporated herein by reference.

BACKGROUND OF THE INVENTION

1. Field of the Invention

The invention relates to an internal combustion engine and a control method for an internal combustion engine.

2. Description of Related Art

Japanese Patent Application Publication No. 2012-021501 (JP 2012-021501 A) describes a control system for an internal combustion engine including a tumble control valve that generates a tumble flow in a cylinder. In the control system described in JP 2012-021501 A, an estimated tumble ratio is calculated on the basis of a detected value of a first air flow meter provided upstream of a throttle valve and a detected value of a second air flow meter provided just downstream of the tumble control valve. The opening degree of the tumble control valve is subjected to feedback control so that the estimated tumble ratio follows a target tumble ratio. The target tumble ratio is set to a value within an allowable control range for avoiding misfire or instable combustion.

SUMMARY OF THE INVENTION

Even when the tumble ratio (Tumble flow speed/Engine rotation speed) is controlled so as to fall within a set range, the tumble flow speed changes with a change in the engine rotation speed. In a lean-burn operation that is carried out under the condition that the concentration of fuel in air-fuel mixture is low, like an operation at an air-fuel ratio higher than a stoichiometric air-fuel ratio or an EGR operation in which air containing a large amount of EGR gas is burned, there is a possibility that it becomes difficult to attain stable ignition if a gas flow speed around an ignition plug during ignition is too high or too low.

The invention provides a technique for improving the ignitability of air-fuel mixture in a lean-burn operation that is carried out under the condition that the concentration of fuel in air-fuel mixture is low.

A first aspect of the invention provides an internal combustion engine includes an ignition plug and electronic control unit. The ignition plug ignites air-fuel mixture. The electronic control unit is configured to (i) execute lean burn operation in a first operation region, (ii) execute an operation in a second operation region at an air-fuel ratio lower than an air-fuel ratio during the lean-burn operation, and (iii) control a gas flow in a cylinder so that a ratio of a change in a gas flow speed around the ignition plug during ignition to a change in an engine rotation speed in a first engine rotation speed region within the first operation region is smaller than the ratio in a second engine rotation speed region within the second operation region.

In the internal combustion engine, the electronic control unit may be configured to change the ratio of the change in the gas flow speed around the ignition plug during ignition to a change in the engine rotation speed in the first engine rotation speed region on the basis of at least one of the air-fuel ratio in the cylinder, an ignition energy that is supplied to the ignition plug, an EGR rate and an in-cylinder temperature.

In the internal combustion engine, the electronic control unit may be configured to reduce the ratio of the change in the gas flow speed around the ignition plug during ignition to a change in the engine rotation speed in the first engine rotation speed region when the air-fuel ratio in the cylinder is high as compared to when the air-fuel ratio in the cylinder is low.

In the internal combustion engine, the electronic control unit may be configured to reduce the ratio of the change in the gas flow speed around the ignition plug during ignition to a change in the engine rotation speed in the first engine rotation speed region when the ignition energy is low as compared to when the ignition energy is high.

In the internal combustion engine, the electronic control unit may be configured to reduce the ratio of the change in the gas flow speed around the ignition plug during ignition to a change in the engine rotation speed in the first engine rotation speed region when the EGR rate is high as compared to when the EGR rate is low.

In the internal combustion engine, the electronic control unit may be configured to reduce the ratio of the change in the gas flow speed around the ignition plug during ignition to a change in the engine rotation speed in the first engine rotation speed region when the in-cylinder temperature is low as compared to when the in-cylinder temperature is high.

In the internal combustion engine, the electronic control unit may be configured to reduce the gas flow speed around the ignition plug during ignition as the air-fuel ratio in the cylinder increases.

In the internal combustion engine, the electronic control unit may be configured to reduce the gas flow speed around the ignition plug during ignition as the ignition energy decreases.

In the internal combustion engine, the electronic control unit may be configured to reduce the gas flow speed around the ignition plug during ignition as the EGR rate increases.

In the internal combustion engine, the electronic control unit may be configured to reduce the gas flow speed around the ignition plug during ignition as the in-cylinder temperature decreases.

A second aspect of the invention provides an internal combustion engine includes an ignition plug and an electronic control unit. The ignition plug ignites air-fuel mixture. The electronic control unit is configured to, in a rotation speed region that is at least part of a lean-burn operation region, control a gas flow in a cylinder so that a gas flow speed around the ignition plug during ignition falls within a flow speed range, the flow speed range being determined on the basis of at least one of an air-fuel ratio in the cylinder, an ignition energy that is supplied to the ignition plug, an EGR rate and an in-cylinder temperature.

In the internal combustion engine, the flow speed range when the air-fuel ratio in the cylinder is high may be narrower than the flow speed range when the air-fuel ratio in the cylinder is low.

In the internal combustion engine, the flow speed range when the ignition energy is low may be narrower than the flow speed range when the ignition energy is high.

In the internal combustion engine, the flow speed range when the EGR rate is high may be narrower than the flow speed range when the EGR rate is low.

In the internal combustion engine, the flow speed range when the in-cylinder temperature is low may be narrower than the flow speed range when the in-cylinder temperature is high.

In the internal combustion engine, the flow speed range may be shrunk so that a variation in the flow speed range at a high flow speed side increases with respect to a variation in the flow speed range at a low flow speed side as the air-fuel ratio in the cylinder increases.

In the internal combustion engine, the flow speed range may be shrunk so that a variation in the flow speed range at a high flow speed side increases with respect to a variation in the flow speed range at a low flow speed side as the ignition energy decreases.

In the internal combustion engine, the flow speed range may be shrunk so that a variation in the flow speed range at a high flow speed side increases with respect to a variation in the flow speed range at a low flow speed side as the EGR rate increases.

In the internal combustion engine, the flow speed range may be shrunk so that a variation in the flow speed range at a high flow speed side increases with respect to a variation in the flow speed range at a low flow speed side as the in-cylinder temperature decreases.

A third aspect of the invention provides an internal combustion engine includes an ignition plug and an electronic control unit. The ignition plug ignites air-fuel mixture. The electronic control unit is configured to, in a rotation speed region that is at least part of a lean-burn operation region, control a gas flow in a cylinder so that a gas flow speed around the ignition plug during ignition decreases as an engine state changes, the engine state include at least one of: (i) increase of an air-fuel ratio in the cylinder, (ii) decrease of an ignition energy that is supplied to the ignition plug, (iii) increase of an EGR rate, and (vi) decrease of an in-cylinder temperature.

A fourth aspect of the invention provides a control method for an internal combustion engine including an ignition plug and an electronic control unit. The control method includes executing, by the electronic control unit, a lean-burn operation in a first operation region, executing, by the electronic control unit, an operation in a second operation region at an air-fuel ratio lower than an air-fuel ratio during the lean-burn operation, and controlling, by the electronic control unit, a gas flow in a cylinder so that a ratio of a change in a gas flow speed around the ignition plug during ignition to a change in an engine rotation speed in a first engine rotation speed region within the first operation region is smaller than the ratio in a second engine rotation speed region within the second operation region.

A fifth aspect of the invention provides a control method for an internal combustion engine including an ignition plug and an electronic control unit. The control method includes, in a rotation speed region that is at least part of a lean-burn operation region, controlling, by the electronic control unit, a gas flow in a cylinder so that a gas flow speed around the ignition plug during ignition falls within a flow speed range, the flow speed range being determined on the basis of at least one of an air-fuel ratio in the cylinder, an ignition energy that is supplied to the ignition plug, an EGR rate and an in-cylinder temperature.

A sixth aspect of the invention provides a control method for an internal combustion engine including an ignition plug and an electronic control unit. The control method includes, in a rotation speed region that is at least part of a lean-burn operation region, controlling, by the electronic control unit, a gas flow in a cylinder so that a gas flow speed around the ignition plug during ignition decreases as an air-fuel ratio in the cylinder increases, as an ignition energy that is supplied to the ignition plug decreases, as an EGR rate increases, or as an in-cylinder temperature decreases.

With the above configuration, in comparison with a case where the gas flow in the cylinder is not controlled, it is possible to make it easy to cause the gas flow speed around the ignition plug during ignition to fall within the range suitable for ignition in the first engine rotation speed region within the first operation region in which the lean-burn operation is carried out. Therefore, it is possible to provide the internal combustion engine that contributes to improvement in ignitability of air-fuel mixture in the lean-burn operation that is carried out under the condition that the concentration of fuel in air-fuel mixture is low.

With the above configuration, by focusing on the fact that the gas flow speed that ensures high ignitability has such a characteristic that the gas flow speed changes on the basis of the air-fuel ratio in the cylinder, the ignition energy, the EGR rate and the in-cylinder temperature, it is possible to appropriately control the gas flow speed around the ignition plug during ignition in response to changes in these parameters.

With the above configuration, it is possible to appropriately control the gas flow speed around the ignition plug during ignition in response to a change in the air-fuel ratio in the cylinder.

With the above configuration, it is possible to appropriately control the gas flow speed around the ignition plug during ignition in response to a change in the ignition energy.

With the above configuration, it is possible to appropriately control the gas flow speed around the ignition plug during ignition in response to a change in the EGR rate.

With the above configuration, it is possible to appropriately control the gas flow speed around the ignition plug during ignition in response to a change in the in-cylinder temperature.

With the above configuration, by focusing on the fact that an optimal value of the gas flow speed around the ignition plug during ignition for ensuring ignitability has such a characteristic that the optimal value changes toward a low flow speed side as the air-fuel ratio in the cylinder increases, it is possible to further appropriately control the gas flow speed around the ignition plug during ignition in response to a change in the air-fuel ratio in the cylinder.

With the above configuration, by focusing on the fact that an optimal value of the gas flow speed around the ignition plug during ignition for ensuring ignitability has such a characteristic that the optimal value changes toward a low flow speed side as the ignition energy decreases, it is possible to further appropriately control the gas flow speed around the ignition plug during ignition in response to a change in the ignition energy.

With the above configuration, by focusing on the fact that an optimal value of the gas flow speed around the ignition plug during ignition for ensuring ignitability has such a characteristic that the optimal value changes toward a low flow speed side as the EGR rate increases, it is possible to further appropriately control the gas flow speed around the ignition plug during ignition in response to a change in the EGR rate.

With the above configuration, by focusing on the fact that an optimal value of the gas flow speed around the ignition plug during ignition for ensuring ignitability has such a characteristic that the optimal value changes toward a low flow speed side as the in-cylinder temperature decreases, it is possible to further appropriately control the gas flow speed around the ignition plug during ignition in response to a change in the in-cylinder temperature.

With the above configuration, by focusing on the fact that the range of the gas flow speed that ensures high ignitability has such a characteristic that the range changes on the basis of the air-fuel ratio in the cylinder, the ignition energy, the EGR rate and the in-cylinder temperature, it is possible to appropriately control the gas flow speed around the ignition plug during ignition in response to changes in these parameters. Therefore, it is possible to provide the internal combustion engine that contributes to improvement in ignitability of air-fuel mixture in the lean-burn operation that is carried out under the condition that the concentration of fuel in air-fuel mixture is low.

With the above configuration, it is possible to appropriately set the range of the gas flow speed around the ignition plug during ignition in response to a change in the air-fuel ratio in the cylinder.

With the above configuration, it is possible to appropriately set the range of the gas flow speed around the ignition plug during ignition in response to a change in the ignition energy.

With the above configuration, it is possible to appropriately set the range of the gas flow speed around the ignition plug during ignition in response to a change in the EGR rate.

With the above configuration, it is possible to appropriately set the range of the gas flow speed around the ignition plug during ignition in response to a change in the in-cylinder temperature.

With the above configuration, it is possible to further appropriately control the gas flow speed around the ignition plug during ignition in response to a change in the air-fuel ratio in the cylinder while further accurately acquiring the relationship between the air-fuel ratio in the cylinder and the range of the gas flow speed around the ignition plug that ensures high ignitability.

With the above configuration, it is possible to further appropriately control the gas flow speed around the ignition plug during ignition in response to a change in the ignition energy while further accurately acquiring the relationship between the ignition energy and the range of the gas flow speed around the ignition plug that ensures high ignitability.

With the above configuration, it is possible to further appropriately control the gas flow speed around the ignition plug during ignition in response to a change in the EGR rate while further accurately acquiring the relationship between the EGR rate and the range of the gas flow speed around the ignition plug that ensures high ignitability.

With the above configuration, it is possible to further appropriately control the gas flow speed around the ignition plug during ignition in response to a change in the in-cylinder temperature while further accurately acquiring the relationship between the in-cylinder temperature and the range of the gas flow speed around the ignition plug that ensures high ignitability.

With the above configuration, by focusing on the fact that an optimal value of the gas flow speed around the ignition plug during ignition for ensuring high ignitability has such a characteristic that the optimal value changes toward a low flow speed side as the air-fuel ratio in the cylinder increases, as the ignition energy decreases, as the EGR rate increases, or as the in-cylinder temperature decreases, it is possible to appropriately control the gas flow speed around the ignition plug during ignition in response to a change in the air-fuel ratio in the cylinder, a change in the ignition energy, a change in the EGR rate, or a change in the in-cylinder temperature. Therefore, it is possible to provide the internal combustion engine that contributes to improvement in ignitability of air-fuel mixture in the lean-burn operation that is carried out under the condition that the concentration of fuel in air-fuel mixture is low.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
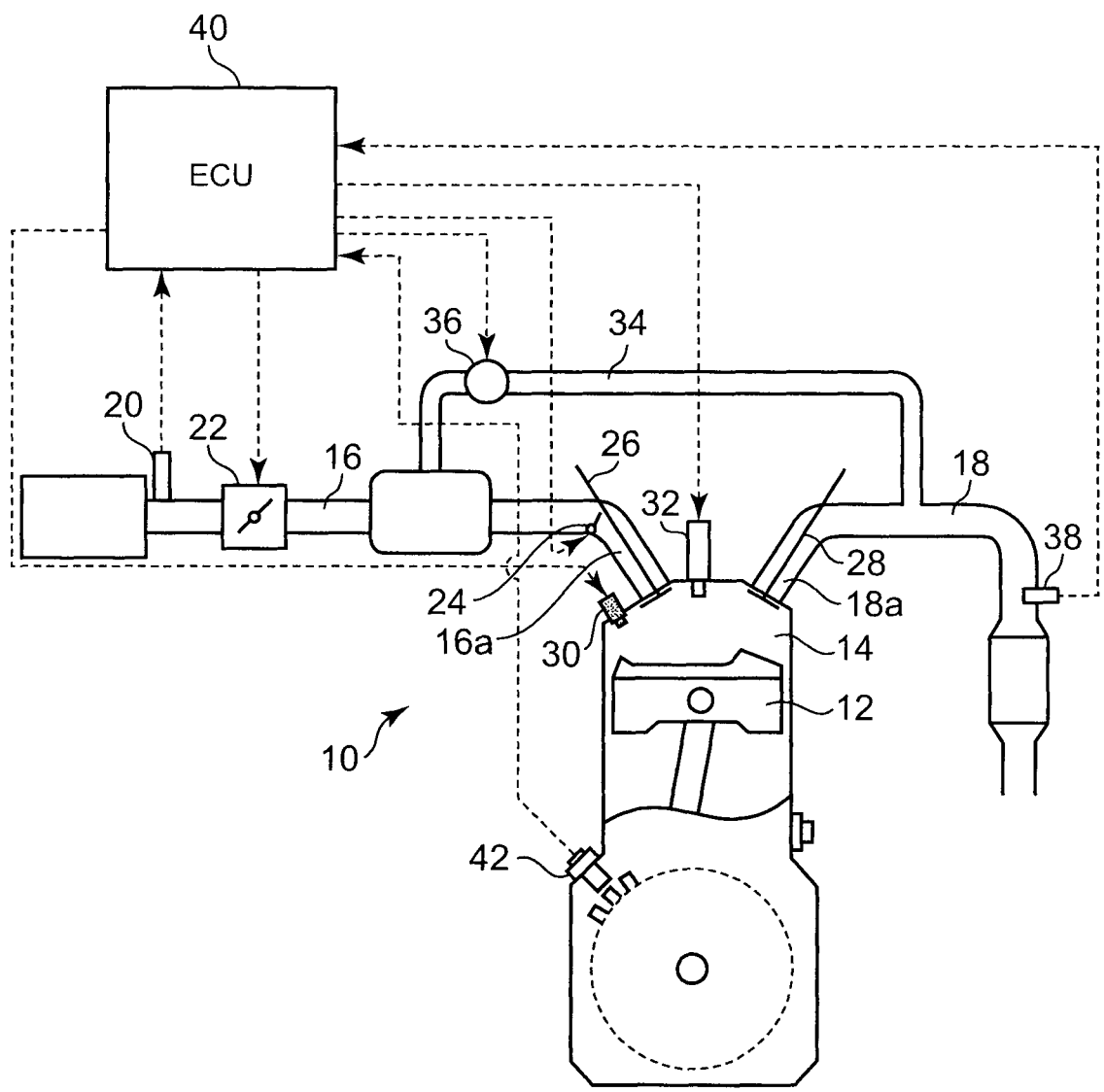
FIG. 1 is a schematic view for illustrating the system configuration of an internal combustion engine according to a first embodiment of the invention.

A first embodiment of the invention will be described with reference to the accompanying drawings. FIG. 1 is a schematic view for illustrating the system configuration of an internal combustion engine 10 according to the first embodiment. The system according to the present embodiment includes the spark ignition internal combustion engine 10. A piston 12 is provided in each cylinder of the internal combustion engine 10. A combustion chamber 14 is formed on the top side of the piston 12 in each cylinder. An intake passage 16 and an exhaust passage 18 communicate with each combustion chamber 14.

An air flow meter 20 is provided near an inlet of the intake passage 16. The air flow meter 20 outputs a signal corresponding to the flow rate of air that is taken into the intake passage 16. An electronically controlled throttle valve 22 is provided downstream of the air flow meter 20. An electronically controlled tumble control valve (TCV) 24 is provided in each of portions of the intake passage 16, which are branched off toward the corresponding cylinders. Each TCV 24 generates a tumble flow (longitudinal vortex flow) in the corresponding cylinder by biasing the flow of intake air in a corresponding one of pairs of intake ports 16a. That is, each TCV 24 is an actuator that influences a gas flow in the corresponding cylinder. By changing the opening degree of the TCV 24, it is possible to adjust the tumble ratio (Tumble flow angular velocity/Engine rotation speed) of a tumble flow.

Figure 35:
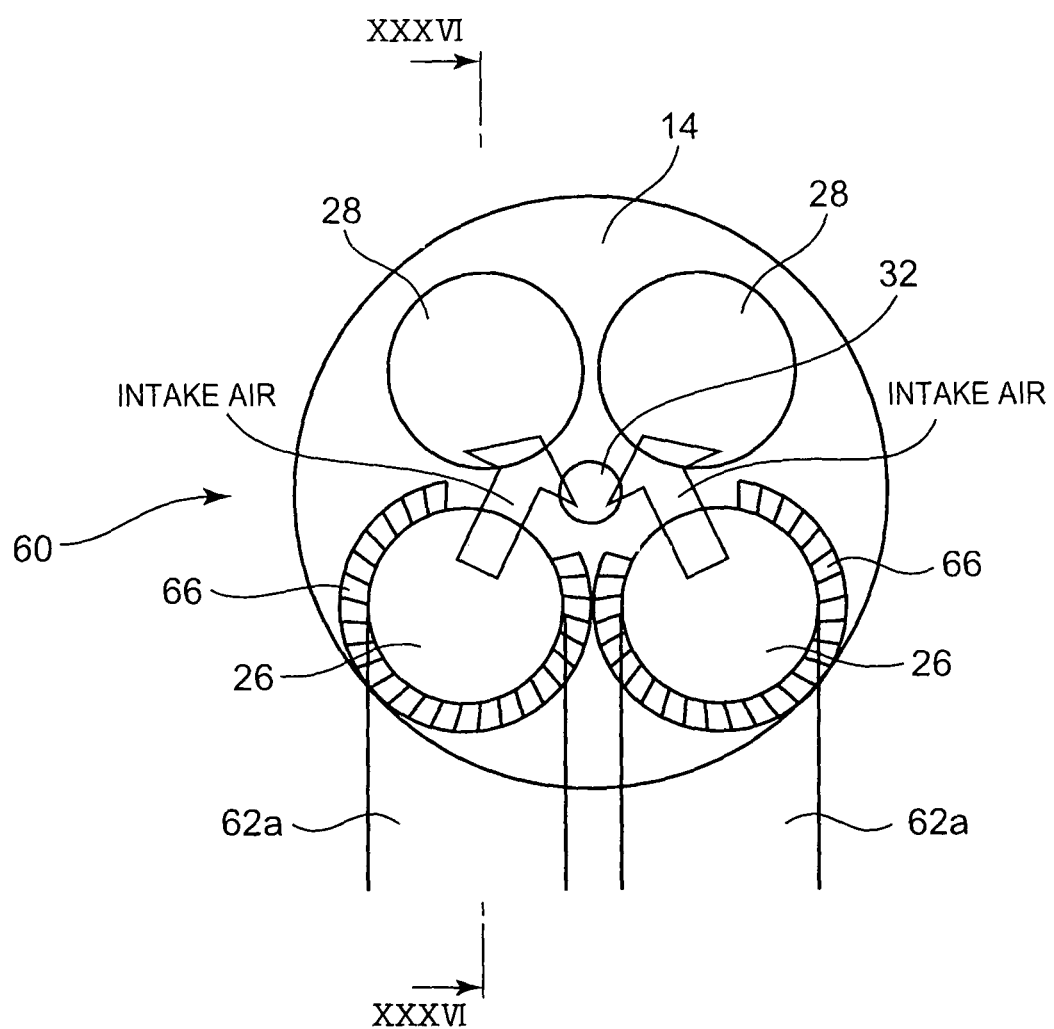
FIG. 35 is a view for illustrating the detailed configuration of each protruded portion shown in FIG. 34.
Figure 39:
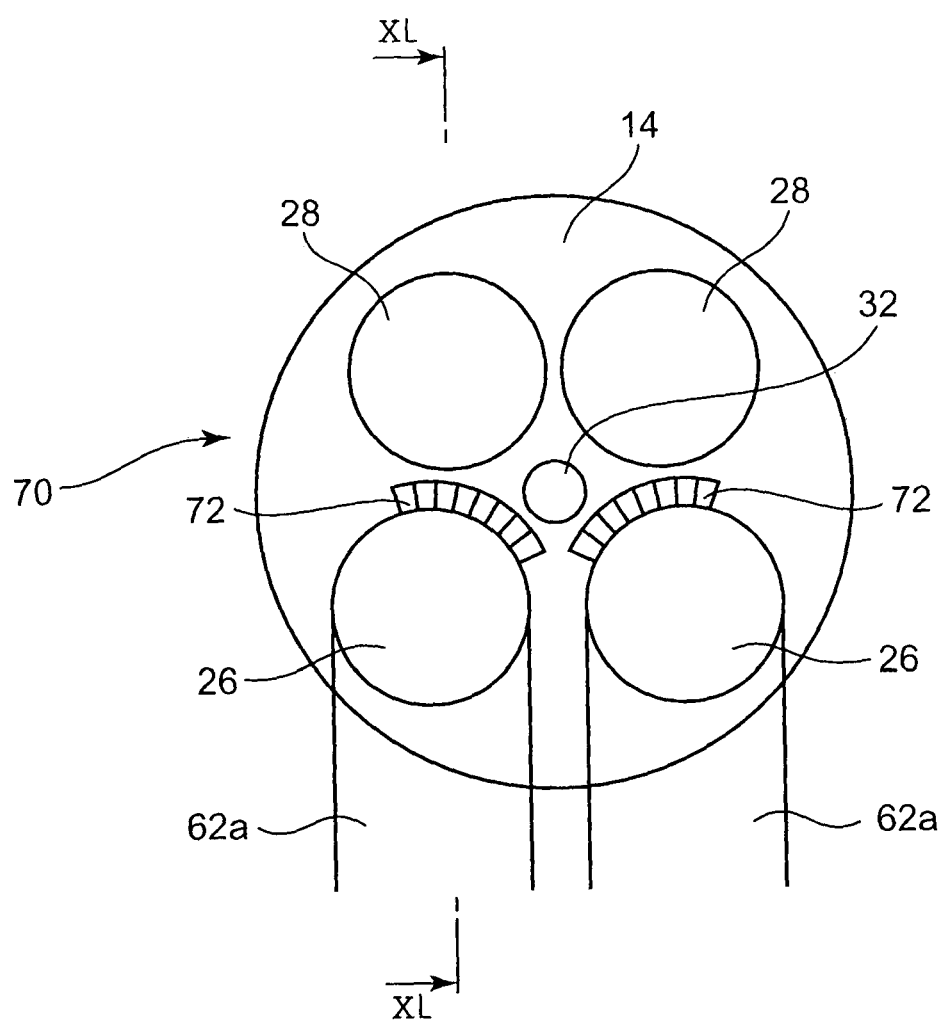
FIG. 39 is a schematic view for illustrating the detailed configuration of each protruded portion provided in an internal combustion engine according to a seventh embodiment of the invention.

An intake valve 26 is provided at each intake port 16a of the intake passage 16. Each intake valve 26 opens or closes the corresponding intake port 16a. An exhaust valve 28 is provided at each exhaust port 18a of the exhaust passage 18. Each exhaust valve 28 opens or closes the corresponding exhaust port 18a. A fuel injection valve 30 is provided in each cylinder of the internal combustion engine 10. Each fuel injection valve 30 is used to directly inject fuel into the corresponding cylinder. An ignition plug 32 of an ignition device (not shown) is further provided in each cylinder. Each ignition plug 32 of the ignition device is used to ignite air-fuel mixture. More specifically, each ignition plug 32 is arranged near the center of an upper wall surface (that is, a cylinder head-side wall surface) of the corresponding combustion chamber 14. As shown in FIG. 35, FIG. 39, and the like (described later), the two intake valves 26 are provided side by side in each cylinder, and the two exhaust valves 28 are provided side by side across (the corresponding ignition plug 32) from the intake valves 26.

The internal combustion engine 10 includes an EGR passage 34 that connects the intake passage 16 to the exhaust passage 18. An EGR valve 36 is arranged in the middle of the EGR passage 34. The EGR valve 36 is used to adjust the amount of EGR gas (external EGR gas) that is circulated to the intake passage 16 via the EGR passage 34. The flow rate of exhaust gas (EGR gas) flowing through the EGR passage 34 is changed by changing the opening degree of the EGR valve 36. Thus, it is possible to adjust the EGR rate. An air-fuel ratio sensor 38 is arranged in the exhaust passage 18. The air-fuel ratio sensor 38 is used to detect the air-fuel ratio of exhaust gas.

The system shown in FIG. 1 includes an electronic control unit (ECU) 40. Not only the above-described air flow meter 20 and air-fuel ratio sensor 38 but also various sensors for detecting the operating states of the internal combustion engine 10 are connected to an input port of the ECU 40. The various sensors include a crank angle sensor 42, and the like. The crank angle sensor 42 is used to detect an engine rotation speed. Various actuators for controlling the operation of the internal combustion engine 10 are connected to an output port of the ECU 40. The various actuators include the above-described throttle valve 22, TCVs 24, fuel injection valves 30, ignition plugs 32, EGR valve 36, and the like. The ECU 40 executes not only predetermined engine control, such as fuel injection control and ignition control, but also control over a gas flow in each cylinder (described later) by operating the various actuators in accordance with the above-described various sensors and a predetermined program.

Figure 2:
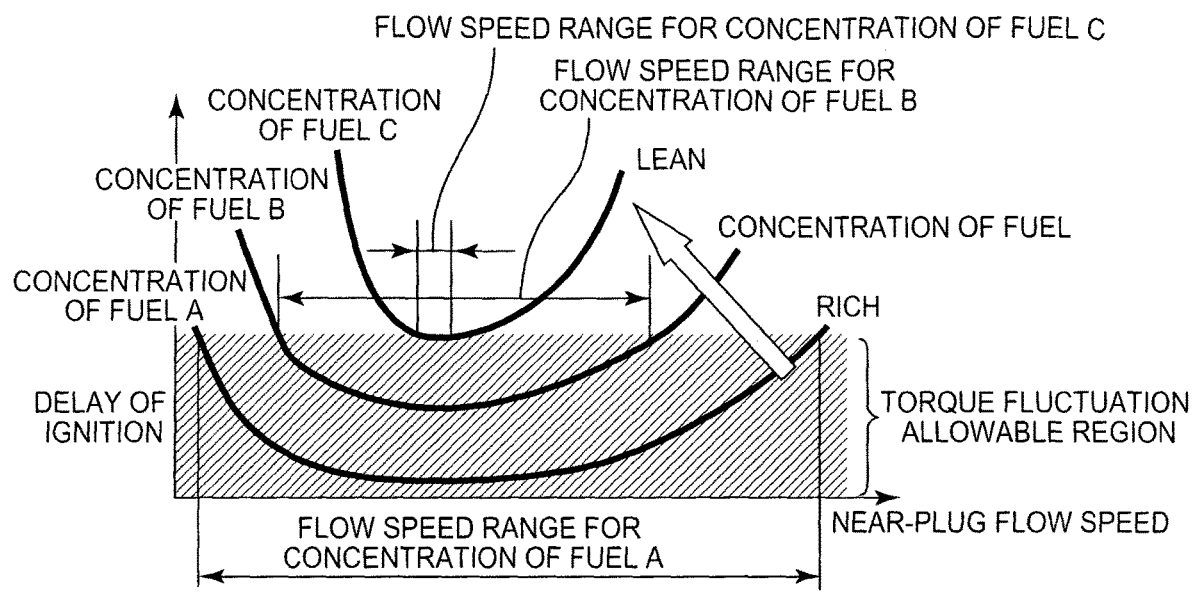
FIG. 2 is a graph that shows the relationship among a delay of ignition of air-fuel mixture, a gas flow speed around an ignition plug and a concentration of fuel in air-fuel mixture.

The necessity of control over a gas flow speed around each ignition plug during ignition in lean-burn operation will be described. FIG. 2 is a graph that shows the relationship among a delay of ignition of air-fuel mixture, a gas flow speed around the ignition plug 32 and a concentration of fuel in air-fuel mixture. An operation region of the internal combustion engine 10 includes a lean-burn operation region in which the concentration of fuel in air-fuel mixture is low, that is, the ratio of fuel to air (including EGR gas when EGR gas is introduced) is small. In this way, when a high or low concentration of fuel in air-fuel mixture is described in this specification, not only air but also EGR gas is assumed to be included. More specifically, the lean-burn operation is carried out under the condition that the concentration of fuel in air-fuel mixture is lower than that of a reference condition because the amount of air or the amount of EGR gas in the lean-burn operation is larger than that of the reference condition. The reference condition is that the internal combustion engine 10 is operated at an EGR rate of zero and a stoichiometric air-fuel ratio. In other words, the lean-burn operation is carried out under the condition that the concentration of fuel in air-fuel mixture is lower than or equal to a predetermined value, that is, the condition that there is a concern about deterioration of ignitability (delay of ignition) of air-fuel mixture. The lean-burn operation region is identified by an engine rotation speed and an engine load.

Thus, the lean-burn operation in this specification includes not only an operation that is carried out at an air-fuel ratio higher than the stoichiometric air-fuel ratio (that is, an operation that is carried out at a concentration of fuel reduced by increasing the ratio of the amount of air to the amount of fuel) but also an operation that is carried out at a high EGR rate resulting from introduction of a large amount of EGR gas (that is, an operation that is carried out at a concentration of fuel reduced by increasing the ratio of the amount of EGR gas to the amount of fuel). Such an operation at a high EGR rate may include an operation that is carried out at an air-fuel ratio near the stoichiometric air-fuel ratio.

In the lean-burn operation that achieves high thermal efficiency, it is important to reduce NOx emitted from the internal combustion engine 10 by reducing the concentration of fuel in air-fuel mixture in each cylinder. However, during lean-burn operation, particularly, during homogeneous lean-burn combustion that is carried out by homogeneously forming lean air-fuel mixture in the cylinder like the internal combustion engine 10 according to the present embodiment, an excessively lean concentration of fuel becomes a factor that leads to instable combustion.

As shown in FIG. 2, during lean-burn operation, a delay of ignition of air-fuel mixture extends as the concentration of fuel reduces. As a delay of ignition extends, torque fluctuations of the internal combustion engine 10 increase. A delay of ignition changes with a gas flow speed around the ignition plug 32 (hereinafter, referred to as "near-plug flow speed") during ignition (during a discharge period of the ignition plug 32). Thus, in order to obtain stable combustion by causing a delay of ignition to fall within the range in which torque fluctuations become an allowable level, it is required to cause the near-plug flow speed during ignition to fall within a set range. For this, a predetermined flow speed range of the near-plug flow speed narrows as the concentration of fuel becomes leaner as shown in FIG. 2.

Figure 3:
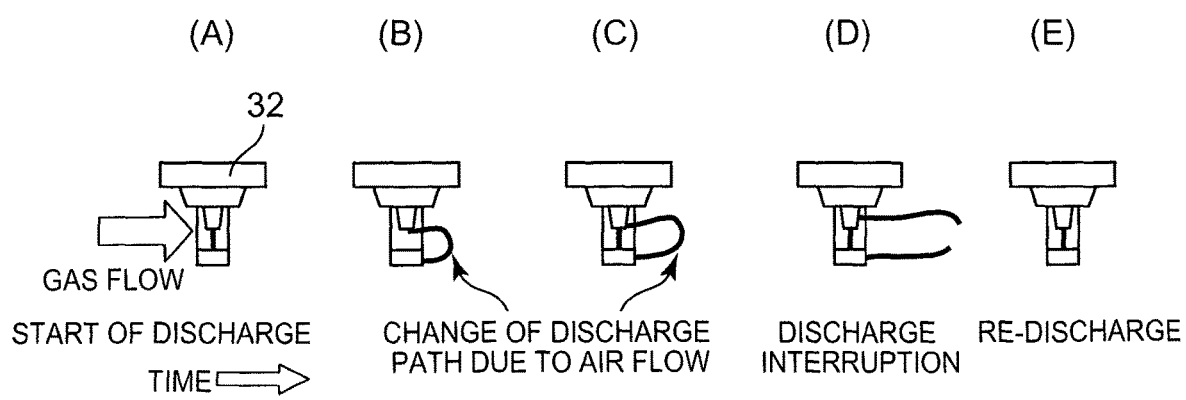
FIG. 3 is a view that shows the behavior of discharge spark during a discharge period in time sequence in the case of occurrence of discharge interruption.

Between a delay of ignition and a near-plug flow speed, there is a relationship that a delay of ignition extends as the near-plug flow speed changes toward a high flow speed side or a low flow speed side with respect to a certain flow speed value (optimal value). Next, the reason why a delay of ignition extends at a high flow speed side or a low flow speed side will be described with reference to FIG. 3. FIG. 3 is a view that shows the behavior of discharge spark during a discharge period in time sequence in the case of occurrence of discharge interruption.

After discharge is started as shown in FIG. 3(A), electric spark generated at a plug gap is carried as shown in FIG. 3(B) and FIG. 3(C) by a gas flow around the ignition plug 32. Thus, a discharge path length extends. When discharge occurs, gas in the path of discharge spark is ionized, so electric resistance decreases. However, if the discharge path becomes too long because of a high near-plug flow speed, an electric resistance value in the discharge path becomes larger than an electric resistance value at a minimum distance of the plug gap, so discharge interruption occurs as shown in FIG. 3(D). When discharge interruption has occurred, re-discharge is immediately carried out at the minimum distance of the plug gap as shown in FIG. 3(E).

Initially, the reason why ignitability deteriorates at a high flow speed side will be described. At a concentration of fuel near a lean limit, a certain time is required until air-fuel mixture ignites (chemical reaction starts). As the near-plug flow speed increases, a time to discharge interruption shortens, so a time is insufficient until the same air-fuel mixture at a certain position is heated by electric spark to ignite. As a result, ignitability deteriorates.

Next, the reason why ignitability deteriorates at a low flow speed side will be described. An energy of electric spark per unit length through discharge depends on the characteristics of an ignition coil, and is constant irrespective of the discharge path length. Therefore, as the discharge path extends by air flow, or the like, an energy supplied to the whole air-fuel mixture increases, and the volume of air-fuel mixture to be heated also increases. However, as the near-plug flow speed decreases, the discharge path is difficult to extend, so an increase in the supplied energy or an increase in the volume of air-fuel mixture does not occur. As a result, ignitability deteriorates.

Figure 4:
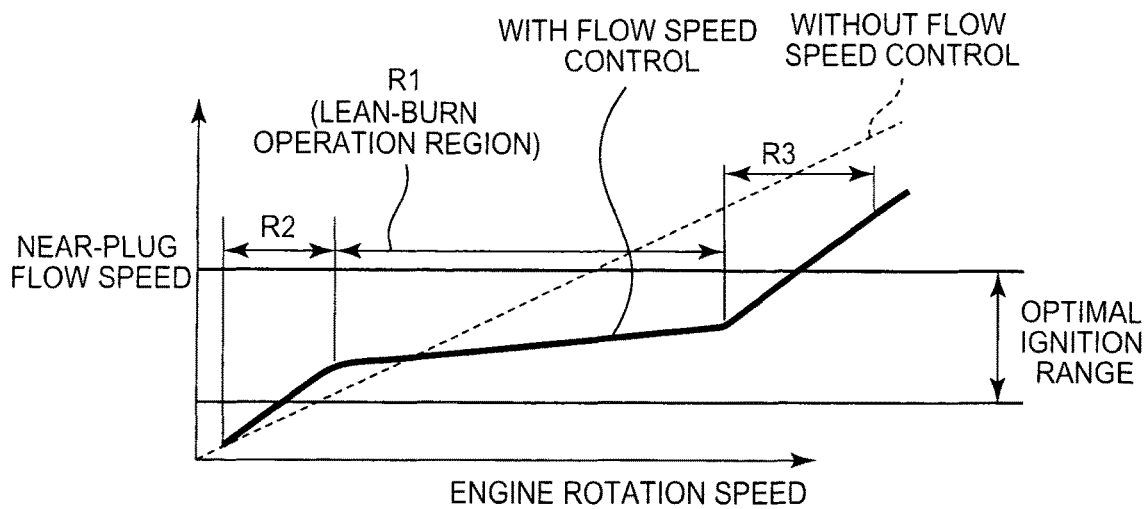
FIG. 4 is a graph for illustrating characteristic control over a near-plug flow speed during ignition according to the first embodiment of the invention.

FIG. 4 is a graph for illustrating characteristic control over the near-plug flow speed during ignition according to the first embodiment of the invention, and is a graph that shows the near-plug flow speed-engine rotation speed characteristic. The flow speed of gas flowing into each cylinder is directly proportional to the engine rotation speed. Thus, when no control is executed over the near-plug flow speed during ignition, the near-plug flow speed monotonously increases in proportion to the engine rotation speed as indicated by the dashed line in FIG. 4.

In contrast, in the internal combustion engine 10 according to the present embodiment, as indicated by the continuous line in FIG. 4, a gas flow in each cylinder is controlled so that the ratio of a change in the near-plug flow speed (the gas flow speed around each ignition plug 32) during ignition to a change in the engine rotation speed in a first engine rotation speed region R1 is smaller than that in second engine rotation speed regions R2, R3. Here, the first engine rotation speed region R1 is an engine rotation speed region in a first operation region in which the lean-burn operation is carried out. The second engine rotation speed regions R2, R3 each are an engine rotation speed region in a second operation region in which an operation at an air-fuel ratio lower than that during the lean-burn operation is carried out. In the example shown in FIG. 4, both the second engine rotation speed regions R2, R3 are continuous with the first engine rotation speed region R1. In other words, the first operation region including the first engine rotation speed region R1 is a region in which there is a concern about deterioration of ignitability as compared to the second operation region including the second engine rotation speed regions R2, R3 because air-fuel mixture having a low (lean) concentration of fuel as compared to the second operation region is used (air-fuel mixture around each ignition plug 32 during ignition becomes lean).

A region in which the lean-burn operation that uses air-fuel mixture having a low concentration of fuel is carried out because the air-fuel ratio is leaner than that in the second operation region or a region in which the lean-burn operation that uses air-fuel mixture having a low concentration of fuel is carried out because the EGR rate is higher than that in the second operation region corresponds to the first operation region. Specifically, for example, the first operation region is a lean-burn operation region in which the air-fuel ratio is higher than the stoichiometric air-fuel ratio, and the second operation region is a stoichiometric air-fuel ratio operation region. In stoichiometric air-fuel ratio operation, stable ignition is possible without highly accurately controlling the near-plug flow speed during ignition unlike the lean-burn operation. Other than such an example, for example, the first operation region is an EGR operation region in which EGR gas is introduced, and the second operation region is a non-EGR operation region in which EGR gas is not introduced. The second operation region may be a region in which the lean-burn operation is carried out as long as it is a region in which air-fuel mixture having a concentration of fuel higher than that in the first operation region is used. That is, the first operation region and the second operation region each are a region in which the lean-burn operation is carried out at an air-fuel ratio higher than the stoichiometric air-fuel ratio, and, among others, the first operation region is a region in which the lean-burn operation is operated at the highest air-fuel ratio (or within the highest air-fuel ratio range) and it is the most difficult to ensure ignitability. Alternatively, the first operation region and the second operation region each are a region in which the lean-burn operation is carried out at a lean concentration of fuel due to introduction of EGR gas and, among others, the first operation region is a region in which the lean-burn operation is operated by using the highest EGR rate (or the highest EGR rate range) and it is the most difficult to ensure ignitability. In this way, the first operation region may be the whole of the operation region in which the internal combustion engine 10 carries out the lean-burn operation or may be part of the operation region. The first engine rotation speed region R1 itself may also be the whole or part of the engine rotation speed region included in the first operation region.

The first engine rotation speed region R1 may be a region determined in advance as a rotation speed region in which the lean-burn operation is carried out. The first engine rotation speed region R1 may such that the position of the region R1 or the width of the region R1 within the first operation region is changed as needed during operation. In addition, the second engine rotation speed region R2 is not limited to the whole of the region lower in rotation speed than the first engine rotation speed region R1, and the second engine rotation speed region R3 is not limited to the whole of the region higher in rotation speed than the first engine rotation speed region R1, as shown in FIG. 4. That is, when there is further a region lower in rotation speed than the second engine rotation speed region R2 or a region higher in rotation speed than the second engine rotation speed region R3, the ratio of a change in the near-plug flow speed to a change in the engine rotation speed within the first engine rotation speed region R1 just needs to be controlled so as to be at least smaller than the ratio in the second engine rotation speed region R2 or the second engine rotation speed region R3. Furthermore, as long as the ratio of a change in the near-plug flow speed to a change in the engine rotation speed within the first engine rotation speed region R1 is controlled so as to be smaller than the ratio in the second engine rotation speed region R2 or the second engine rotation speed region R3, the characteristic may be such that the near-plug flow speed decreases with an increase in the engine rotation speed within the region R1.

The flow speed range shown in FIG. 4 is an optimal flow speed range (optimal ignition range) in which it is possible to avoid the inconvenience regarding the ignitability of air-fuel mixture during lean-burn operation, described above with reference to FIG. 2 and FIG. 3. The optimal ignition range is obtained in consideration of variations in ignition among cycles. In the near-plug flow speed-engine rotation speed characteristic indicated by the dashed line, it is not possible to cause the entire near-plug flow speed during ignition in the first engine rotation speed region R1 to fall within the above-described flow speed range. In contrast, in the internal combustion engine 10 according to the present embodiment, the near-plug flow speed is controlled so that the near-plug flow speed-engine rotation speed characteristic indicated by the continuous line is obtained. Therefore, in the first engine rotation speed region R1, it is possible to cause the near-plug flow speed during ignition to fall within the above-described flow speed range.

Figure 5:
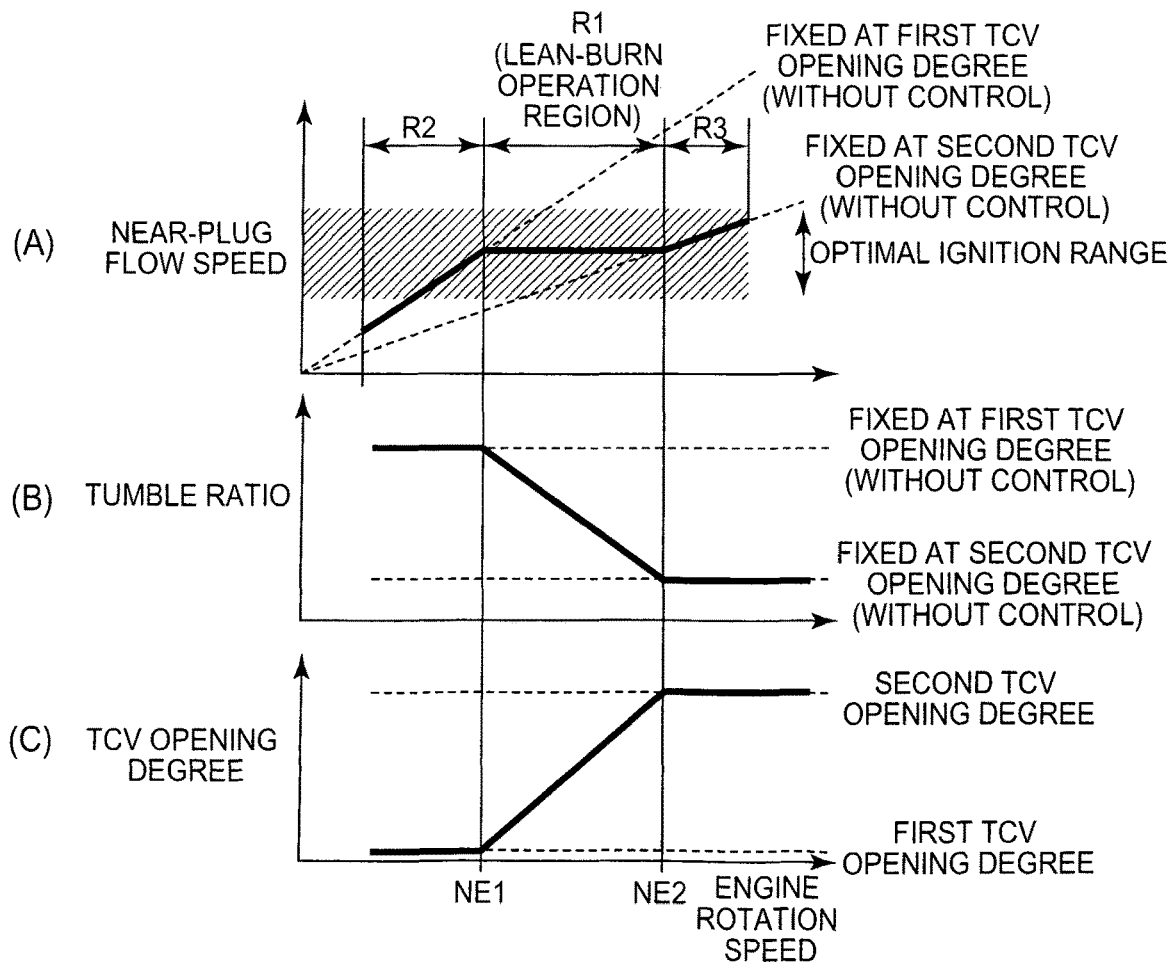
FIG. 5 shows graphs for illustrating a method of controlling the near-plug flow speed during ignition through control over a tumble ratio with a TCV.

Next, a specific example of control according to the first embodiment will be described. FIG. 5 shows graphs for illustrating a method of controlling the near-plug flow speed during ignition through control over the tumble ratio with each TCV 24.

In the method shown in FIG. 5, by changing the opening degree of each TCV 24 within the range from a first TCV opening degree to a second TCV opening degree with a change in the engine rotation speed, a change in the near-plug flow speed during ignition is suppressed against a change in the engine rotation speed within the first engine rotation speed region R1 in order to cause the near-plug flow speed during ignition in the first engine rotation speed region R1 to fall within the optimal ignition range.

In the control example shown in FIG. 5, the near-plug flow speed falls within the optimal ignition range at a first engine rotation speed NE1 that is a low speed-side boundary of the first engine rotation speed region R1. However, as indicated by the dashed line in FIG. 5(A), if the TCV opening degree remains fixed at the first TCV opening degree, the near-plug flow speed falls outside the optimal ignition range as a result of an increase in the gas flow speed with an increase in the engine rotation speed. Therefore, as shown in FIG. 5(B), in this case, the tumble ratio is reduced by increasing the TCV opening degree within the first engine rotation speed region R1. More specifically, in the control example shown in FIG. 5, in order to keep the near-plug flow speed during ignition constant in the first engine rotation speed region R1, the TCV opening degree is continuously increased from the first TCV opening degree toward the second TCV opening degree with an increase in the engine rotation speed. The second TCV opening degree is a TCV opening degree at which the near-plug flow speed equivalent to that at the first engine rotation speed NE1 is obtained at the second engine rotation speed NE2 that is the other boundary.

As described above, by controlling the tumble ratio with a change in the engine rotation speed through control over each TCV 24, it is possible to control a gas flow in the corresponding cylinder so that the ratio of a change in the near-plug flow speed during ignition to a change in the engine rotation speed within the first engine rotation speed region R1 is smaller than the ratio within the second engine rotation speed region R2 or the second engine rotation speed region R3. In the first engine rotation speed region R1, the lean-burn operation is carried out.

The example in which the TCV opening degree is controlled in order to reduce the tumble ratio in the first engine rotation speed region R1 is described with reference to FIG. 5. However, control over the tumble ratio for keeping the near-plug flow speed during ignition in the first engine rotation speed region R1 within the optimal ignition range is not limited to the above-described mode. That is, if the near-plug flow speed at the first engine rotation speed NE1 becomes lower than the optimal ignition range, the tumble ratio may be increased by reducing the TCV opening degree so that the near-plug flow speed in the first engine rotation speed region R1 falls within the optimal ignition range.

Figure 6A:
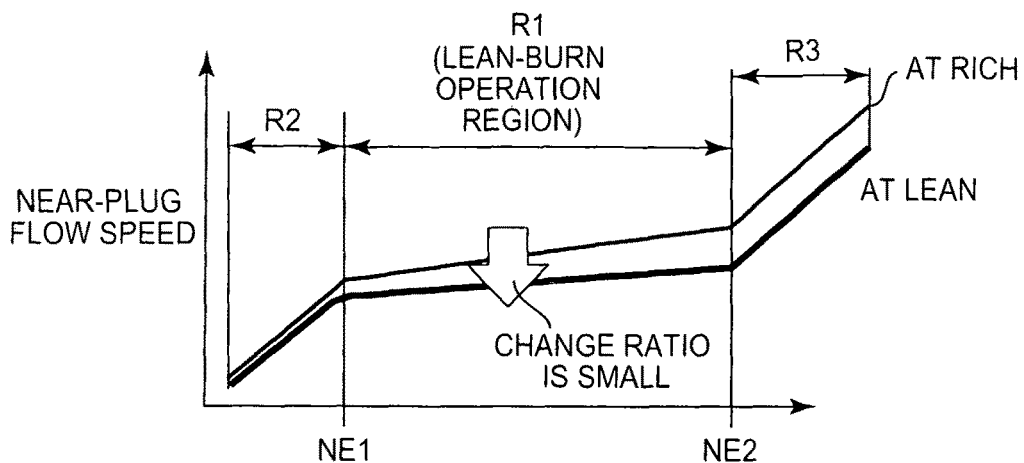
FIG. 6A to FIG. 6C are graphs for illustrating characteristic control over the near-plug flow speed during ignition in consideration of a change in air-fuel ratio in each cylinder.
Figure 6B:
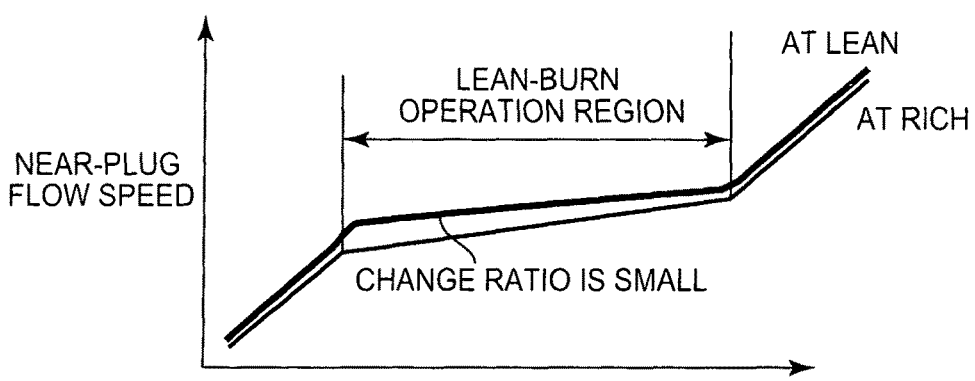
Figure 6C:
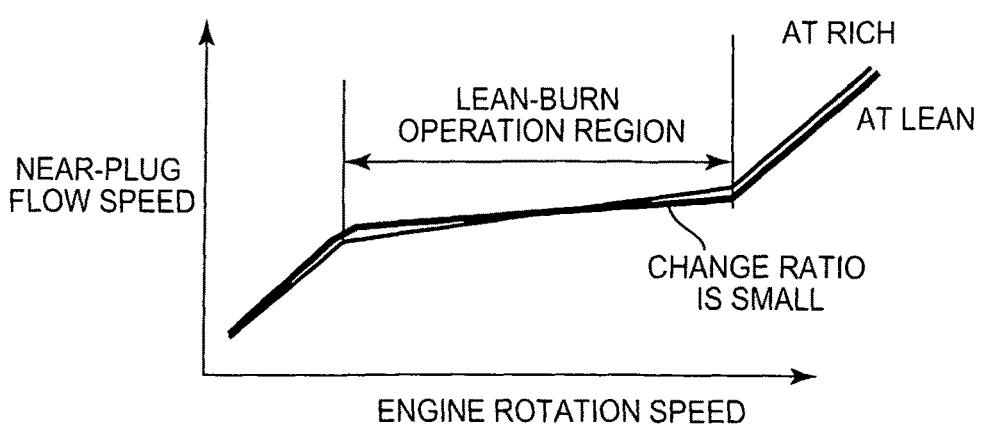

FIG. 6A to FIG. 6C are graphs for illustrating a control example of the near-plug flow speed during ignition in consideration of a change in the air-fuel ratio in each cylinder. As is already described with reference to FIG. 2, as the air-fuel ratio (concentration of fuel) in the cylinder becomes leaner, the optimal ignition range of the near-plug flow speed narrows. Thus, it is applicable that only the tumble ratio is controlled as in the control example shown in FIG. 5. However, it is desirable that the near-plug flow speed during ignition be controlled in consideration of a change in the air-fuel ratio in each cylinder. Therefore, in the present embodiment, while control over the tumble ratio with each TCV 24, shown in FIG. 5, is executed as a base, the gas flow in the corresponding cylinder is controlled so that the following near-plug flow speed-engine rotation speed characteristic is obtained. In the near-plug flow speed-engine rotation speed characteristic, the ratio of a change in the near-plug flow speed during ignition to a change in the engine rotation speed within the first engine rotation speed region R1 in the case where the air-fuel ratio in each cylinder is lean is smaller than the ratio in the case where the air-fuel ratio is rich. A specific control example of the above near-plug flow speed-engine rotation speed characteristic is, for example, shown in FIG. 6A to FIG. 6C. More specifically, the above-described change ratio is controlled so as to decrease as the air-fuel ratio in each cylinder becomes leaner.

FIG. 6A shows the characteristic that the near-plug flow speed in the case where the air-fuel ratio in each cylinder is lean is lower over the entire first engine rotation speed region R1 than the near-plug flow speed in the case where the air-fuel ratio is rich. On the contrary to FIG. 6A, FIG. 6B shows the characteristic that the near-plug flow speed in the case where the air-fuel ratio in each cylinder is lean is higher over the entire first engine rotation speed region R1 than the near-plug flow speed in the case where the air-fuel ratio is rich. FIG. 6C shows the intermediate characteristic between FIG. 6A and FIG. 6B.

Figure 7:
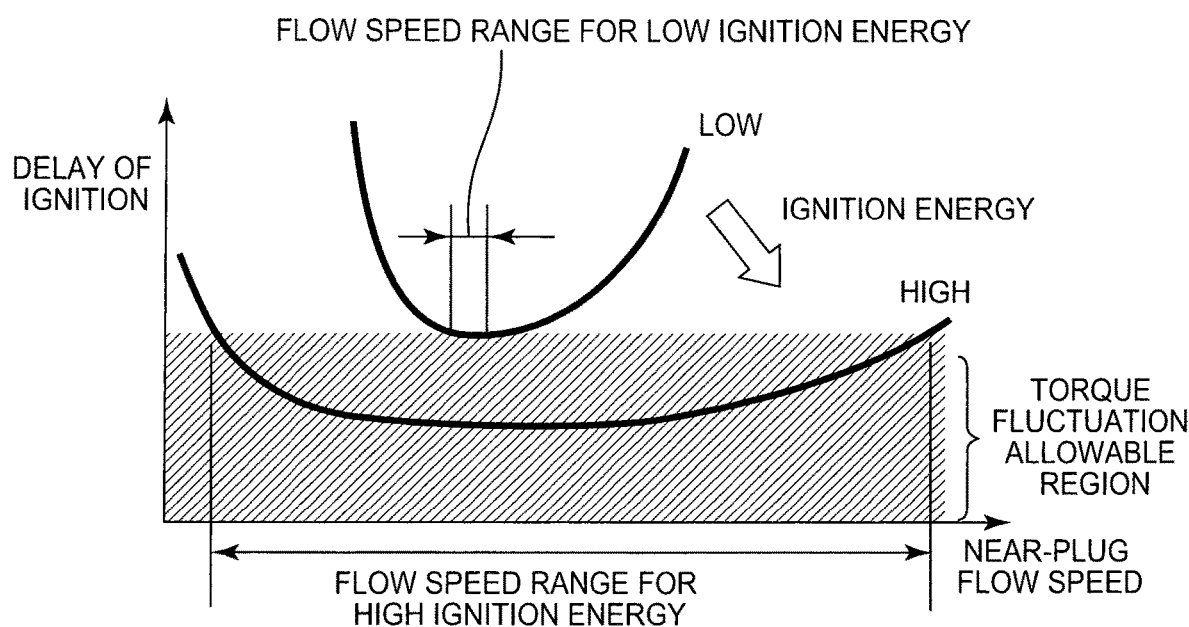
FIG. 7 is a graph that shows the relationship among a delay of ignition of air-fuel mixture, a gas flow speed around the ignition plug and an ignition energy.

FIG. 7 is a graph that shows the relationship among a delay of ignition of air-fuel mixture, a gas flow speed around the ignition plug 32 and an ignition energy. The optimal ignition range of the near-plug flow speed changes with an ignition energy that is supplied to the ignition plug 32, other than the above-described air-fuel ratio in each cylinder. More specifically, as shown in FIG. 7, as the ignition energy decreases, the optimal ignition range of the near-plug flow speed narrows.

Figure 8A:
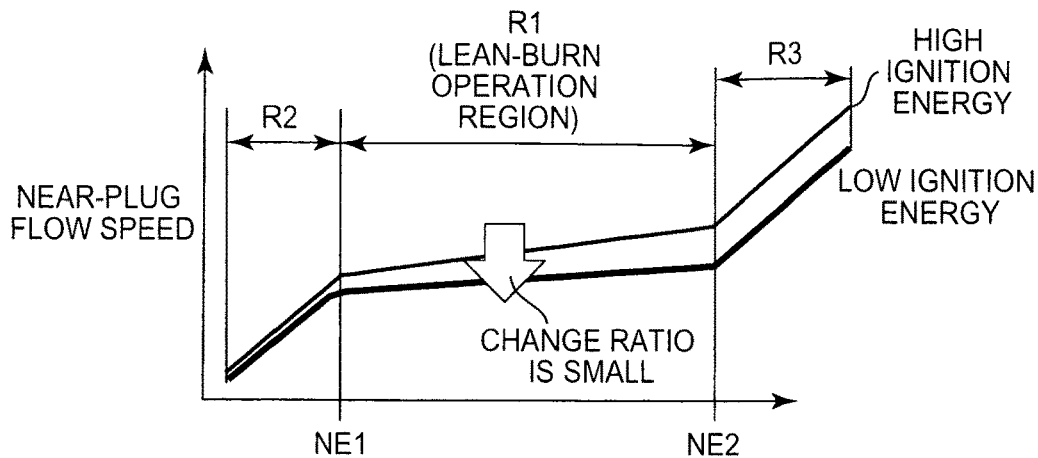
FIG. 8A to FIG. 8C are graphs for illustrating characteristic control over the near-plug flow speed during ignition in consideration of a change in the ignition energy.
Figure 8B:
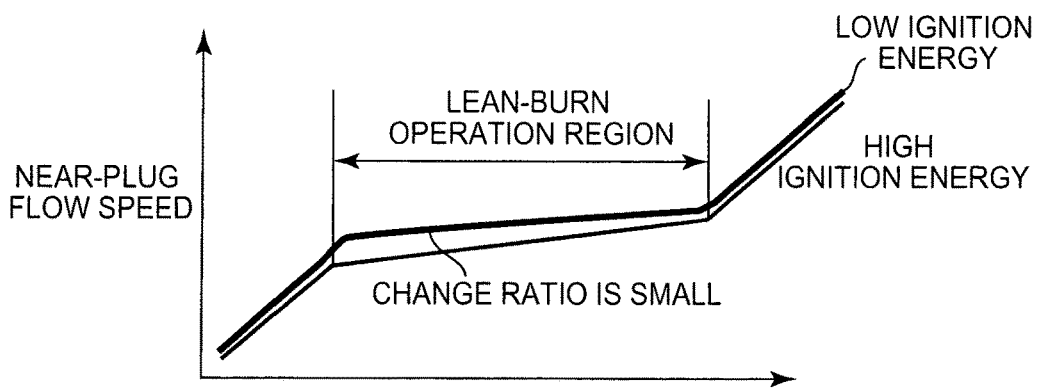
Figure 8C:
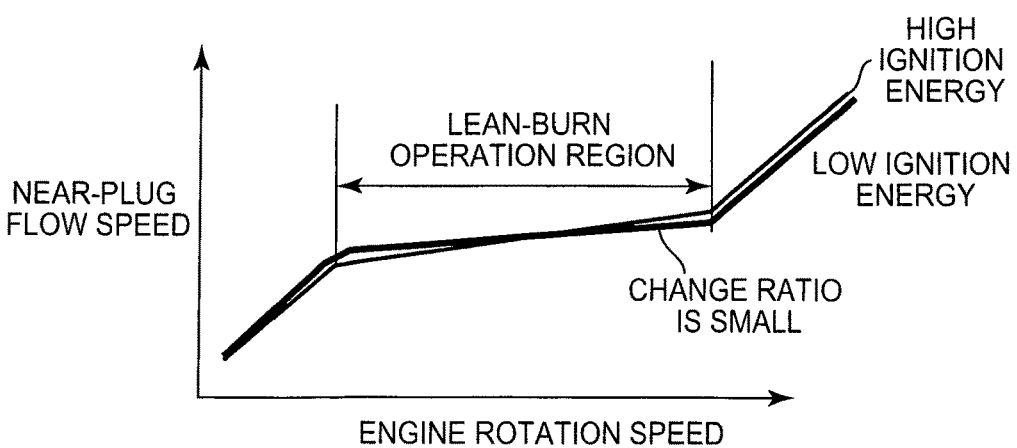

FIG. 8A to FIG. 8C are graphs for illustrating a control example of the near-plug flow speed during ignition in consideration of a change in the ignition energy. In the present embodiment, the gas flow in each cylinder is controlled so that the following near-plug flow speed-engine rotation speed characteristic is obtained. In the near-plug flow speed-engine rotation speed characteristic, the ratio of a change in the near-plug flow speed during ignition to a change in the engine rotation speed within the first engine rotation speed region R1 in the case where the ignition energy is low is smaller than the ratio in the case where the ignition energy is high. A specific control example of the above near-plug flow speed-engine rotation speed characteristic is, for example, shown in FIG. 8A to FIG. 8C. More specifically, the above-described change ratio is controlled so as to decrease as the ignition energy decreases.

Figure 9:
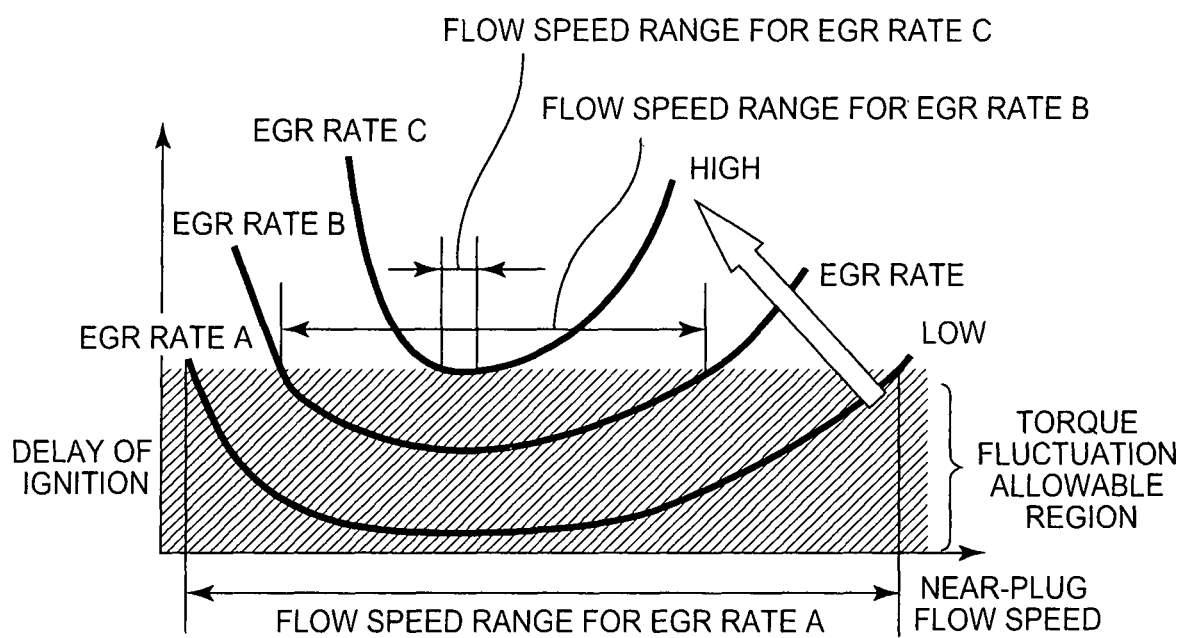
FIG. 9 is a graph that shows the relationship among a delay of ignition of air-fuel mixture, a gas flow speed around the ignition plug and an EGR rate.

FIG. 9 is a view that shows the relationship among a delay of ignition of air-fuel mixture, a gas flow speed around the ignition plug 32 and an EGR rate. The optimal ignition range of the near-plug flow speed changes with an EGR rate of gas that is introduced into each cylinder, other than the above-described factors. More specifically, as shown in FIG. 9, as the EGR rate increases (as the concentration of fuel becomes leaner), the optimal ignition range of the near-plug flow speed narrows.

Figure 10A:
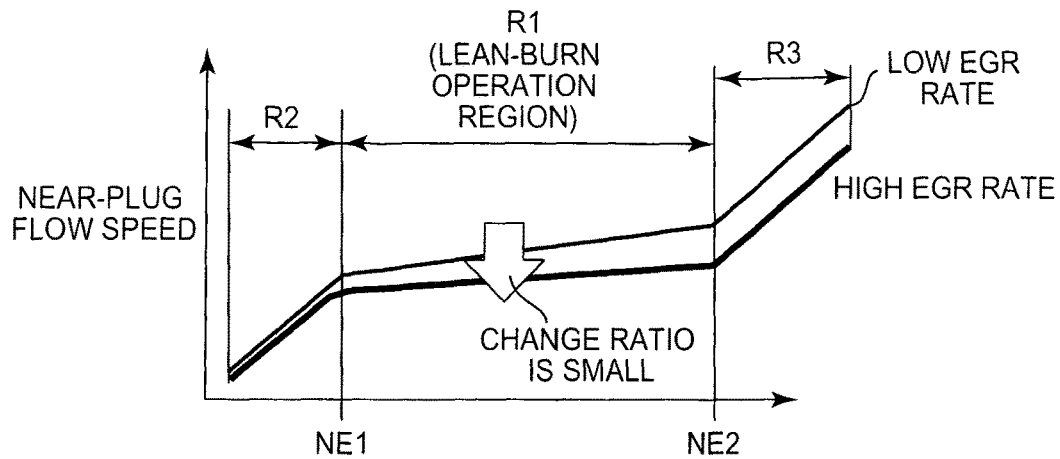
FIG. 10A to FIG. 10C are graphs for illustrating characteristic control over the near-plug flow speed during ignition in consideration of a change in the EGR rate.
Figure 10B:
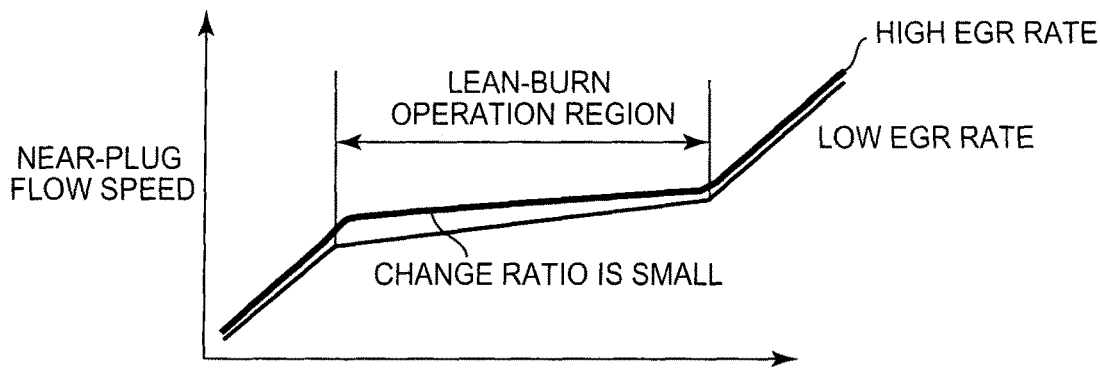
Figure 10C:
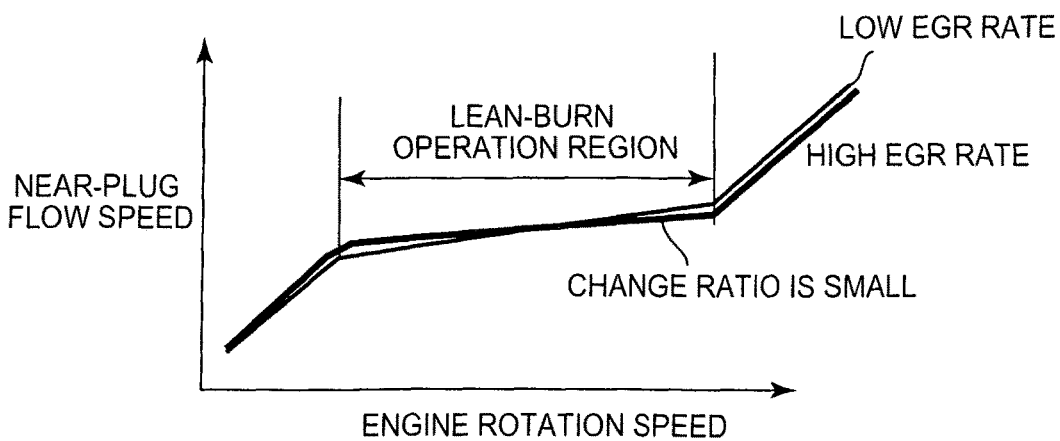

FIG. 10A to FIG. 10C are graphs for illustrating a control example of the near-plug flow speed during ignition in consideration of a change in the EGR rate. In the present embodiment, the gas flow in each cylinder is controlled so that the following near-plug flow speed-engine rotation speed characteristic is obtained. In the near-plug flow speed-engine rotation speed characteristic, the ratio of a change in the near-plug flow speed during ignition to a change in the engine rotation speed within the first engine rotation speed region R1 in the case where the EGR rate is high is smaller than the ratio in the case where the EGR rate is low. A specific control example of the above near-plug flow speed-engine rotation speed characteristic is, for example, shown in FIG. 10A to FIG. 10C. More specifically, the above-described change ratio is controlled so as to decrease as the EGR rate increases.

Figure 11:
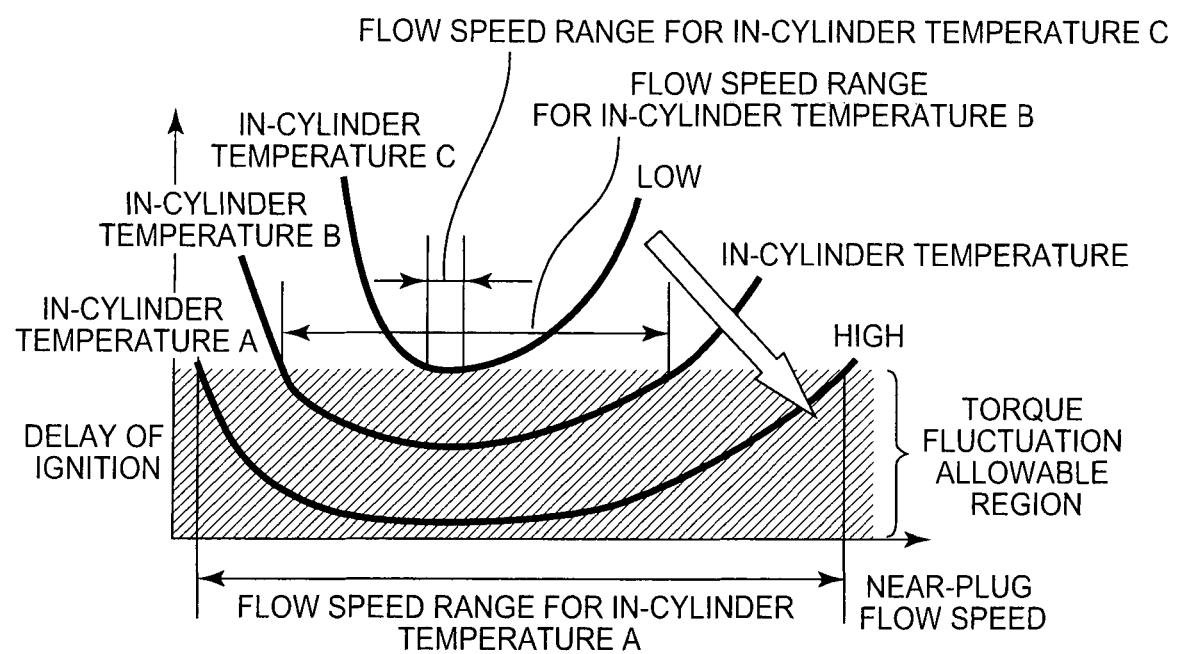
FIG. 11 is a graph that shows the relationship among a delay of ignition of air-fuel mixture, a gas flow speed around the ignition plug and an in-cylinder temperature.

FIG. 11 is a graph that shows the relationship among a delay of ignition of air-fuel mixture, a gas flow speed around the ignition plug 32 and an in-cylinder temperature. The optimal ignition range of the near-plug flow speed changes with a temperature of gas in each cylinder, other than the above-described factors. More specifically, as shown in FIG. 11, as the in-cylinder temperature decreases, the optimal ignition range of the near-plug flow speed narrows.

Figure 12A:
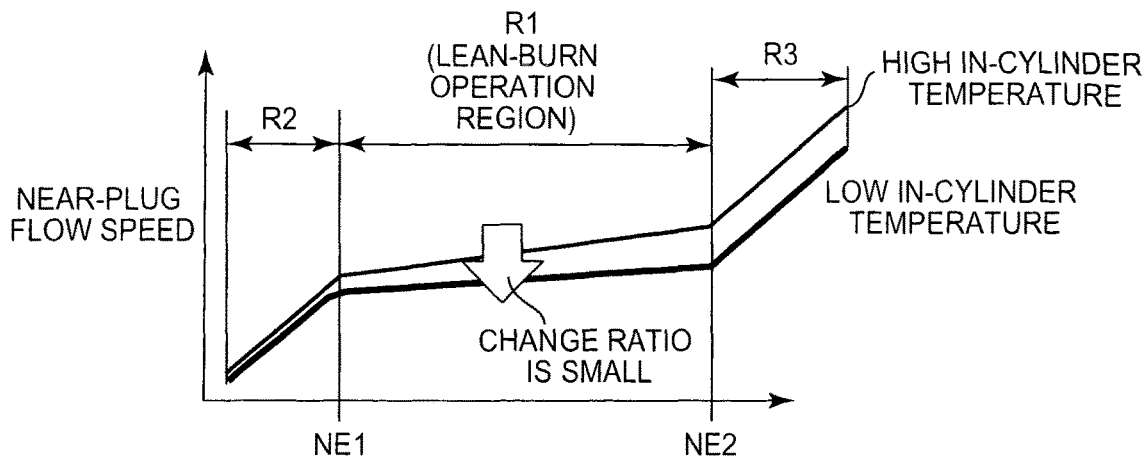
FIG. 12A to FIG. 12C are graphs for illustrating characteristic control over the near-plug flow speed during ignition in consideration of a change in the in-cylinder temperature.
Figure 12B:
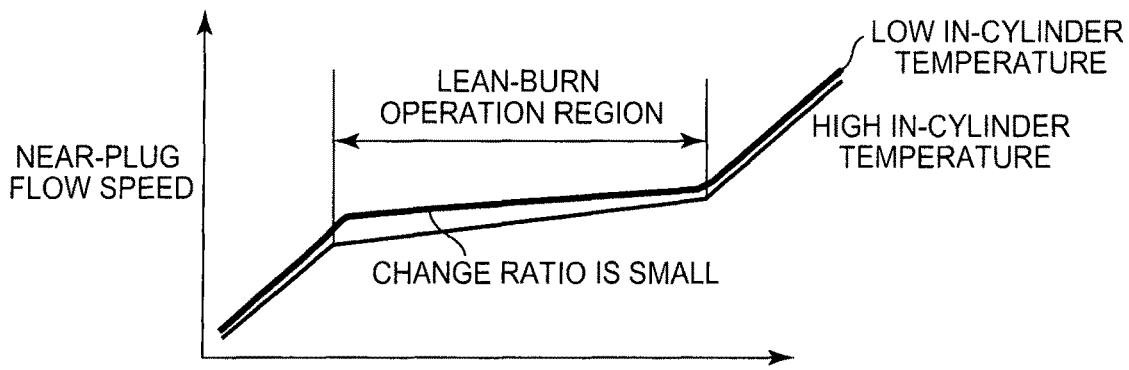
Figure 12C:
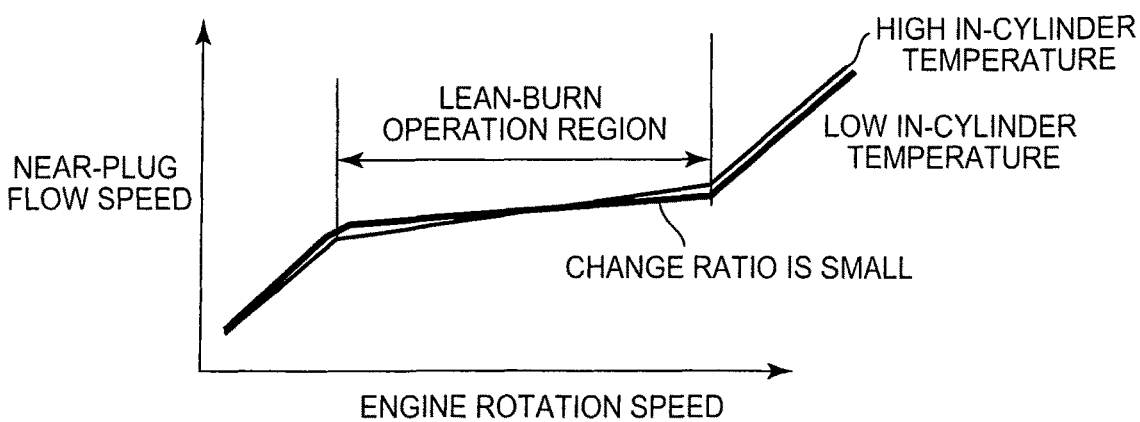

FIG. 12A to FIG. 12C are graphs for illustrating characteristic control over the near-plug flow speed during ignition in consideration of a change in the in-cylinder temperature. Therefore, in the present embodiment, the gas flow in each cylinder is controlled so that the following near-plug flow speed-engine rotation speed characteristic is obtained. In the near-plug flow speed-engine rotation speed characteristic, the ratio of a change in the near-plug flow speed during ignition to a change in the engine rotation speed within the first engine rotation speed region R1 in the case where the in-cylinder temperature is low is smaller than the ratio in the case where the in-cylinder temperature is high. A specific control example of the above near-plug flow speed-engine rotation speed characteristic is, for example, shown in FIG. 12A to FIG. 12C. More specifically, the above-described change ratio is controlled so as to decrease as the in-cylinder temperature decreases.

Figure 13:
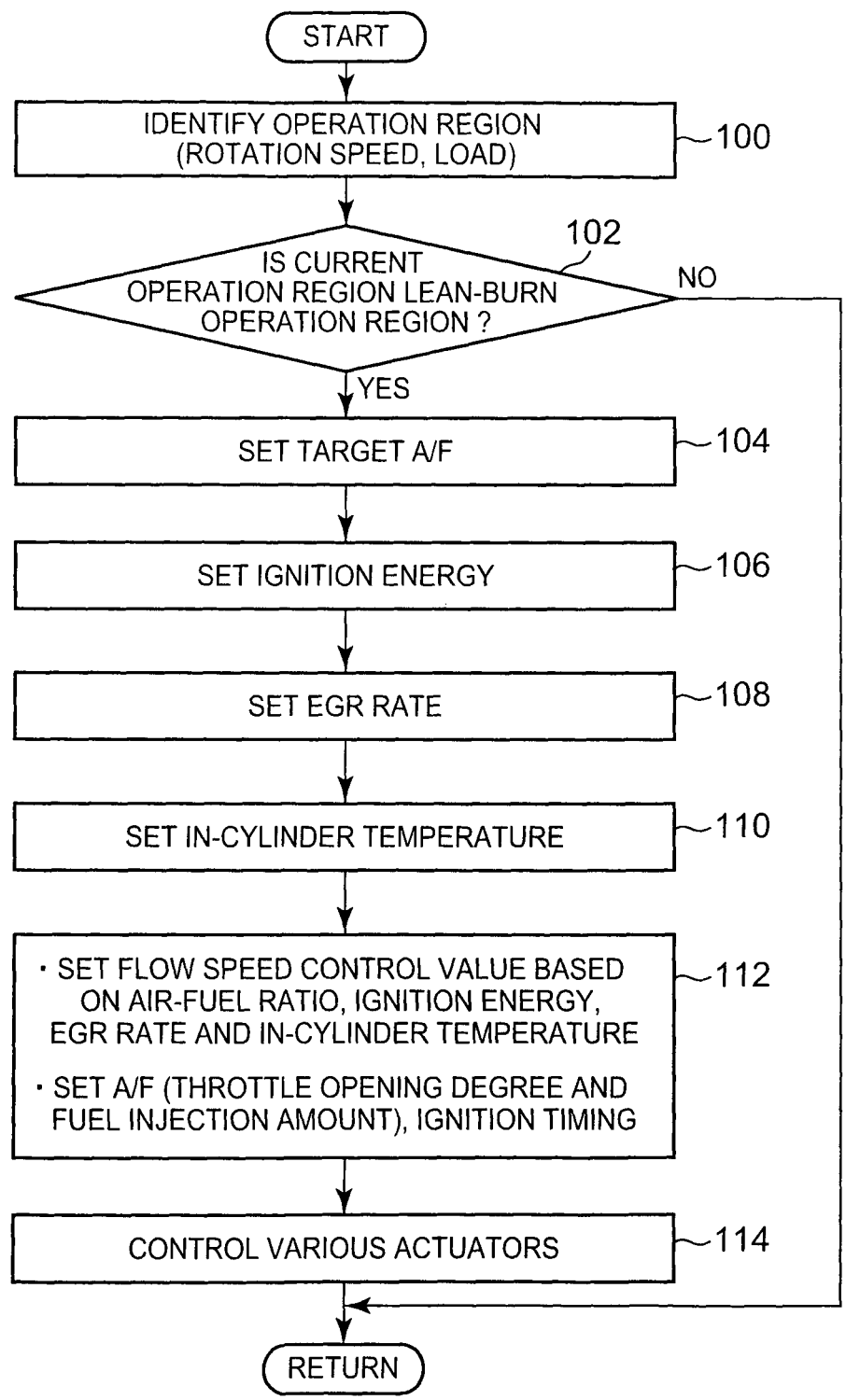
FIG. 13 is a flowchart of a routine that is executed according to the first embodiment of the invention.

FIG. 13 is a flowchart that shows a control routine that is executed by the ECU 40 in order to implement characteristic control according to the first embodiment of the invention. The routine is repeatedly executed over each cylinder in each cycle of the internal combustion engine 10.

In the routine shown in FIG. 13, the ECU 40 initially determines (identifies) the current operation region (engine rotation speed and engine load) of the internal combustion engine 10 by utilizing the outputs of the air flow meter 20, crank angle sensor 42, and the like (step 100). Subsequently, the ECU 40 determines whether the current operation region is a lean-burn operation region in which the concentration of fuel in air-fuel mixture is low (step 102).

When it is determined in step 102 that the current operation region is the lean-burn operation region, the ECU 40 sets a target air-fuel ratio (A/F) (step 104). The ECU 40 stores a map (not shown) that defines a target air-fuel ratio on the basis of an operation region in terms of suppressing the amount of NOx emissions. The ECU 40 sets the target air-fuel ratio by consulting such a map in step 104.

Subsequently, the ECU 40 sets an ignition energy that is supplied to each ignition plug 32 on the basis of the set target air-fuel ratio (step 106). The ignition energy may be, for example, adjusted as follows. A plurality of ignition coils are provided for each ignition plug 32, and the number of ignition coils that are used for discharge is changed as needed. Subsequently, the ECU 40 calculates an EGR rate (step 108). The ECU 40 stores an EGR rate map (not shown) that defines an EGR rate on the basis of an operation condition (load factor, intake pipe pressure, throttle opening degree, EGR valve opening degree, and the like). The ECU 40 calculates the EGR rate by consulting the map in step 108. Subsequently, the ECU 40 calculates an in-cylinder temperature (step 110). The in-cylinder temperature may be calculated on the basis of, for example, an in-cylinder pressure (which is, for example, acquired by an in-cylinder, pressure sensor (not shown)). Subsequently, the ECU 40 sets a flow speed control value on the basis of the target air-fuel ratio (the air-fuel ratio in each cylinder), the ignition energy, the EGR rate and the in-cylinder temperature, and determines respective target values of the throttle opening degree, fuel injection amount and ignition timing for achieving a required torque at the target air-fuel ratio in accordance with a predetermined map, or the like (step 112). The flow speed control value is a target value of the near-plug flow speed (in the present embodiment, a target TCV opening degree).

More specifically, the ECU 40 stores a map that expresses a plurality of near-plug flow speed-engine rotation speed characteristics. The plurality of near-plug flow speed-engine rotation speed characteristics are set so as to vary with the air-fuel ratio in each cylinder, and the like, as shown in FIG. 6A to FIG. 6C, FIG. 8A to FIG. 8C, FIG. 10A to FIG. 10C, and FIG. 12A to FIG. 12C. The ECU 40 calculates a target near-plug flow speed based on the current engine rotation speed by consulting the map in step 112. The ECU 40 determines the TCV opening degree corresponding to the target near-plug flow speed as a target TCV opening degree (flow speed control value) that is used in the first engine rotation speed region R1 by consulting a map (not shown) that defines the correlation between a near-plug flow speed and a TCV opening degree. The thus determined target TCV opening degree (flow speed control value) is set within the optimal ignition range based on the air-fuel ratio in each cylinder, the ignition energy, the EGR rate and the in-cylinder temperature. The example in which all the parameters, that is, the air-fuel ratio in each cylinder, the ignition energy, the EGR rate and the in-cylinder temperature, are used is described. Instead, the target TCV opening degree may be set on the basis of at least one of these parameters.

Subsequently, the ECU 40 controls the various actuators (the throttle valve 22, the TCVs 24, the fuel injection valves 30 and the ignition plugs 32) in accordance with the determined various target values (step 114).

With the above-described routine shown in FIG. 13, in the first engine rotation speed region R1 within the first operation region in which the lean-burn operation is carried out, the TCV opening degree is controlled so that the near-plug flow speed during ignition is constant. Thus, it is possible to keep the near-plug flow speed during ignition in the first engine rotation speed region R1 within the optimal ignition range irrespective of whether the engine rotation speed is high or low. Therefore, it is possible to improve ignitability of air-fuel mixture during lean-burn operation. Moreover, with the above routine, the gas flow in each cylinder is controlled by using the corresponding TCV 24 so that the following near-plug flow speed-engine rotation speed characteristics are obtained. In one of the near-plug flow speed-engine rotation speed characteristics, the ratio of a change in the near-plug flow speed during ignition to a change in the engine rotation speed within the first engine rotation speed region R1 in the case where the air-fuel ratio in each cylinder is lean is smaller than the ratio in the case where the air-fuel ratio is rich. In another one of the near-plug flow speed-engine rotation speed characteristics, the change ratio in the case where the ignition energy is low is smaller than the change ratio in the case where the ignition energy is high. In further another one of the near-plug flow speed-engine rotation speed characteristics, the change ratio in the case where the EGR rate is high is smaller than the change ratio in the case where the EGR rate is low. In the other one of the near-plug flow speed-engine rotation speed characteristics, the change ratio in the case where the in-cylinder temperature is low is smaller than the change ratio in the case where the in-cylinder temperature is high. Thus, by focusing on the fact that the near-plug flow speed that ensures high ignitability has such a characteristic that the near-plug flow speed changes with the above-described parameters, such as the air-fuel ratio in each cylinder, it is possible to keep the near-plug flow speed during ignition within the optimal ignition range in response to a change in the air-fuel ratio in each cylinder, or the like. Therefore, it is possible to further effectively improve ignitability of air-fuel mixture during lean-burn operation.

By executing such control over the TCV opening degree, it is possible to achieve the following near-plug flow speed-engine rotation speed characteristic. In the near-plug flow speed-engine rotation speed characteristic, the ratio of a change in the near-plug flow speed during ignition to a change in the engine rotation speed within the first engine rotation speed region R1 is smaller than the ratio in the second engine rotation speed region R2 or the second engine rotation speed region R3. In the second engine rotation speed region R2 or the second engine rotation speed region R3, the near-plug flow speed increases with an increase in the engine rotation speed because the above control is not executed.

Incidentally, in the control described in the routine shown in FIG. 13 according to the above-described first embodiment, the TCV opening degree is controlled so as to be the target TCV opening degree corresponding to the target value of the near-plug flow speed set as a value in a target flow speed range (optimal ignition range) within the first engine rotation speed region R1, thus controlling the near-plug flow speed during ignition within the optimal ignition range. Instead, in at least part of the rotation speed region within the lean-burn operation region, the TCV opening degree may be controlled so that the near-plug flow speed during ignition falls within the flow speed range that is set on the basis of at least one of the air-fuel ratio in each cylinder, the ignition energy, the EGR rate and the in-cylinder temperature. Specifically, for example, control described below is applicable.

That is, in the control example described here, the target flow speed range (optimal ignition range) for controlling the near-plug flow speed during ignition in the first engine rotation speed region R1 is set. More specifically, in consideration of the characteristic shown in FIG. 2, the target flow speed range in the case where the air-fuel ratio in each cylinder is lean is set so as to be narrower than the target flow speed range in the case where the air-fuel ratio is rich. More specifically, the target flow speed range is set so as to be narrower as the air-fuel ratio in each cylinder becomes leaner. In addition, in the present embodiment, in consideration of the characteristic shown in FIG. 7, the target flow speed range in the case where the ignition energy is low is set so as to be narrower than the target flow speed range in the case where the ignition energy is high. More specifically, the target flow speed range is set so as to be narrower as the ignition energy decreases. In the present embodiment, in consideration of the characteristic shown in FIG. 9, the target flow speed range in the case where the EGR rate is high is set so as to be narrower than the target flow speed range in the case where the EGR rate is low. More specifically, the target flow speed range is set so as to be narrower as the EGR rate increases. In the present embodiment, in consideration of the characteristic shown in FIG. 11, the target flow speed range in the case where the in-cylinder temperature is low is set so as to be narrower than the target flow speed range in the case where the in-cylinder temperature is high. More specifically, the target flow speed range is set so as to be narrower as the in-cylinder temperature decreases.

On that basis, in the present embodiment, during operation of the internal combustion engine 10, the gas flow in each cylinder is controlled so that the near-plug flow speed during ignition in the first engine rotation speed region R1 falls within the target flow speed range. More specifically, the ECU 40 stores a map that defines the correlation between a near-plug flow speed and a TCV opening degree. The ECU 40 sets the TCV opening degree corresponding to a flow speed value (for example, a value at which a delay of ignition is minimum under the condition that the concentration of fuel is the same) selected from within the target flow speed range set as described above, as the target TCV opening degree (flow speed control value) that is used in the first engine rotation speed region R1. The TCV opening degree is controlled so that the target TCV opening degree is obtained. The example in which all the parameters, that is, the air-fuel ratio in each cylinder, the ignition energy, the EGR rate and the in-cylinder temperature, are used is described. Instead, the target flow speed range may be set on the basis of at least one of these parameters.

With the above-described control example, the gas flow in each cylinder is controlled with the corresponding TCV 24 so that the near-plug flow speed during ignition in the first engine rotation speed region R1 falls within the following target flow speed ranges. One of the target flow speed ranges is set so that the target flow speed range in the case where the air-fuel ratio in each cylinder is lean is narrower than the target flow speed range in the case where the air-fuel ratio is rich. Another one of the target flow speed ranges is set so that the target flow speed range in the case where the ignition energy is low is narrower than the target flow speed range in the case where the ignition energy is high. Further another one of the target flow speed ranges is set so that the target flow speed range in the case where the EGR rate is high is narrower than the target flow speed range in the case where the EGR rate is low. The other one of the target flow speed ranges is set so that the target flow speed range in the case where the in-cylinder temperature is low is narrower than the target flow speed range in the case where the in-cylinder temperature is high. Thus, by focusing on the fact that the near-plug flow speed that ensures high ignitability has such a characteristic that the near-plug flow speed changes with the above-described parameters, such as the air-fuel ratio in each cylinder, it is possible to keep the near-plug flow speed during ignition within the optimal ignition range in response to a change in the air-fuel ratio in each cylinder, or the like. Therefore, it is possible to further effectively improve ignitability of air-fuel mixture during lean-burn operation.

Figure 14A:
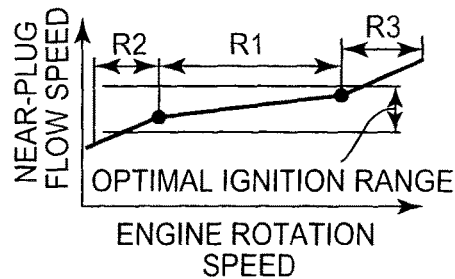
FIG. 14A to FIG. 14C are graphs that represent various modes in which the near-plug flow speed during ignition is controlled in a first engine rotation speed region R1.
Figure 14B:
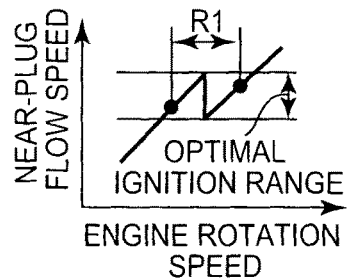
Figure 14C:
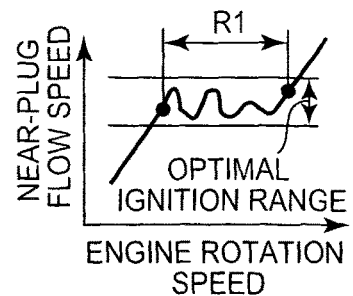

FIG. 14A to FIG. 14C are graphs that represent various modes in which the near-plug flow speed during ignition is controlled in the first engine rotation speed region R1. The near-plug flow speed during ignition is controlled in accordance with the above-described control example so as to fall within the target flow speed range in the first engine rotation speed region R1. When the near-plug flow speed during ignition is shown as the correlation with the engine rotation speed, the near-plug flow speed during ignition is not limited to the mode shown in FIG. 14A, but it may be, for example, the mode shown in FIG. 14B or the mode shown in FIG. 14C. That is, the near-plug flow speed during ignition is not limited to the mode in which the near-plug flow speed uniformly changes with a change in the engine rotation speed within the first engine rotation speed region R1 as shown in FIG. 14A. For example, as shown in FIG. 14B or FIG. 14C, the near-plug flow speed may be set to a mode in which the near-plug flow speed linearly increases or decreases or fluctuates as long as the near-plug flow speed falls within the optimal ignition range in the first engine rotation speed region R1.

In addition, the target flow speed range in the above-described control example may be set in consideration of the following points. That is, because of the fact that the gradient of a curve in FIG. 2 is different between the low flow speed side and the high flow speed side, the optimal ignition range shrinks in the following mode. As the air-fuel ratio in each cylinder increases (becomes leaner), a variation in the optimal ignition range at the high flow speed side increases with respect to a variation in the optimal ignition range at the low flow speed side. Because of a similar reason, the optimal ignition range shrinks in the following modes. As the ignition energy decreases, a variation in the optimal ignition range at the high flow speed side increases with respect to a variation in the optimal ignition range at the low flow speed side. As the EGR rate increases, a variation in the optimal ignition range at the high flow speed side increases with respect to a variation in the optimal ignition range at the low flow speed side. As the in-cylinder temperature decreases, a variation in the optimal ignition range at the high flow speed side increases with respect to a variation in the optimal ignition range at the low flow speed side. Therefore, the target flow speed range may be set so as to shrink in the following modes. As the air-fuel ratio in each cylinder increases, a variation in the target flow speed range at the high flow speed side increases with respect to a variation in the target flow speed range at the low flow speed side. As the ignition energy decreases, a variation in the target flow speed range at the high flow speed side increases with respect to a variation in the target flow speed range at the low flow speed side. As the EGR rate increases, a variation in the target flow speed range at the high flow speed side increases with respect to a variation in the target flow speed range at the low flow speed side. As the in-cylinder temperature decreases, a variation in the target flow speed range at the high flow speed side increases with respect to a variation in the target flow speed range at the low flow speed side. Thus, by focusing on the fact that the near-plug flow speed that ensures high ignitability has such a characteristic that the near-plug flow speed changes with the above-described parameters, such as the air-fuel ratio in each cylinder, while further accurately acquiring the correlation between the optimal ignition range of the near-plug flow speed and each of the air-fuel ratio in each cylinder, the ignition energy, the EGR rate and the in-cylinder temperature, it is possible to keep the near-plug flow speed during ignition within the optimal ignition range in response to a change in the air-fuel ratio in each cylinder, or the like. Therefore, it is possible to further effectively improve ignitability of air-fuel mixture during lean-burn operation. The example in which all the parameters, that is, the air-fuel ratio in each cylinder, the ignition energy, the EGR rate and the in-cylinder temperature, are used is described. Instead, the target flow speed range may be set on the basis of at least one of these parameters.

In addition to the control described in the above-described control example, the following feedback control may be executed. That is, the near-plug flow speed during ignition may be measured on the basis of a discharge voltage by, for example, providing a measuring instrument for measuring the discharge voltage of each ignition coil, which is applied to the ignition plug 32. The near-plug flow speed may be estimated on the basis of, for example, combustion fluctuations estimated by utilizing the crank angle sensor 42, or the like. When there is a deviation of a measured value (or estimated value) from the target value of the near-plug flow speed during operation of the internal combustion engine 10, feedback control may be executed. In the feedback control, the TCV opening degree is adjusted so that the measured value, or the like, of the near-plug flow speed falls within the optimal ignition range. When there is the above-described deviation, instead of feedback control over the TCV opening degree, feedback control for adjusting the air-fuel ratio in each cylinder or the ignition energy may be executed. In the case of the air-fuel ratio in each cylinder, it is desirable to control the air-fuel ratio toward a rich side in order to improve combustion. In the case of the ignition energy, it is desirable to increase the ignition energy because of a similar reason. The above-described various feedback controls may be combined as needed with any one of embodiments described later.

In the above-described first embodiment, "gas flow control means" is implemented by the ECU 40 executing the processes of step 104 to step 114. The "gas flow control means" is also implemented by the ECU 40 executing the control described in the above control example as an alternative embodiment to the above-described first embodiment.

Next, a second embodiment of the invention will be described with reference to FIG. 15 to FIG. 18. A system according to the present embodiment is implemented by causing the ECU 40 to execute control described below by using the hardware configuration shown in FIG. 1.

Figure 15:
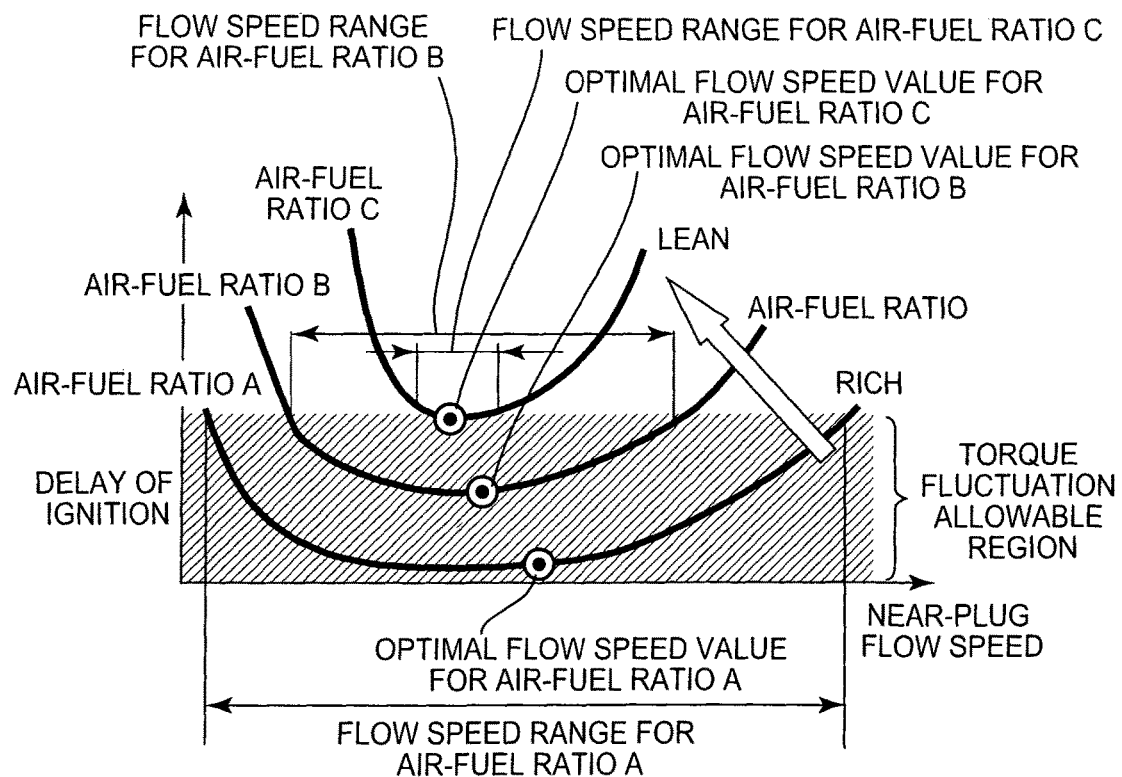
FIG. 15 is a graph for illustrating characteristic control over the near-plug flow speed during ignition according to a second embodiment of the invention.

FIG. 15 to FIG. 18 are views for illustrating characteristic control over the near-plug flow speed during ignition according to the second embodiment of the invention. There is a point at which a delay of ignition is minimum (optimal flow speed value) as indicated by the black circle in FIG. 15 among flow speed values within each optimal ignition range. As shown in FIG. 15, the optimal flow speed value shifts toward the high flow speed side as the air-fuel ratio in each cylinder decreases (becomes richer). This is because the gradient of each curve in FIG. 15 is different between the low flow speed side and the high flow speed side because of factors that increase a delay of ignition are different between the low flow speed side and the high flow speed side as is already described in the first embodiment.

Therefore, in the present embodiment, the optimal flow speed value having the above tendency is used as the flow speed control value in the optimal ignition range, which is used as the target value of the near-plug flow speed during ignition. With such a configuration, the near-plug flow speed during ignition is controlled so as to decrease as the air-fuel ratio in each cylinder increases. The graph shown in FIG. 6A corresponds to the near-plug flow speed-engine rotation speed characteristic that reflects such a control concept.

Figure 16:
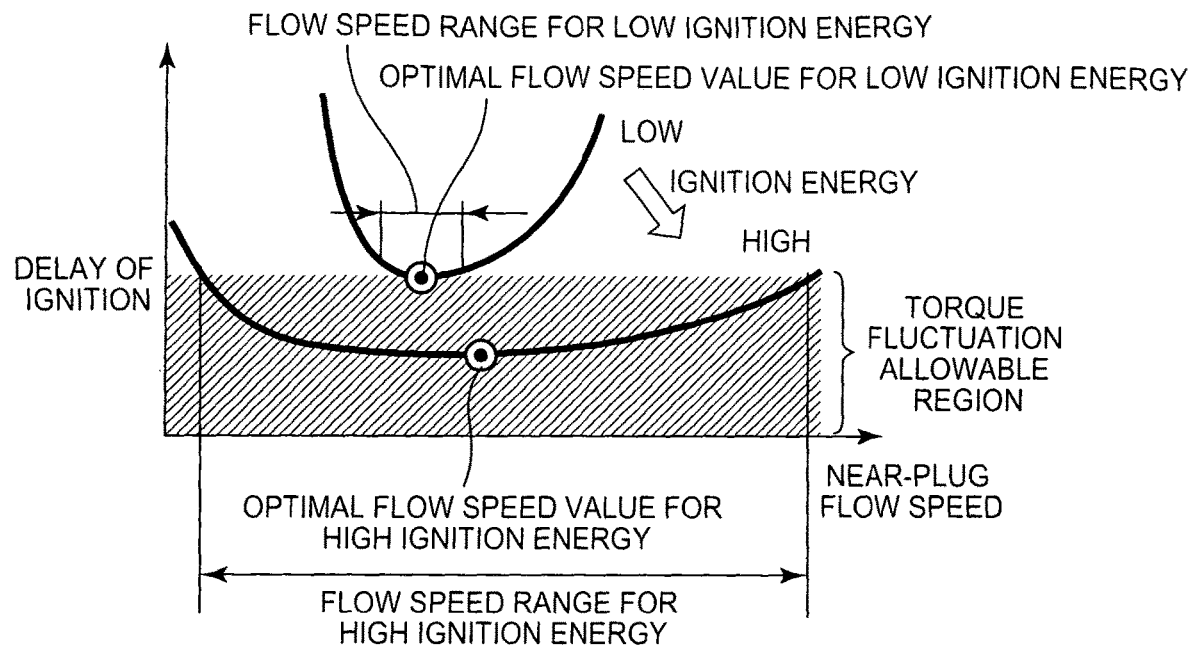
FIG. 16 is a graph for illustrating characteristic control over the near-plug flow speed during ignition according to the second embodiment of the invention.

Other than the air-fuel ratio in each cylinder, the optimal flow speed value in the optimal ignition range shifts toward the high flow speed side as the ignition energy that is supplied to each ignition plug 32 increases as shown in FIG. 16 because of a similar reason. Therefore, in the present embodiment, the optimal flow speed value also having the tendency shown in FIG. 16 is used as the flow speed control value in the optimal ignition range, which is used as the target value of the near-plug flow speed during ignition. With such a configuration, the near-plug flow speed during ignition is controlled so as to decrease as the ignition energy decreases. The graph shown in FIG. 8A corresponds to the near-plug flow speed-engine rotation speed characteristic that reflects such a control concept.

Figure 17:
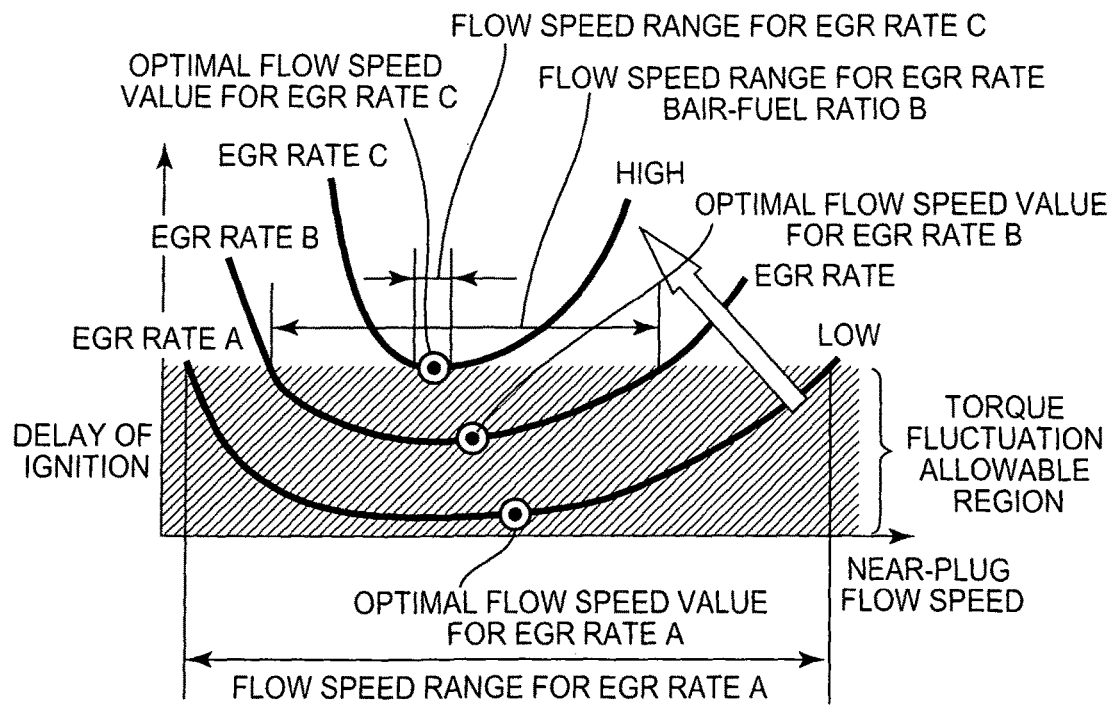
FIG. 17 is a graph for illustrating characteristic control over the near-plug flow speed during ignition according to the second embodiment of the invention.

Other than the above-described factors, the optimal flow speed value in the optimal ignition range shifts toward the high flow speed side as the EGR rate decreases as shown in FIG. 17 because of a similar reason. Therefore, in the present embodiment, the optimal flow speed value also having the tendency shown in FIG. 17 is used as the flow speed control value in the optimal ignition range, which is used as the target value of the near-plug flow speed during ignition. With such a configuration, the near-plug flow speed during ignition is controlled so as to decrease as the EGR rate increases. The graph shown in FIG. 10A corresponds to the near-plug flow speed-engine rotation speed characteristic that reflects such a control concept.

Figure 18:
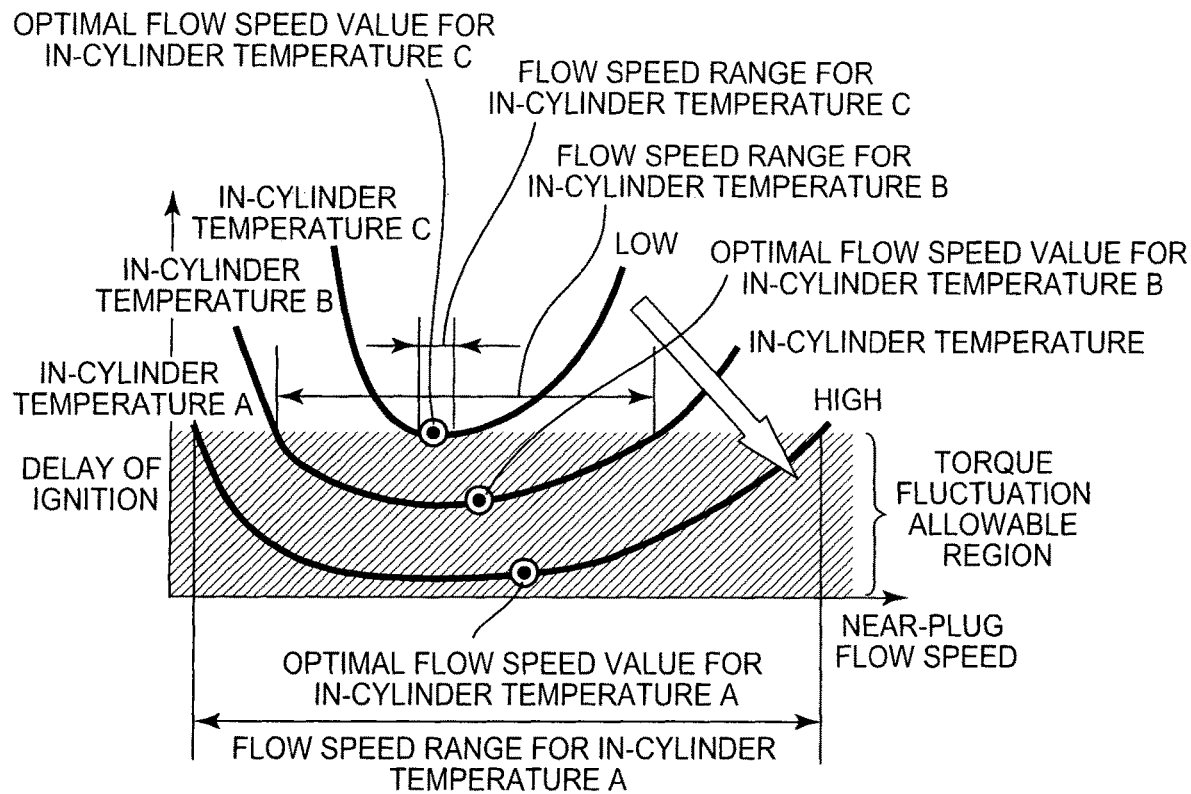
FIG. 18 is a graph for illustrating characteristic control over the near-plug flow speed during ignition according to the second embodiment of the invention.

Other than the above-described factors, the optimal flow speed value in the optimal ignition range shifts toward the high flow speed side as the in-cylinder temperature increases as shown in FIG. 18 because of a similar reason. Therefore, in the present embodiment, the optimal flow speed value also having the tendency shown in FIG. 18 is used as the flow speed control value in the optimal ignition range, which is used as the target value of the near-plug flow speed during ignition. With such a configuration, the near-plug flow speed during ignition is controlled so as to decrease as the in-cylinder temperature decreases. The graph shown in FIG. 12A corresponds to the near-plug flow speed-engine rotation speed characteristic that reflects such a control concept.

The ECU 40 stores a map (not shown) that defines the correlation between the near-plug flow speed and each of the air-fuel ratio in each cylinder, the ignition energy, the EGR rate and the in-cylinder temperature by utilizing the relationships shown in FIG. 15 to FIG. 18. In the control according to the present embodiment, the ECU 40 calculates the target near-plug flow speed corresponding to the current target air-fuel ratio, ignition energy, EGR rate and in-cylinder temperature by consulting the map. The ECU 40 sets the TCV opening degree corresponding to the target near-plug flow speed as a target TCV opening degree (flow speed control value) that is used in the first engine rotation speed region R1 by consulting the map that defines the correlation between a near-plug flow speed and a TCV opening degree. The example in which all the parameters, that is, the air-fuel ratio in each cylinder, the ignition energy, the EGR rate and the in-cylinder temperature, are used is described. Instead, the target TCV opening degree may be set on the basis of at least one of these parameters.

With the above-described control according to the present embodiment, the gas flow in each cylinder is controlled by using the corresponding TCV 24 so that the near-plug flow speed during ignition in the first engine rotation speed region R1 changes as follows. The near-plug flow speed decreases as the air-fuel ratio increases. The near-plug flow speed decreases as the ignition energy decreases. The near-plug flow speed decreases as the EGR rate increases. The near-plug flow speed decreases as the in-cylinder temperature decreases. Thus, by focusing on the fact that the optimal flow speed value around each ignition plug 32 for ensuring high ignitability has such a characteristic that the optimal flow speed value changes toward the low flow speed side as the air-fuel ratio in each cylinder increases, the optimal flow speed value changes toward the low flow speed side as the ignition energy decreases, the optimal flow speed value changes toward the low flow speed side as the EGR rate increases and the optimal flow speed value changes toward the low flow speed side as the in-cylinder temperature decreases, it is possible to control the near-plug flow speed during ignition to an optimal value within the optimal ignition range in response to a change in the air-fuel ratio in each cylinder, or the like. Therefore, it is possible to further effectively improve ignitability of air-fuel mixture during lean-burn operation.

In the above-described second embodiment, the "gas flow control means" is implemented by the ECU 40 executing the above-described control.

Next, a third embodiment of the invention will be described with reference to FIG. 19A to FIG. 26. A system according to the present embodiment is implemented by causing the ECU 40 to execute a routine shown in FIG. 26 (described later) instead of the routine shown in FIG. 13 by using the hardware configuration shown in FIG. 1.

In the above-described first and second embodiments, the near-plug flow speed during ignition is controlled by changing the tumble ratio with each TCV 24. In contrast, in the present embodiment, the near-plug flow speed during ignition is controlled by changing the pattern of a tumble flow that is generated in each cylinder. More specifically, the pattern of the tumble flow is changed between an ordinary tumble flow pattern (first tumble flow pattern) and an ω tumble flow pattern (second tumble flow pattern) defined below.

Figure 19A:
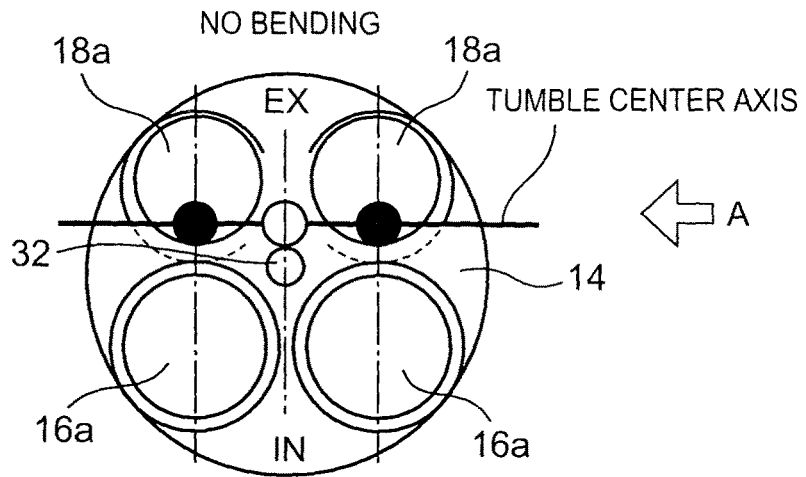
FIG. 19A to FIG. 19C are views for illustrating the characteristic of an ordinary tumble flow pattern.
Figure 19B:
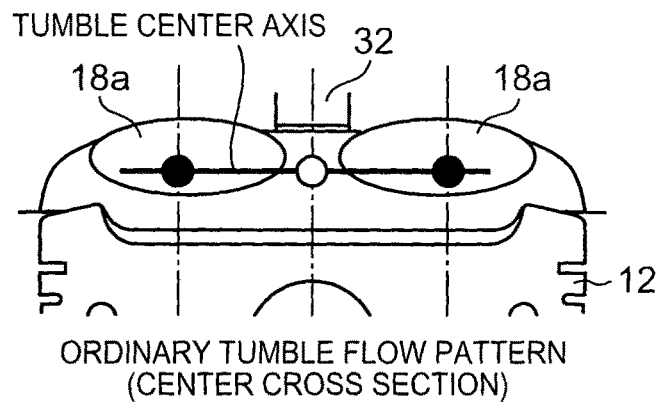
Figure 19C:
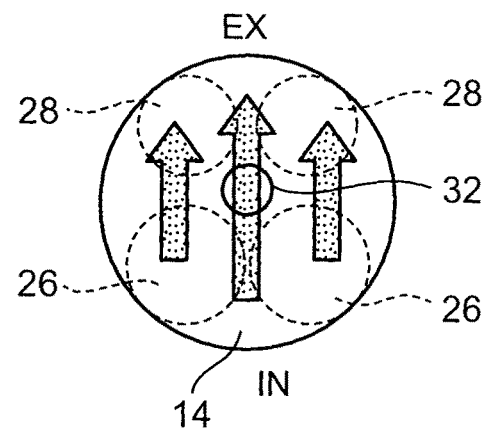
Figure 20A:
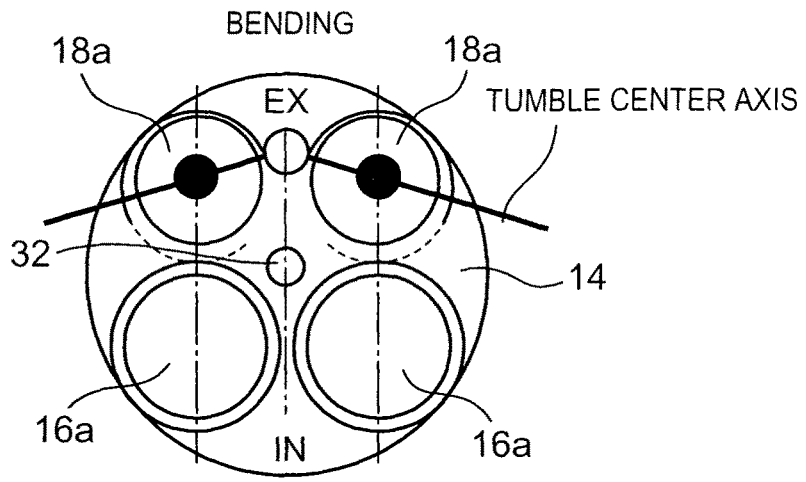
FIG. 20A to FIG. 20C are views for illustrating the characteristic of an ω tumble flow pattern.
Figure 20B:
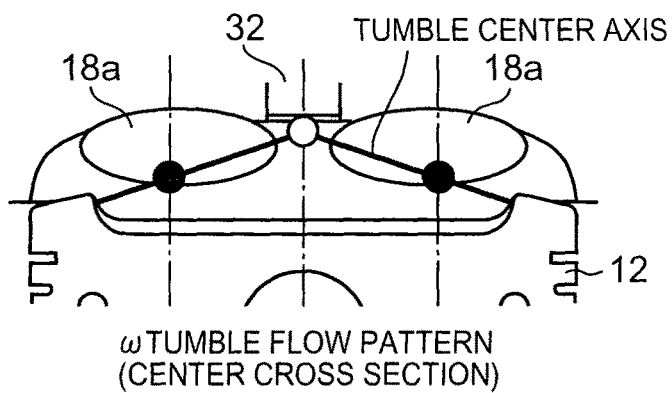
Figure 20C:
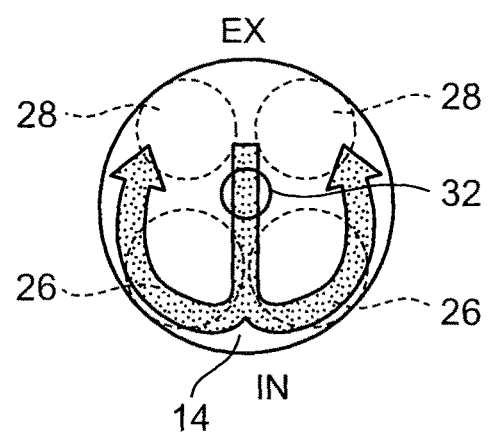

The mechanism of generating a tumble flow having an ω tumble flow pattern will be described. FIG. 19A to FIG. 19C are views for illustrating the characteristic of an ordinary tumble flow pattern. FIG. 20A to FIG. 20C are views for illustrating the characteristic of an ω tumble flow pattern. More specifically, FIG. 19A and FIG. 20A are plan views when the combustion chamber 14 is viewed from the upper side. FIG. 19B and FIG. 20B are side views when the combustion chamber 14 is viewed from the intake side. FIG. 19C and FIG. 20C are views when the combustion chamber 14 is viewed from the upper side, and respectively showing the flow direction of a tumble flow having an ordinary tumble flow pattern and the flow direction of a tumble flow having an ω tumble flow pattern. FIG. 19A to FIG. 19C and FIG. 20A to FIG. 20C show states at the timing near compression top dead center in a compression stroke.

The basic rotation direction of a tumble flow that is generated in each cylinder is a clockwise direction when viewed in the direction of FIG. 1, that is, a direction in which gas flowing from the intake ports 16a into the corresponding cylinder flow toward a top face of the combustion chamber 14, an in-cylinder wall surface adjacent to the exhaust valves 28, a top face of the piston 12, an in-cylinder wall surface adjacent to the intake valves 26 and the top face of the combustion chamber 14 in the stated order. A tumble center axis described below is obtained by connecting vortex center points of the tumble flow in cross sections of the combustion chamber 14 when viewed in the arrow A direction in FIG. 19A. The white circle in each of FIG. 19A to FIG. 19C and FIG. 20A to FIG. 20C indicates the vortex center point of the tumble flow in cross section taken at a cylinder bore center at which the ignition plug 32 is provided. The black circles in each of the drawings each indicate the vortex center point of the tumble flow in cross section taken along the axial centers of the pair of intake valve 26 and exhaust valve 28.

The tumble center axis of the ordinary tumble flow pattern is a non-curved axis as shown in FIG. 19A and FIG. 19B. Therefore, the flow in the ordinary tumble flow pattern is an uniform flow from the intake side toward the exhaust side even in the second half of the compression stroke as shown in FIG. 19C. In contrast, the tumble center axis of the ω tumble flow pattern is a bent axis with a bending point set at the vortex center of the tumble flow at the cylinder bore center (ignition plug position) as shown in FIG. 20A and FIG. 20B. More specifically, in the ω tumble flow pattern, the vortex center position (indicated by the white circle) of the tumble flow in cross section taken at the cylinder bore center is higher than the vortex center positions therearound as shown in FIG. 20B. More specifically, near the compression top dead center, the tumble flow is biased upward with respect to a horizontal plane passing through the volume center of the combustion chamber 14 at the vortex center position of the tumble flow in cross section taken at the cylinder bore center. Hereinafter, a bias in such a mode is simply referred to as "bias of the vortex center of the tumble flow". Therefore, in such a case, in a process in which in-cylinder gas is compressed in a compression stroke, a tumble flow that should be originally a single rigid vortex in the cylinder transforms into a tumble flow having two center axes because of bending of the tumble center axis (a tumble flow having two swirl flow (horizontal vortex flow) components having mutually opposite rotation directions when the combustion chamber 14 is viewed from the upper side). As a result, as shown in FIG. 20C, in the ω tumble flow pattern, an ω-pattern flow is formed near the compression top dead center when the combustion chamber 14 is viewed from the upper side. As a result of generation of such an ω-pattern flow, the flow direction of gas around the ignition plug 32 is reversed near the compression top dead center in the compression stroke.

Additionally, in an intake stroke, the tumble center axis bends both in the ordinary tumble flow pattern and in the ω tumble flow pattern. In the case where the bending of the tumble center axis remains until near the compression top dead center, the w tumble flow pattern is obtained. In the case where the bending of the tumble center axis disappears during the compression stroke, the ordinary tumble flow pattern is obtained.

Figure 21:
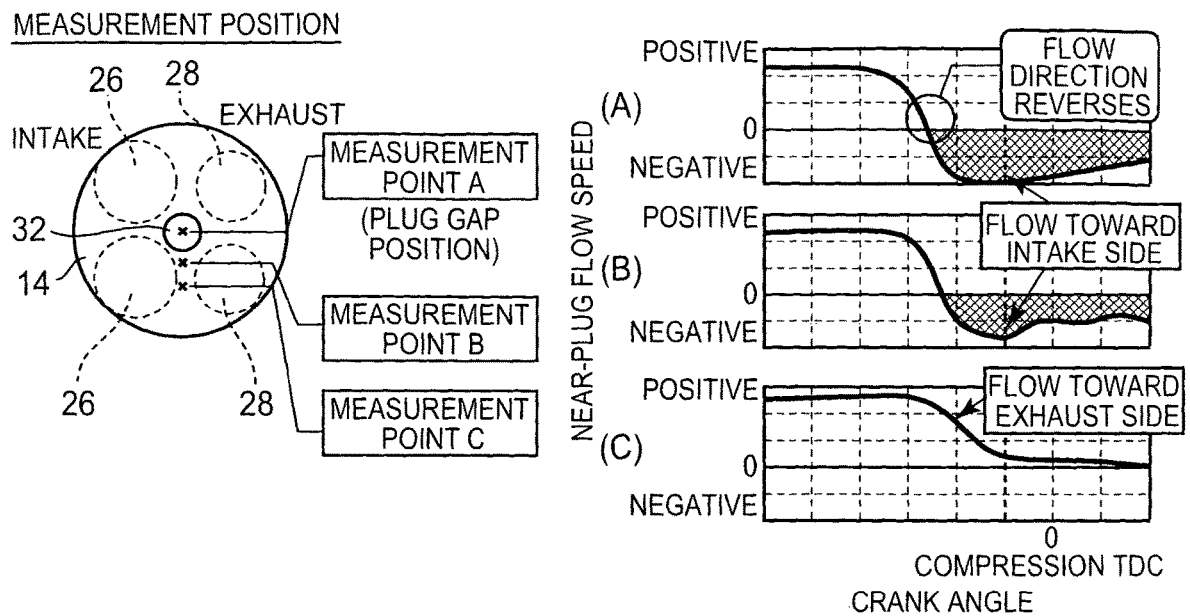
FIG. 21 is a view that shows a change in the gas flow speed in a cylinder in the second half of a compression stroke at the time when a tumble flow having an ω tumble flow pattern is generated.

FIG. 21 is a view that shows a change in the gas flow speed in the cylinder in the second half of a compression stroke at the time when the tumble flow having the w tumble flow pattern is generated. More specifically, the graph (A) in FIG. 21 shows a change in the gas flow speed at a measurement point A (plug gap position), the graph (B) in FIG. 21 shows a change in the gas flow speed at a predetermined position on a radially outer side of the cylinder bore with respect to the measurement point A, and the graph (C) in FIG. 21 shows a change in the gas flow speed at a predetermined position on a further radially outer side of the cylinder bore with respect to the measurement point A. In FIG. 21(A) to FIG. 21(C), the flow speed of a flow from the intake valve side toward the exhaust valve side is indicated by a positive value. This also applies to FIG. 23 (described later).

As shown in the graph (A) in FIG. 21, when the tumble flow having the w tumble flow pattern is generated, the flow direction of in-cylinder gas at the plug gap position reverses, that is, the flow direction changes near the compression top dead center from a flow from the intake valve side toward the exhaust valve side to a flow from the exhaust valve side toward the intake valve side. As can be understood from a comparison among the graphs (A) to (C) in FIG. 21, the change in the flow direction of in-cylinder gas becomes smaller as the position distances from the plug gap position. In the case shown in FIG. 21, the flow direction does not reverse at a measurement point C.

Figure 23:
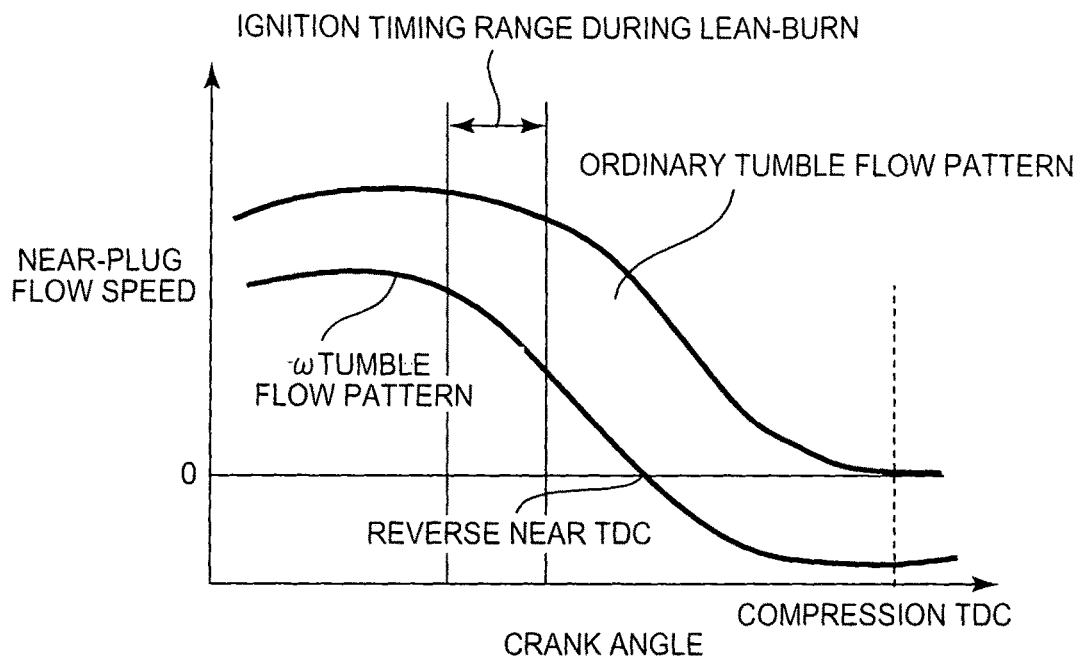
FIG. 23 is a graph for illustrating a change in the near-plug flow speed in the second half of a compression stroke by comparison between the ordinary tumble flow pattern and the ω tumble flow pattern.

As described above, when the tumble center axis bends in the second half of the compression stroke and there occurs a bias in the vortex center of the tumble flow, the ω tumble flow pattern is obtained, so the flow direction of in-cylinder gas reverses at the cylinder bore center position (plug gap position) near the compression top dead center. Thus, the ordinary tumble flow pattern (first tumble flow pattern) is such that the gas flow speed around the ignition plug 32, which has been originally a flow in the direction from the intake valve side toward the exhaust valve side (as shown in FIG. 23 (described later)), converges to zero as approaching the compression top dead center. On the other hand, the w tumble flow pattern (second tumble flow pattern) is such that the flow direction of gas around the ignition plug 32 reverses from the direction from the intake valve side toward the exhaust valve side to the direction from the exhaust valve side toward the intake valve side with a reduction in the near-plug flow speed in the second half of the compression stroke.

Figure 22A:
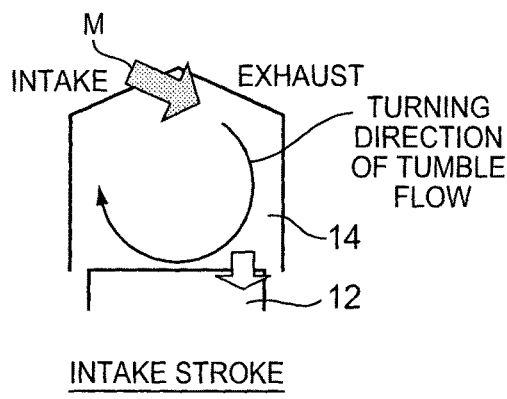
FIG. 22A and FIG. 22B are views for illustrating a condition suitable for generating a tumble flow having an ω tumble flow pattern.
Figure 22B:
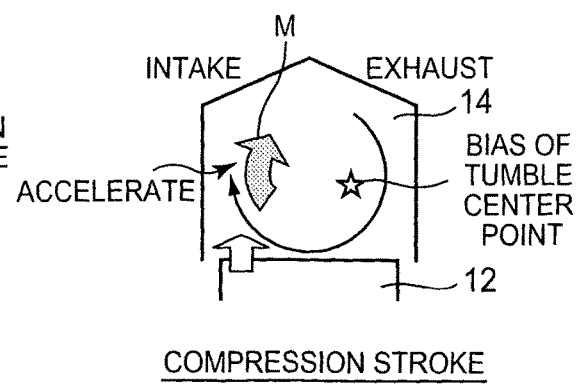

FIG. 22A and FIG. 22B are views for illustrating a condition suitable for generating a tumble flow having an ω tumble flow pattern. FIG. 22A shows a state of gas flow in the cylinder in the intermediate stage of the intake stroke. The speed of the piston 12 is maximum in the intermediate stage of the intake stroke. Generally, each intake valve 26 is set such that the valve lift becomes maximum at this timing. Therefore, as indicated by the arrow in FIG. 22A, intake air mass M at a large flow rate flows into the cylinder in the intermediate stage of the intake stroke, and is present near the intake valves 26.

FIG. 22B shows a state of gas flow in the cylinder at the time of the intermediate stage in the compression stroke, that is, at the time when the piston 12 has made one stroke from the timing shown in FIG. 22A. The tumble center point shown in FIG. 22B indicates the vortex center of a flow (state where there occurs a bias with respect to the volume center of the combustion chamber 14) mainly formed of the intake air mass M.

In the case shown in FIG. 22A and FIG. 22B, as shown in FIG. 22B, the intake air mass M shown in FIG. 22A turns about 270° in the cylinder while the piston 12 makes one stroke, and is then located at the intake side. In this case, because the intake air mass M is originally present, the bias of the vortex center of the tumble flow with respect to the volume center of the combustion chamber 14 in the second half of the compression stroke is accelerated. On that basis, in this case, because the intake air mass M is located at the intake side in the intermediate stage of the compression stroke at which the speed of the piston 12 is maximum, the flow of the mass M is further accelerated by the upward movement of the piston 12. As a result, the bias of the vortex center of the tumble flow in the compression stroke thereafter is facilitated.

On the contrary to the above-described case, when intake air mass is located at the exhaust side in the intermediate stage of the compression stroke, the upward movement of the piston 12 functions to cancel the speed of flow of the mass, while non-massive flow located at the intake side at this timing is slightly accelerated by the upward movement of the piston 12. As a result, on the contrary to the case shown in FIG. 22A and FIG. 22B, the vortex center of the tumble flow approaches the volume center of the combustion chamber 14, and the bending of the tumble center axis is eliminated.

From the above description, it is understood that, under the condition that intake air mass M at a large flow rate is located at the intake side at the timing at which the speed of the piston 12 is maximum in the compression stroke (in the intermediate stage of the compression stroke), the bias of the vortex center of the tumble flow effectively increases, and the tumble flow having the ω tumble flow pattern is effectively generated. Thus, by changing the tumble ratio from a certain tumble ratio to a tumble ratio at which in-cylinder gas turns during one stroke as shown in FIG. 22A and FIG. 22B, it is possible to strengthen the flow having the ω tumble flow pattern by increasing the degree of bias of the vortex center of the tumble flow.

FIG. 23 is a graph for illustrating a change in the near-plug flow speed in the second half of the compression stroke by comparison between the ordinary tumble flow pattern and the ω tumble flow pattern. FIG. 23 assumes the case where the reversal timing of the flow direction of gas around the ignition plug 32 at the time of generating a tumble flow having an ω tumble flow pattern is later than a set range of ignition timing during lean-burn operation. Control according to the present embodiment and fourth to seventh embodiments (described later) is based on this assumption.

As shown in FIG. 23, when the tumble flow having the ω tumble flow pattern is generated, the near-plug flow speed significantly decreases with the progress of generation of the ω-pattern flow in the second half of the compression stroke as compared to the case where a tumble flow having an ordinary tumble flow pattern is generated, and finally the flow direction of gas around the ignition plug 32 reverses. Such a decrease in the near-plug flow speed becomes remarkable as the flow having the ω tumble flow pattern strengthens (the bias of the vortex center of the tumble flow strengthens). Thus, by controlling the gas flow in each cylinder so that the pattern of the tumble flow is changed between the ordinary tumble flow pattern and the ω tumble flow pattern, it is possible to control the near-plug flow speed during ignition.

Figure 24:
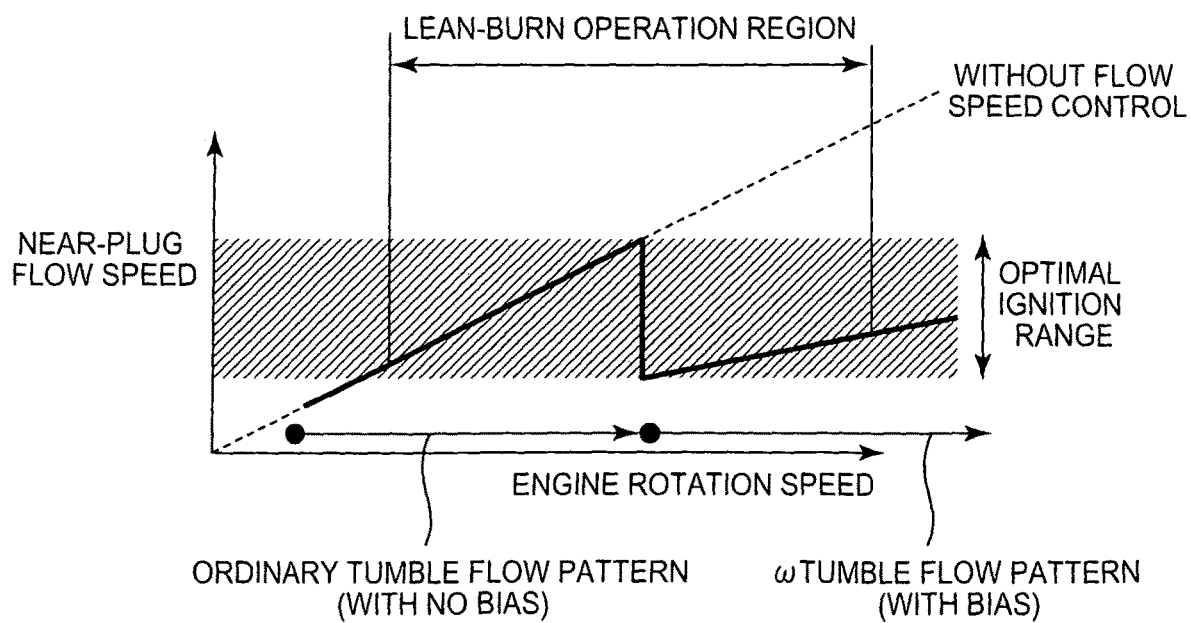
FIG. 24 is a graph for illustrating characteristic control over the near-plug flow speed during ignition according to a third embodiment of the invention.

FIG. 24 is a graph for illustrating characteristic control over the near-plug flow speed during ignition according to a third embodiment of the invention. In the present embodiment, in order to control the near-plug flow speed during ignition within a predetermined flow speed range (optimal ignition range) in the lean-burn operation region, the pattern of the tumble flow is changed between the ordinary tumble flow pattern and the ω tumble flow pattern on the basis of the engine rotation speed. More specifically, as shown in FIG. 24, in a low engine rotation speed-side region within the lean-burn operation region, the gas flow in each cylinder is controlled so that generation of a flow having an ω tumble flow pattern is suppressed and a tumble flow having an ordinary tumble flow pattern is generated; whereas, in a high engine rotation speed-side region within the lean-burn operation region, the gas flow in each cylinder is controlled so that a tumble flow having an ω tumble flow pattern is generated. As described in the alternative embodiment to the first embodiment, the target flow speed range (optimal ignition range) that is used in the present embodiment is set on the basis of at least one of the air-fuel ratio in each cylinder, the ignition energy, the EGR rate and the in-cylinder temperature.

Figure 25:
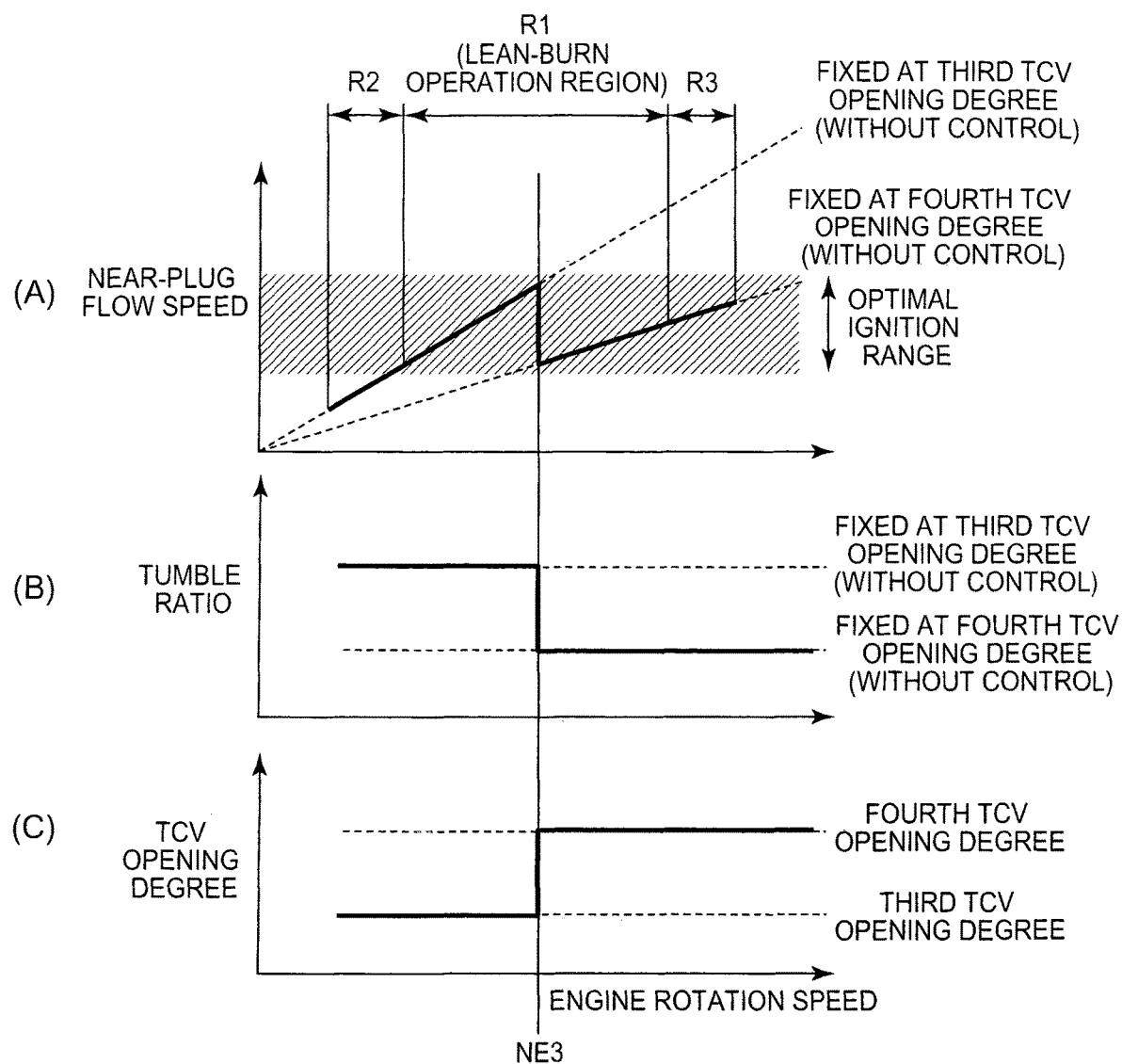
FIG. 25 shows graphs for illustrating a method of controlling the near-plug flow speed during ignition by controlling whether to generate a tumble flow having an ω tumble flow pattern by adjusting a tumble ratio with a TCV.

Next, a control example according to the third embodiment will be described. FIG. 25 shows graphs for illustrating a method of controlling the near-plug flow speed during ignition by controlling whether to generate a tumble flow having an ω tumble flow pattern by adjusting the tumble ratio with the corresponding TCV 24.

In the method shown in FIG. 25, the pattern of the tumble flow is controlled between the ordinary tumble flow pattern and the ω tumble flow pattern by controlling the tumble ratio with each TCV 24. If the TCV opening degree is fixed at a third TCV opening degree shown in FIG. 25 irrespective of the engine rotation speed, the near-plug flow speed falls outside the optimal ignition range according to the present embodiment in a high rotation speed-side region within the lean-burn operation region because of an increase in the gas flow speed resulting from an increase in the engine rotation speed. Similarly, if the TCV opening degree is fixed at a fourth TCV opening degree, the near-plug flow speed falls outside the optimal ignition range in a low rotation speed-side region.

The third TCV opening degree is assumed to be set as an opening degree at which a tumble ratio larger than that within the range suitable for generating a tumble flow having an ω tumble flow pattern is obtained. The range suitable for generating a tumble flow having an ω tumble flow pattern is a predetermined range of which the center tumble ratio is a tumble ratio at the time when in-cylinder gas turns during one stroke as in the case of the example shown in FIG. 22A and FIG. 22B. By using the thus set third TCV opening degree, generation of a flow having an ω tumble flow pattern is suppressed, so it is possible to generate a tumble flow having an ordinary tumble flow pattern. The fourth TCV opening degree is assumed to be set as an opening degree at which the tumble ratio within the range suitable for generating a tumble flow having an ω tumble flow pattern is obtained. By using the thus set fourth TCV opening degree, a bias is caused to occur at the vortex center of the tumble flow, so it is possible to generate a tumble flow having an ω tumble flow pattern. Additionally, the fourth TCV opening degree is assumed as a TCV opening degree set so that the near-plug flow speed does not become lower than a lower limit of the optimal ignition range at a third engine rotation speed NE3.

In the case shown in FIG. 25, the third TCV opening degree is used in the low rotation speed-side region within the lean-burn operation region, with the result that it is possible to cause the near-plug flow speed to fall within the optimal ignition range by utilizing a tumble flow having an ordinary tumble flow pattern. Therefore, in the present embodiment, the TCV opening degree is controlled to the third TCV opening degree in an engine rotation speed region lower than the third engine rotation speed NE3 at which the near-plug flow speed reaches an upper limit of the optimal ignition range if the TCV opening degree remains fixed at the third TCV opening degree.

On the other hand, the TCV opening degree is controlled to the fourth TCV opening degree in a high engine rotation speed region higher than or equal to the third engine rotation speed NE3. Thus, as shown in FIG. 25(A), by generating a tumble flow having an ω tumble flow pattern, it is possible to reduce the near-plug flow speed near the third engine rotation speed NE3 at which the tumble flow pattern is changed. In this way, by changing the tumble flow pattern on the basis of the engine rotation speed, it is possible to keep the near-plug flow speed during ignition within the optimal ignition range in the lean-burn operation region.

In the method shown in FIG. 25, the TCV opening degree is fixed at the fourth TCV opening degree in the region higher in rotation speed than the third engine rotation speed NE3. Instead, the TCV opening degree may be adjusted so that the tumble ratio having a higher degree of bias of the vortex center of the tumble flow is obtained as the engine rotation speed increases in the high rotation speed-side region. Thus, the flow having an ω tumble flow pattern is further strengthened as a result of an increase in the engine rotation speed, so, as shown in FIG. 24, it is possible to moderate a change in the near-plug flow speed to a change in the engine rotation speed in the above-described high rotation speed-side region.

Figure 26:
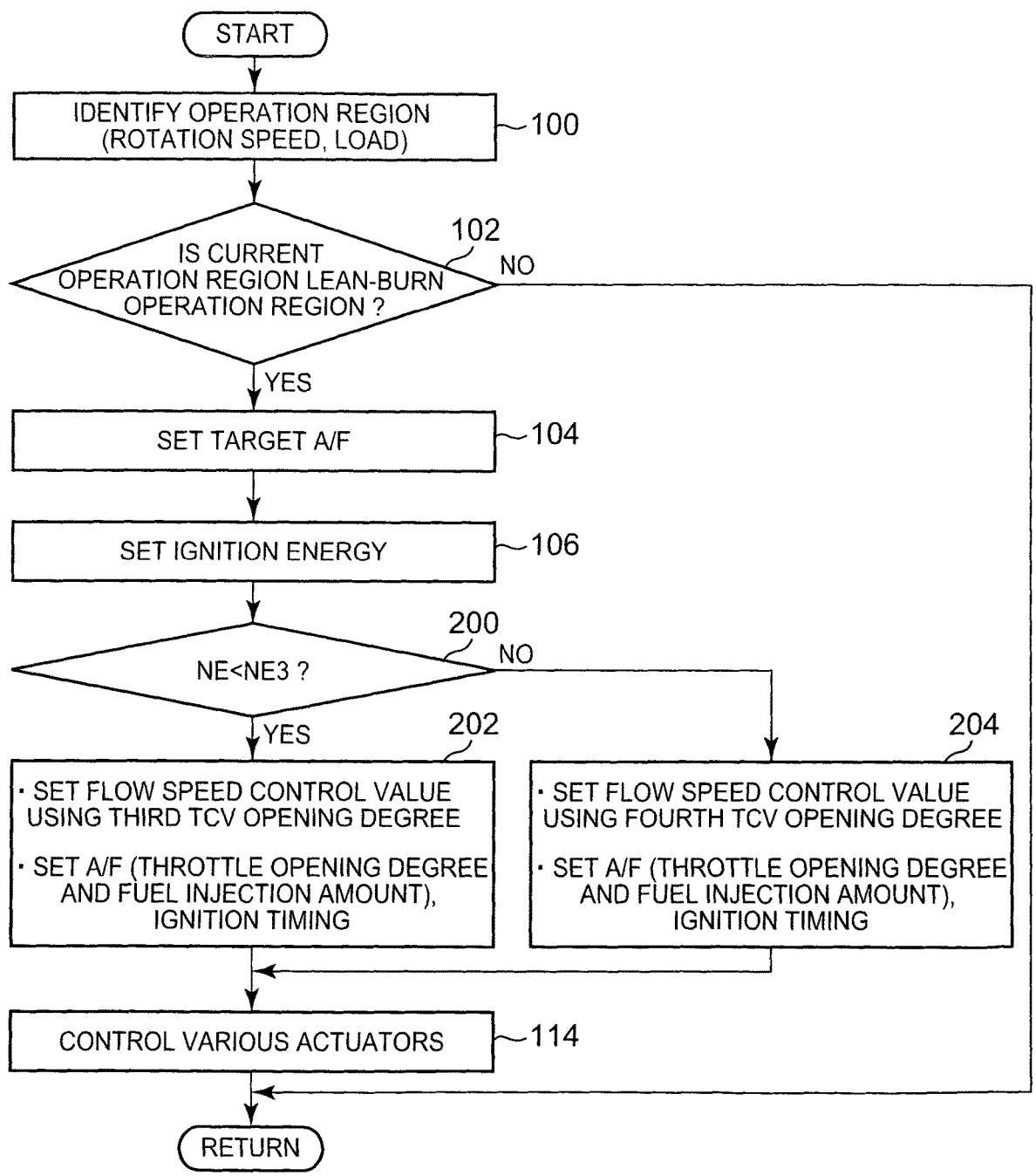
FIG. 26 is a flowchart of a routine that is executed according to the third embodiment of the invention.

FIG. 26 is a flowchart that shows a control routine that is executed by the ECU 40 in order to implement characteristic control according to the third embodiment of the invention. In FIG. 26, like step numbers denote the same steps as those of the steps shown in FIG. 13 in the second embodiment, and the description thereof is omitted or simplified.

In the routine shown in FIG. 26, after the ECU 40 determines the ignition energy in step 106, the ECU 40 determines whether the current engine rotation speed NE is lower than the third engine rotation speed NE3 (step 200). As described above, the third engine rotation speed NE3 is a threshold at the time of changing the tumble flow pattern on the basis of the engine rotation speed in the lean-burn operation region.

When affirmative determination is made in step 200 (NE<NE3), the ECU 40 sets the flow speed control value (target TCV opening degree) by using the third TCV opening degree, and sets the respective target values of the throttle opening degree, fuel injection amount and ignition timing for achieving a required torque at the target air-fuel ratio in accordance with the predetermined map, or the like (step 202). On the other hand, when negative determination is made in step 200 (NE≥NE3), the ECU 40 sets the flow speed control value (target TCV opening degree) by using the fourth TCV opening degree, and sets the respective target values of the throttle opening degree, fuel injection amount and ignition timing for achieving a required torque at the target air-fuel ratio in accordance with the predetermined map, or the like (step 204).

With the above-described routine shown in FIG. 26, by changing the tumble flow pattern between the ordinary tumble flow pattern and the in tumble flow pattern on the basis of the engine rotation speed with each TCV 24, it is possible to keep the near-plug flow speed during ignition within the optimal ignition range in the lean-burn operation region in response to whether the engine rotation speed is high or low. Therefore, it is possible to improve ignitability of air-fuel mixture during lean-burn operation.

With the method of controlling the gas flow in each cylinder according to the present embodiment, the amount of adjustment of the tumble ratio is small as compared to the method of controlling the near-plug flow speed by adjusting the tumble ratio without changing the tumble flow pattern as in the case of the above-described first embodiment, and the like. Thus, it is possible to improve ignitability by controlling the near-plug flow speed without reducing much of a turbulence of in-cylinder gas, which is important for combustion.

Incidentally, in the above-described third embodiment, in order to control whether to generate a tumble flow having an ω tumble flow pattern on the basis of the engine rotation speed in the lean-burn operation region, the TCV opening degree is controlled between the third TCV opening degree and the fourth TCV opening degree. At the third TCV opening degree, a tumble ratio larger than the tumble ratio within the range suitable for generating a tumble flow having an ω tumble flow pattern is obtained. At the fourth TCV opening degree, the tumble ratio within the range suitable for generating a tumble flow having an ω tumble flow pattern is obtained. However, instead of the third TCV opening degree, the TCV opening degree for not generating a tumble flow having an ω tumble flow pattern may be a predetermined TCV opening degree at which a tumble ratio smaller than the tumble ratio within the range suitable for generating a tumble flow having an ω tumble flow pattern.

In the above-described third embodiment, the "gas flow control means" is implemented by the ECU 40 executing the processes of step 200 to step 204 and step 114.

Next, a fourth embodiment of the invention will be described with reference to FIG. 27 and FIG. 28. A system according to the present embodiment is implemented by causing the ECU 40 to execute a routine shown in FIG. 28 (described later) instead of the routine shown in FIG. 26 by using the hardware configuration shown in FIG. 1.

Figure 27:
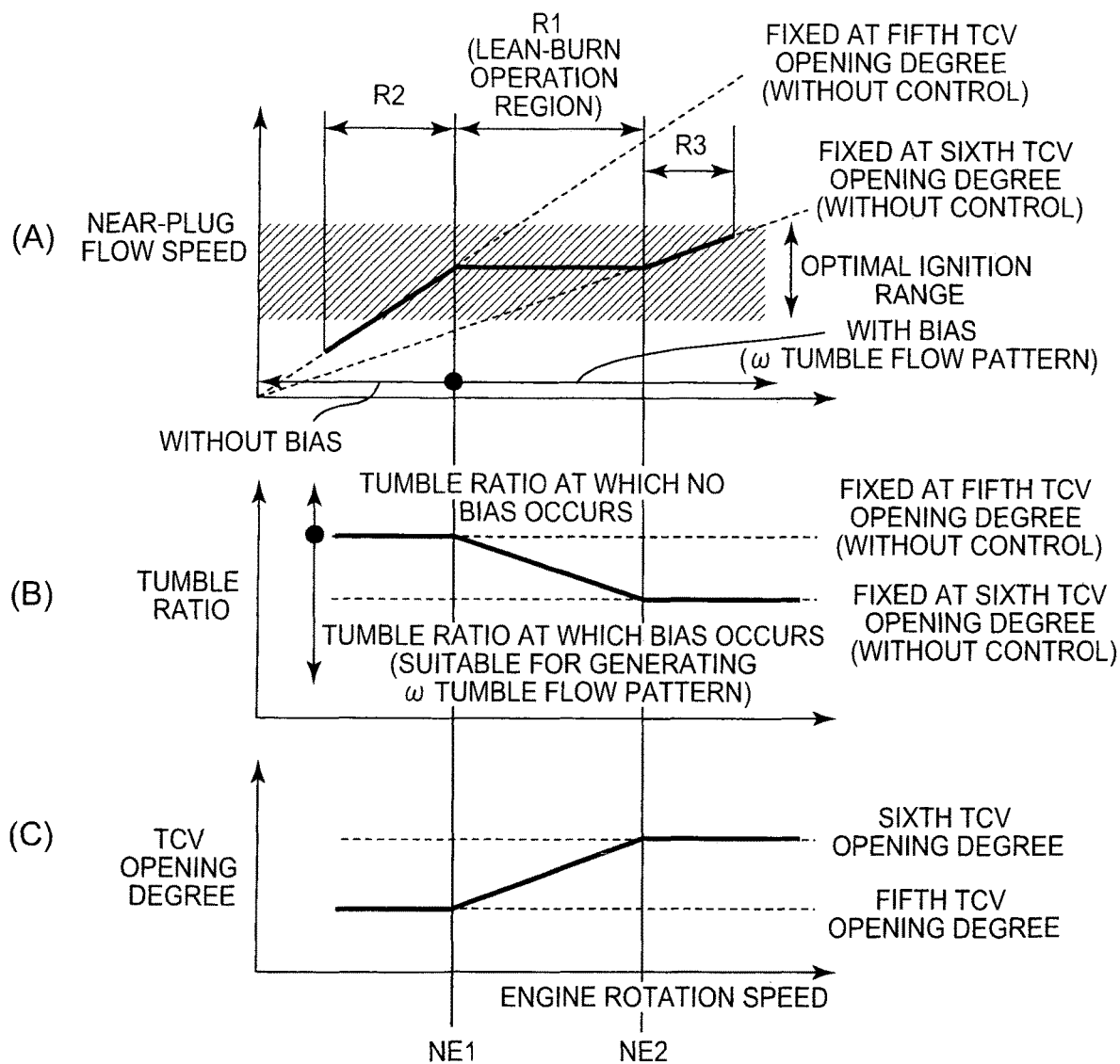
FIG. 27 shows graphs for illustrating a method of controlling the near-plug flow speed during ignition by controlling whether to generate a tumble flow having an ω tumble flow pattern by changing a tumble ratio with a TCV according to a fourth embodiment of the invention.

FIG. 27 shows graphs for illustrating a control example of the near-plug flow speed during ignition according to the fourth embodiment of the invention. In a method of controlling the gas flow in each cylinder in the present embodiment, the engine rotation speed region in which the near-plug flow speed is substantially constant against a change in the engine rotation speed is generated so that the near-plug flow speed falls within the optimal ignition range in the lean-burn operation region by controlling whether to generate a tumble flow having an ω tumble flow pattern on the basis of the engine rotation speed with the corresponding TCV 24. In the control method according to the present embodiment, by applying such an engine rotation speed region to the first engine rotation speed region R1 in the first operation region in which the lean-burn operation is carried out as shown in FIG. 27(A), the following near-plug flow speed-engine rotation speed characteristic is achieved. In the near-plug flow speed-engine rotation speed characteristic, the ratio of a change in the near-plug flow speed during ignition to a change in the engine rotation speed within the first engine rotation speed region R1 is smaller than the ratio in the second engine rotation speed region R2 or the second engine rotation speed region R3.

Specifically, in the second engine rotation speed region R2 that is lower in rotation speed than the first engine rotation speed region R1, the TCV opening degree is controlled to a fifth TCV opening degree for generating a tumble flow having an ordinary tumble flow pattern. The fifth TCV opening degree is an opening degree at which a tumble ratio near the boundary (upper limit in the example shown in FIG. 27) of a tumble ratio range suitable for generating a tumble flow having an ω tumble flow pattern.

As shown in FIG. 27(C), in the first engine rotation speed region R1, the TCV opening degree is gradually increased from the fifth TCV opening degree toward a sixth TCV opening degree with an increase in the engine rotation speed. As shown in FIG. 27(B), the tumble ratio is gradually reduced from the value near the boundary so that an turning angle of in-cylinder gas during one stroke is gradually reduced from a value near the boundary so that the tumble ratio approaches an optimal tumble ratio (the tumble ratio described with reference to FIG. 22A and FIG. 22B) within the above-described tumble ratio range with an increase in the engine rotation speed. As a result, in the first engine rotation speed region R1, a tumble flow having an ω tumble flow pattern is generated, and the generated flow having an ω tumble flow pattern is strengthened with an increase in the degree of bias of the vortex center of the tumble flow, resulting from an increase in the engine rotation speed.

The near-plug flow speed monotonously increases with an increase in the engine rotation speed where the tumble ratio is constant. As the flow having an ω tumble flow pattern is strengthened, the axial center position of the tumble flow at the center in the cylinder approaches the ignition plug 32 (the position of bending of the tumble axis gets higher). Therefore, as the flow having an ω tumble flow pattern is strengthened, it is possible to reduce the near-plug flow speed during ignition. Thus, in the first engine rotation speed region R1, the TCV opening degree is increased so that the function of an increase in the near-plug flow speed, resulting from an increase in the engine rotation speed, is cancelled by the function of a decrease in the near-plug flow speed, resulting from a strengthened flow having an ω tumble flow pattern. Thus, it is possible to obtain such a characteristic that the near-plug flow speed is substantially constant against a change in the engine rotation speed. In the case shown in FIG. 27, in the high rotation speed-side second engine rotation speed region R3, the TCV opening degree is fixed at the sixth TCV opening degree, so the near-plug flow speed monotonously increases with an increase in the engine rotation speed.

Figure 28:
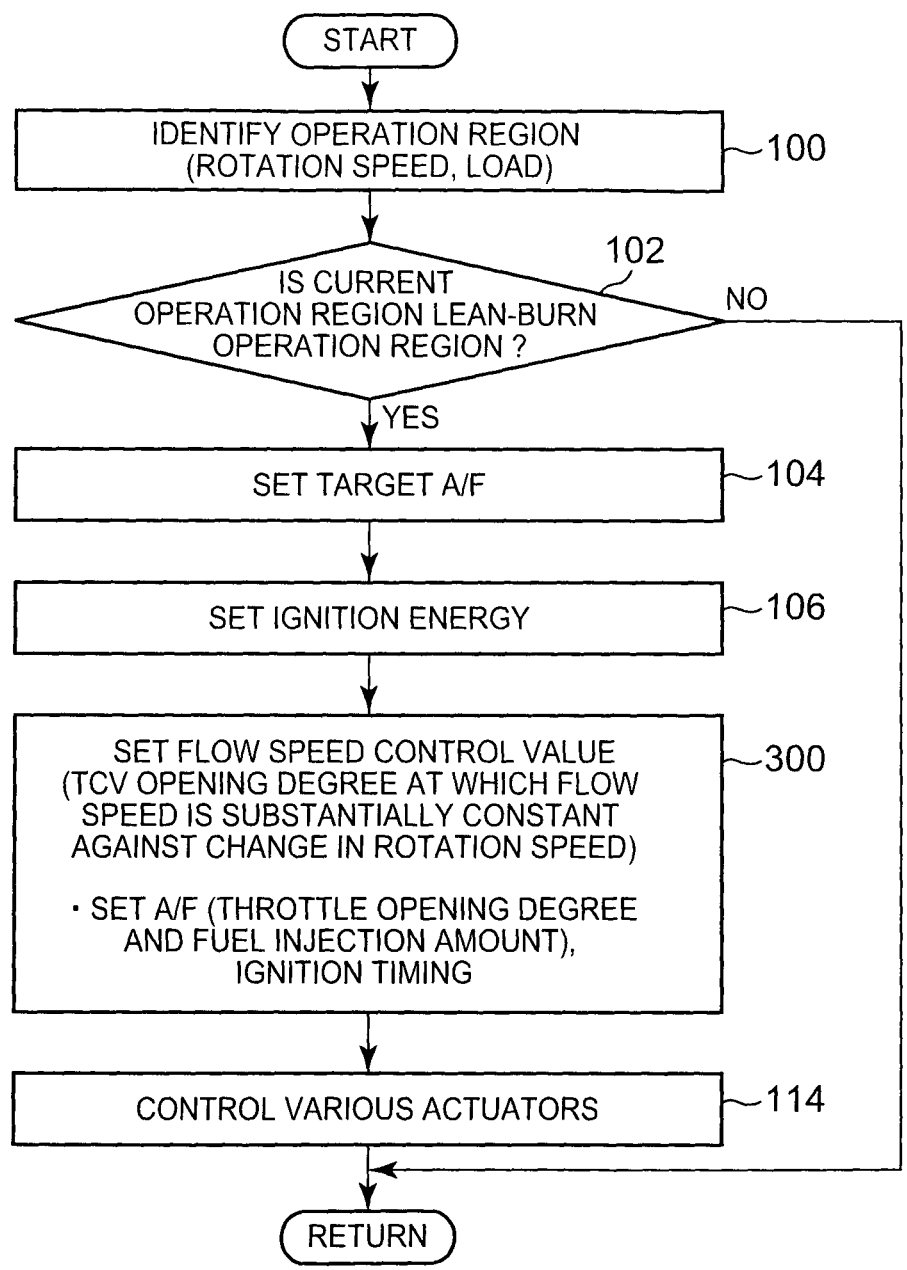
FIG. 28 is a flowchart of a routine that is executed according to the fourth embodiment of the invention.

FIG. 28 is a flowchart that shows a control routine that is executed by the ECU 40 in order to implement characteristic control according to the fourth embodiment of the invention. In FIG. 28, like step numbers denote the same steps as those of the steps shown in FIG. 26 in the third embodiment, and the description thereof is omitted or simplified.

In the routine shown in FIG. 28, after the ECU 40 sets the ignition energy in step 106, the ECU 40 sets the flow speed control value (the target TCV opening degree in the present embodiment) so that the near-plug flow speed is substantially constant against a change in the engine rotation speed, and sets respective target values of the throttle opening degree, fuel injection amount and ignition timing for achieving a required torque at the target air-fuel ratio in accordance with a predetermined map, or the like (step 300).

More specifically, in order to set the target TCV opening degree that is used in the first engine rotation speed region R1 in the lean-burn operation, the ECU 40 stores a map (not shown) that previously defines, through an experiment, or the like, the correlation between an engine rotation speed and a TCV opening degree at which it is possible to cancel the function of an increase in the near-plug flow speed, resulting from an increase in the engine rotation speed, by the function of a decrease in the near-plug flow speed, resulting from a strengthened flow having an ω tumble flow pattern. In step 300, the ECU 40 sets the target TCV opening degree (flow speed control value) based on the current engine rotation speed by consulting the map.

With the above-described routine shown in FIG. 28, by changing the pattern of the tumble flow between the ordinary tumble flow pattern and the ω tumble flow pattern on the basis of the engine rotation speed with each TCV 24, it is possible to control the near-plug flow speed during ignition in the lean-burn operation region (first engine rotation speed region R1) so that the near-plug flow speed is substantially constant against a change in the engine rotation speed. As is already described in the second embodiment, there is an optimal value at which a delay of ignition is minimum among the near-plug flow speeds within the optimal ignition range. With the control method according to the present embodiment, it is easy to control the near-plug flow speed so that such an optimal value is obtained, as compared to the control method according to the third embodiment. Therefore, it is possible to expand a lean limit while improving ignitability of air-fuel mixture during lean-burn operation.

Incidentally, in the above-described fourth embodiment, in order to obtain the characteristic that the near-plug flow speed is substantially constant against a change in the engine rotation speed in the first engine rotation speed region R1 within the first operation region in which the lean-burn operation is carried out, the TCV opening degree is controlled between the fifth TCV opening degree and the sixth TCV opening degree. At the fifth TCV opening degree, a tumble ratio near the boundary (upper limit) of the range of the tumble ratio suitable for generating a tumble flow having an ω tumble flow pattern is obtained. At the sixth TCV opening degree, the tumble ratio within the range suitable for generating a tumble flow having an ω tumble flow pattern is obtained. However, instead of the fifth TCV opening degree, the TCV opening degree that is used for such control may be a predetermined TCV opening degree at which a tumble ratio near the boundary (lower limit) of the range of the tumble ratio suitable for generating a tumble flow having an ω tumble flow pattern. More specifically, in the first engine rotation speed region R1, the TCV opening degree may be gradually reduced from the predetermined TCV opening degree toward the sixth TCV opening degree with an increase in the engine rotation speed. Thus, a turning angle of in-cylinder gas during one stroke is gradually increased from a value near the boundary so that the tumble ratio approaches an optimal tumble ratio within the above-described tumble ratio range with an increase in the engine rotation speed. As a result, with such an alternative method as well, in the first engine rotation speed region R1, a tumble flow having an ω tumble flow pattern is generated, and the generated flow having an ω tumble flow pattern is strengthened with an increase in the degree of bias of the vortex center of the tumble flow, resulting from an increase in the engine rotation speed.

In the above-described fourth embodiment, the "gas flow control means" is implemented by the ECU 40 executing the processes of step 300 and step 114.

Figure 29:
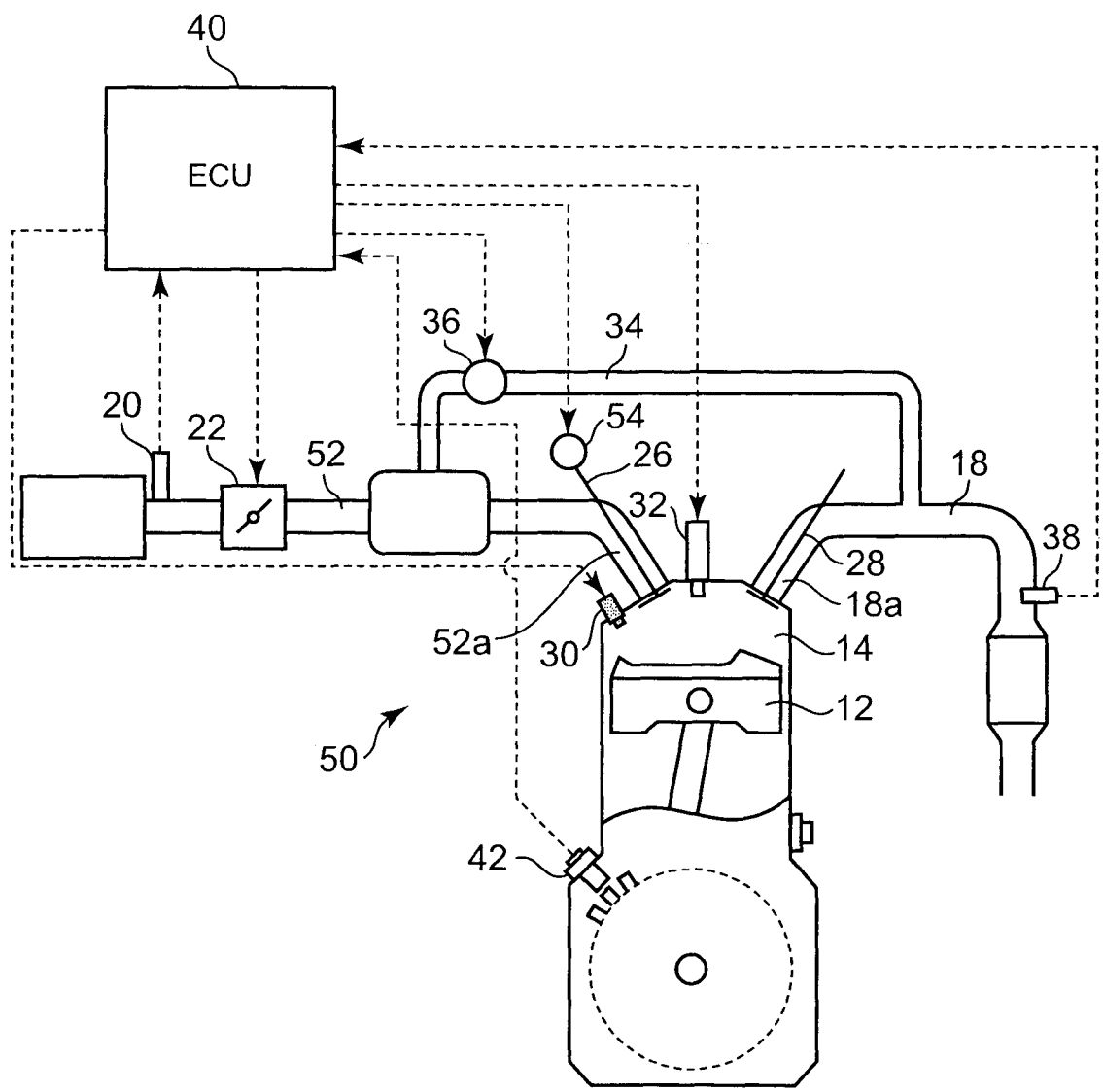
FIG. 29 is a schematic view for illustrating the system configuration of an internal combustion engine according to a fifth embodiment of the invention.

Next, a fifth embodiment of the invention will be described with reference to FIG. 29 to FIG. 33. FIG. 29 is a schematic view for illustrating the system configuration of an internal combustion engine 50 according to the fifth embodiment of the invention. In FIG. 29, like reference numerals denote the same elements as those shown in FIG. 1, and the description thereof is omitted or simplified.

The internal combustion engine 50 according to the present embodiment is similarly configured to the internal combustion engine 10 shown in FIG. 1 except that the internal combustion engine 50 is configured to be able to generate a tumble flow in each cylinder owing to the shape of each intake port 52a of an intake passage 52 without providing each TCV 24 and includes a variable intake valve actuating device 54. The variable intake valve actuating device 54 includes two cams having different profiles for driving the intake valves 26, and is able to change the valve lift characteristic of each intake valve 26 in two steps by changing the cams. A valve actuating device that is able to change the valve lift characteristic in two steps in this way is known, so the description of a specific configuration thereof is omitted here.

Figure 30:
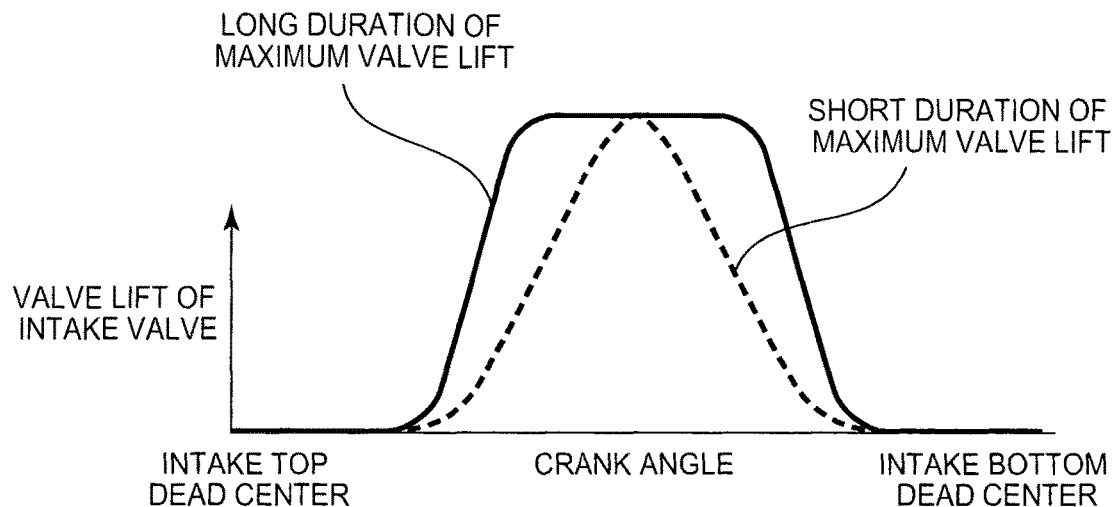
FIG. 30 is a graph for illustrating the valve lift characteristic of each intake valve, which is changed by a variable intake valve actuating device shown in FIG. 29.

FIG. 30 is a graph for illustrating the valve lift characteristic of each intake valve 26, which is changed by the variable intake valve actuating device 54 shown in FIG. 29. As shown in FIG. 30, the variable intake valve actuating device 54 changes the valve lift characteristic between an ordinary-form valve lift characteristic (dashed line) and a lift characteristic (continuous line) having a longer duration during which the valve lift is maximum than the valve lift characteristic indicated by the dashed line.

Figure 31A:
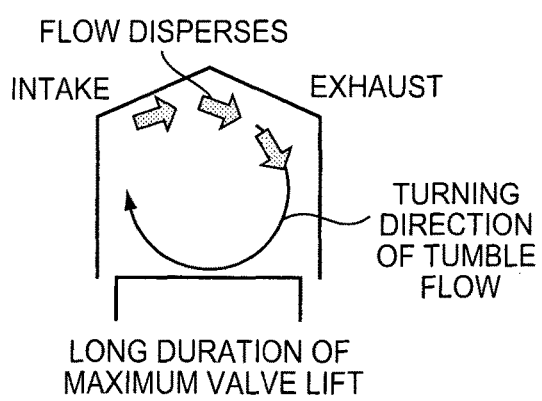
FIG. 31A and FIG. 31B are views for illustrating a change in gas flow in a cylinder with a change in the valve lift characteristic shown in FIG. 30.
Figure 31B:
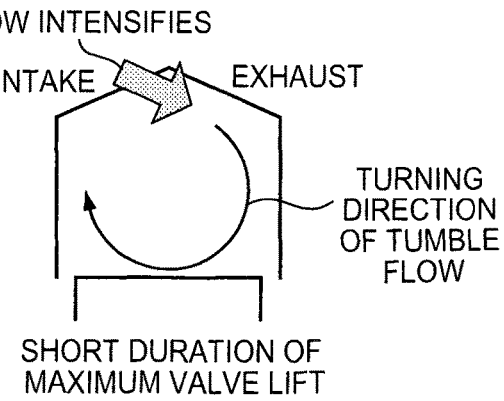

FIG. 31A and FIG. 31B are views for illustrating a change in gas flow in each cylinder with a change in the valve lift characteristic shown in FIG. 30. FIG. 31A and FIG. 31B show a state near the timing (in the intermediate stage of the intake stroke) at which intake air at a high flow rate flows into the cylinder because the speed of the piston 12 is maximum in the intake stroke and the valve lift of each intake valve 26 is high.

When the valve lift characteristic having a long duration of maximum valve lift is selected, intake air flows into the cylinder in a dispersed manner without forming a large mass near the timing at which intake air at a high flow rate flows in, as shown in FIG. 31A. On the other hand, when the valve lift characteristic having a short duration of maximum valve lift is selected, a large mass of intake air flows into the cylinder intensively near the above timing as shown in FIG. 31B. In this way, the variable intake valve actuating device 54 that is able to change the duration of maximum valve lift is an actuator that influences the gas flow in each cylinder.

Intake air mass is dispersed by extending the duration of maximum valve lift, with the result that it is possible to suppress a bias of the vortex center of the tumble flow with respect to the volume center of the combustion chamber 14 in the second half of the compression stroke. Thus, generation of a flow having an ω tumble flow pattern is suppressed, and a tumble flow having an ordinary tumble flow pattern is generated, so it is possible to increase the near-plug flow speed during ignition. On the other hand, intake air mass is intensified by shortening the duration of maximum valve lift, with the result that it is possible to generate a bias of the vortex center of the tumble flow. Thus, a tumble flow having an ω tumble flow pattern is generated, so it is possible to reduce the near-plug flow speed in comparison with that when a tumble flow having an ordinary tumble flow pattern is generated. In order to effectively generate a tumble flow having an w tumble flow pattern at the time when the duration of maximum valve lift is controlled to be short, it is desirable that each intake port 52a of the internal combustion engine 50 be configured to obtain the tumble ratio (the tumble ratio described with reference to FIG. 22A and FIG. 22B) suitable for generating a tumble flow having an ω tumble flow pattern.

In the present embodiment, by changing the duration of maximum valve lift of each intake valve 26 with the variable intake valve actuating device 54 on the basis of the engine rotation speed in the lean-burn operation region, the pattern of the tumble flow is changed between the ordinary tumble flow pattern and the ω tumble flow pattern. More specifically, the valve lift characteristic having a long duration of maximum valve lift is selected in the low rotation speed-side region within the lean-burn operation region, and the valve lift characteristic having a short duration of maximum valve lift is selected in the high rotation speed-side region.

Figure 32:
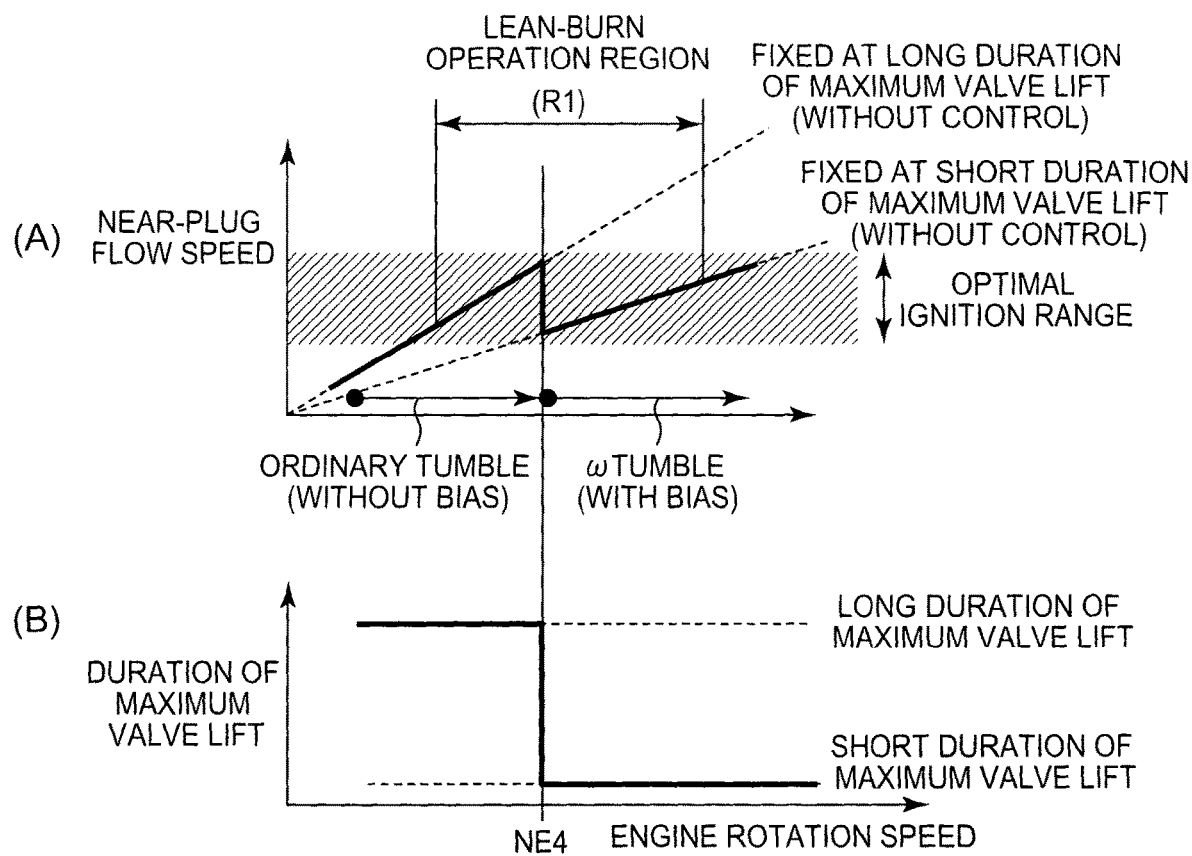
FIG. 32 shows graphs for illustrating a method of controlling the near-plug flow speed during ignition by controlling whether to generate a tumble flow having an ω tumble flow pattern by changing the duration of maximum valve lift with the variable intake valve actuating device.

Next, a control example according to the fifth embodiment will be described. FIG. 32 shows graphs for illustrating a method of controlling the near-plug flow speed during ignition by controlling whether to generate a tumble flow having an w tumble flow pattern by changing the duration of maximum valve lift with the variable intake valve actuating device 54. As described in the alternative embodiment to the first embodiment, the target flow speed range (optimal ignition range) that is used in the present embodiment is set on the basis of at least one of the air-fuel ratio in each cylinder, the ignition energy, the EGR rate and the in-cylinder temperature.

As shown in FIG. 32, if the valve lift characteristic having a long duration of maximum valve lift is continuously used irrespective of the engine rotation speed, the near-plug flow speed falls outside the optimal ignition range according to the present embodiment in the high rotation speed-side region within the lean-burn operation region because of an increase in the gas flow speed, resulting from an increase in the engine rotation speed. Similarly, if the valve lift characteristic having a short duration of maximum valve lift is continuously used, the near-plug flow speed falls outside the optimal ignition range in the low rotation speed-side region.

In the case shown in FIG. 32, by using the valve lift characteristic having a long duration of maximum valve lift in the low rotation speed-side region within the lean-burn operation region, it is possible to cause the near-plug flow speed to fall within the optimal ignition range by utilizing a tumble flow having an ordinary tumble flow pattern. In the present embodiment, in the engine rotation speed region lower than a fourth engine rotation speed NE4 at which the upper limit of the optimal ignition range is reached if the valve lift characteristic having a long duration of maximum valve lift remains continuously used, the valve lift characteristic having a long duration of maximum valve lift is selected.

On the other hand, in an engine rotation speed region higher than or equal to the fourth engine rotation speed NE4, the valve lift characteristic having a short duration of maximum valve lift is selected. Thus, as shown in FIG. 32(A), by generating a tumble flow having an ω tumble flow pattern, it is possible to reduce the near-plug flow speed near the fourth engine rotation speed NE4 at which the tumble flow pattern is changed. In this way, by changing the tumble flow pattern on the basis of the engine rotation speed, it is possible to keep the near-plug flow speed during ignition within the optimal ignition range in the lean-burn operation region. When the valve lift characteristic is changed, the opening degree of the throttle valve 22 is adjusted in order to cancel a change in the intake air amount.

In the method shown in FIG. 32, in a region higher in rotation speed than the fourth engine rotation speed NE4, a single valve lift characteristic having a short duration of maximum valve lift is used. However, instead of the above method, the duration of maximum valve lift in the lean-burn operation region may be continuously changed on the basis of the engine rotation speed with a variable valve actuating device of an electromagnetically drive type, the type of driving the cam with an electric motor, or the like, in order to drive each intake valve 26. That is, with such a method, the near-plug flow speed may be controlled further minutely so that the near-plug flow speed during lean-burn operation becomes a desired value.

Figure 33:
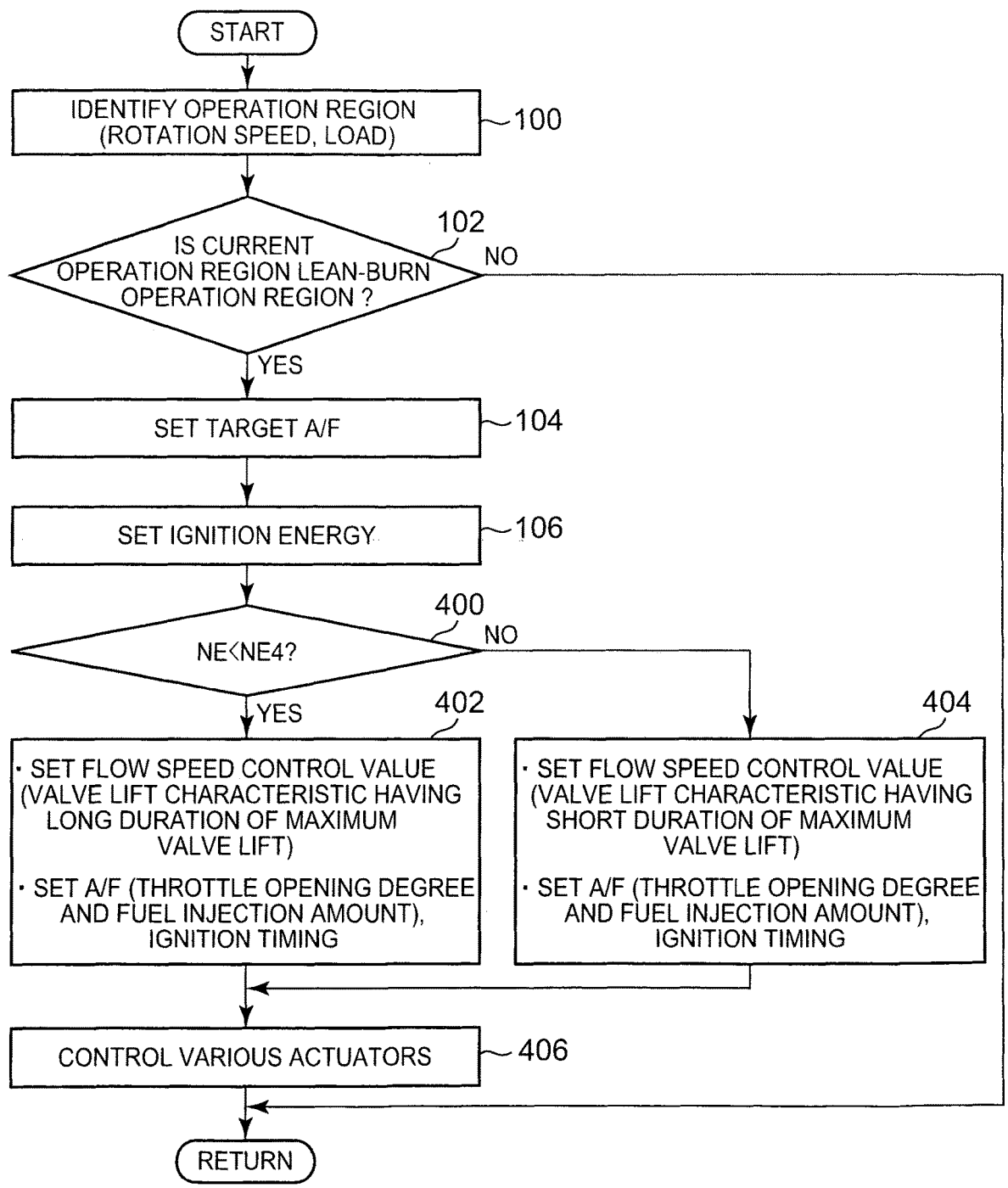
FIG. 33 is a flowchart of a routine that is executed according to the fifth embodiment of the invention.

FIG. 33 is a flowchart that shows a control routine that is executed by the ECU 40 in order to implement characteristic control according to the fifth embodiment of the invention. In FIG. 33, like step numbers denote the same steps as those of the steps shown in FIG. 26 in the third embodiment, and the description thereof is omitted or simplified.

In the routine shown in FIG. 33, after the ECU 40 determines the ignition energy in step 106, the ECU 40 determines whether the current engine rotation speed NE is lower than the fourth engine rotation speed NE4 (step 400). As described above, the fourth engine rotation speed NE4 is a threshold at the time of changing the tumble flow pattern on the basis of the engine rotation speed in the lean-burn operation region.

When affirmative determination is made in step 400 (NE<NE4), the ECU 40 selects the cam for the valve lift characteristic having a long duration of maximum valve lift as the flow speed control value (target valve lift characteristic), and sets the respective target values of the throttle opening degree, fuel injection amount and ignition timing for achieving a required torque at the target air-fuel ratio in accordance with the predetermined map, or the like (step 402). On the other hand, when negative determination is made in step 400 (NE≥NE4), the ECU 40 selects the cam for the valve lift characteristic having a short duration of maximum valve lift as the flow speed control value (target valve lift characteristic), and sets the respective target values of the throttle opening degree, fuel injection amount and ignition timing for achieving a required torque at the target air-fuel ratio in accordance with the predetermined map, or the like (step 404). Subsequently, the ECU 40 controls the various actuators (the throttle valve 22, the fuel injection valves 30, the ignition plugs 32 and the variable intake valve actuating device 54) in accordance with the set various target values (step 406).

With the above-described routine shown in FIG. 33, by changing the tumble flow pattern between the ordinary tumble flow pattern and the ω tumble flow pattern on the basis of the engine rotation speed with the variable intake valve actuating device 54 that is able to change the duration of maximum valve lift, it is possible to keep the near-plug flow speed during ignition within the optimal ignition range in the lean-burn operation region in response to whether the engine rotation speed is high or low. With the method of controlling the gas flow in each cylinder according to the present embodiment, it is possible to control whether to form a bias of the vortex center of the tumble flow (tumble pattern) without using control over the tumble ratio itself (that is, without reducing a turbulence of in-cylinder gas, which is important for combustion). Therefore, it is possible to improve ignitability of air-fuel mixture during lean-burn operation while expanding a lean limit (improving fuel economy).

In the above-described fifth embodiment, the "gas flow control means" is implemented by the ECU 40 executing the processes of step 400 to step 406.

Figure 34:
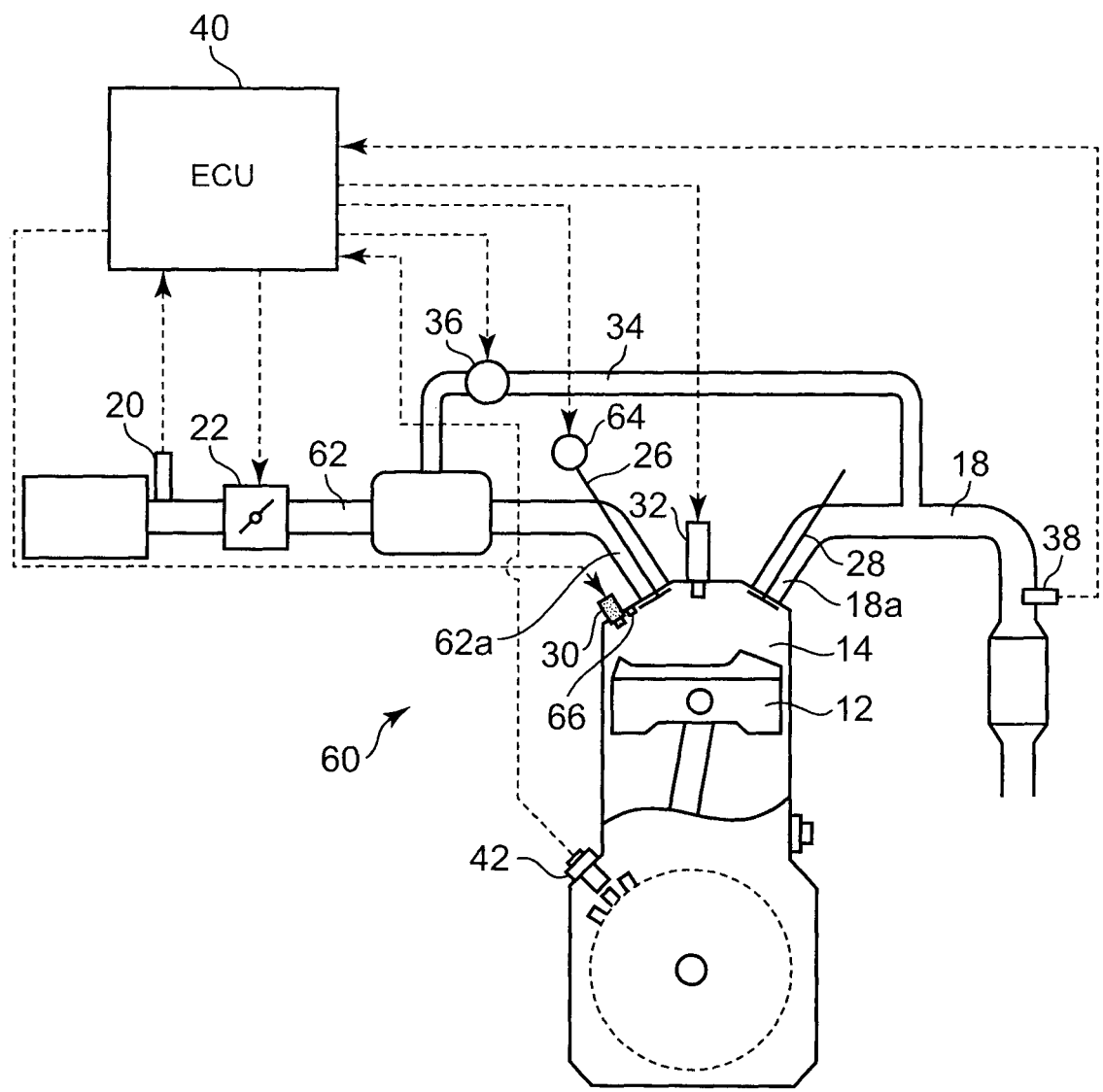
FIG. 34 is a schematic view for illustrating the system configuration of an internal combustion engine according to a sixth embodiment of the invention.

Next, a sixth embodiment of the invention will be described with reference to FIG. 34 and FIG. 38. FIG. 34 is a schematic view for illustrating the system configuration of an internal combustion engine 60 according to the sixth embodiment of the invention. In FIG. 34, like reference numerals denote the same elements as those shown in FIG. 1, and the description thereof is omitted or simplified.

The internal combustion engine 60 according to the present embodiment is similarly configured to the internal combustion engine 10 shown in FIG. 1 except that the internal combustion engine 60 is configured to be able to generate a tumble flow in each cylinder owing to the pattern of each intake port 62a of an intake passage 62 without providing each TCV 24 and includes a variable intake valve actuating device 64 and protruded portions 66. The variable intake valve actuating device 64 is able to continuously change the valve lift of each intake valve 26. A valve actuating device having such a function is known, so the description of a specific configuration thereof is omitted here.

FIG. 35 is a view for illustrating the detailed configuration of each protruded portion 66 shown in FIG. 34. FIG. 35 is a view when the combustion chamber 14 is viewed from the lower side of the cylinder. Each protruded portion 66 is formed on the wall surface of the combustion chamber 14 in correspondence with a corresponding one of the intake ports 62a provided two by two for each cylinder. Each protruded portion 66 surrounds the outlet of the corresponding intake port 62a except a center-side portion (a portion near the ignition plug 32) of the combustion chamber 14.

Figure 36:
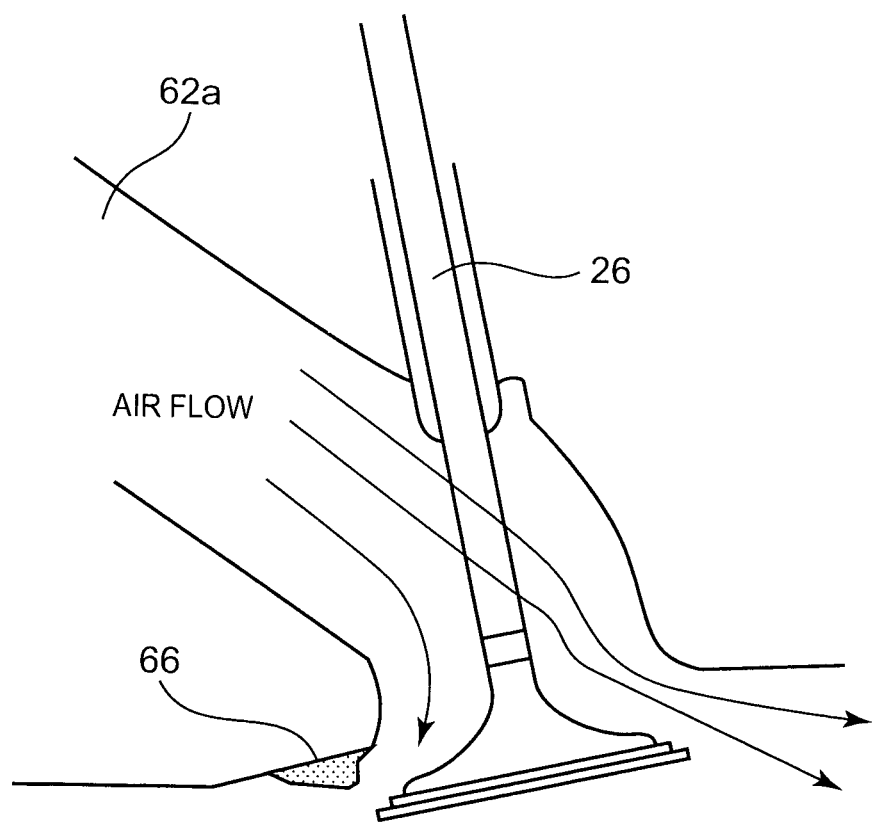
FIG. 36 is a cross-sectional view of a configuration around each intake port, taken along the line XXXVI-XXXVI in FIG. 35.

FIG. 36 is a cross-sectional view of a configuration around each intake port 62a, taken along the line XXXVI-XXXVI in FIG. 35. Because the protruded portion 66 formed as described above is provided, intake air flowing from each intake port 62a is difficult to flow toward the portion at which the protruded portion 66 is provided because of a narrow clearance as shown in FIG. 36. On the other hand, intake air is easy to flow toward the center-side portion of the combustion chamber 14 at which no protruded portion 66 is provided. Therefore, as indicated by the arrows in FIG. 35, it is possible to intensify intake air flowing in from the intake ports 62a toward the center side of the combustion chamber 14. Such a tendency is remarkable because the advantageous effect of each protruded portion 66 increases as the valve lift of the corresponding intake valve 26 reduces. Thus, by reducing the valve lift of each intake valve 26, it is possible to further actively intensify intake air flowing in from the intake ports 62a toward the center side of the combustion chamber 14. In this way, a combination of each protruded portion 66 with the variable intake valve actuating device 64 that is able to change the valve lift of each intake valve 26 is a device that influences the gas flow in each cylinder.

Each intake port 62a of the internal combustion engine 60 according to the present embodiment is assumed to be configured such that the tumble ratio (the tumble ratio described with reference to FIG. 22A and FIG. 22B) suitable for generating a tumble flow having an ω tumble flow pattern. In the thus configured internal combustion engine 60, increasing the ratio of the flow rate of intake air toward the center-side portion of the combustion chamber 14 increases the degree of bias of the vortex center of the tumble flow with respect to the volume center of the combustion chamber 14. As the degree of bias of the vortex center of the tumble flow increases, the flow having an ω tumble flow pattern is strengthened. Thus, the ratio of the flow rate of intake air toward the center-side portion of the combustion chamber 14 is changed by changing the valve lift of each intake valve 26 with the variable intake valve actuating device 64, with the result that it is possible to control the strength of the flow having an ω tumble flow pattern. In this way, with the configurator according to the present embodiment, it is possible to control the flow having an ω tumble flow pattern by utilizing the fact that the directivity of intake air changes with the valve lift of each intake valve 26 owing to the corresponding protruded portion 66. As is already described, strengthening the flow having an ω tumble flow pattern leads to a decrease in the near-plug flow speed during ignition.

In the present embodiment, the protruded portions 66 formed as described above are provided, and then, by reducing the valve lift of each intake valve 26 in the case where the engine rotation speed is high as compared to the valve lift in the case where the engine rotation speed is low with the variable intake valve actuating device 64, the near-plug flow speed during ignition in the first engine rotation speed region R1 within the first operation region in which the lean-burn operation is carried out is caused to fall within the optimal ignition range. That is, the strength of the flow having an ω tumble flow pattern is controlled so that the ratio of a change in the near-plug flow speed during ignition to a change in the engine rotation speed within the first engine rotation speed region R1 is smaller than the ratio in the second engine rotation speed region R2 or the second engine rotation speed region R3.

Figure 37:
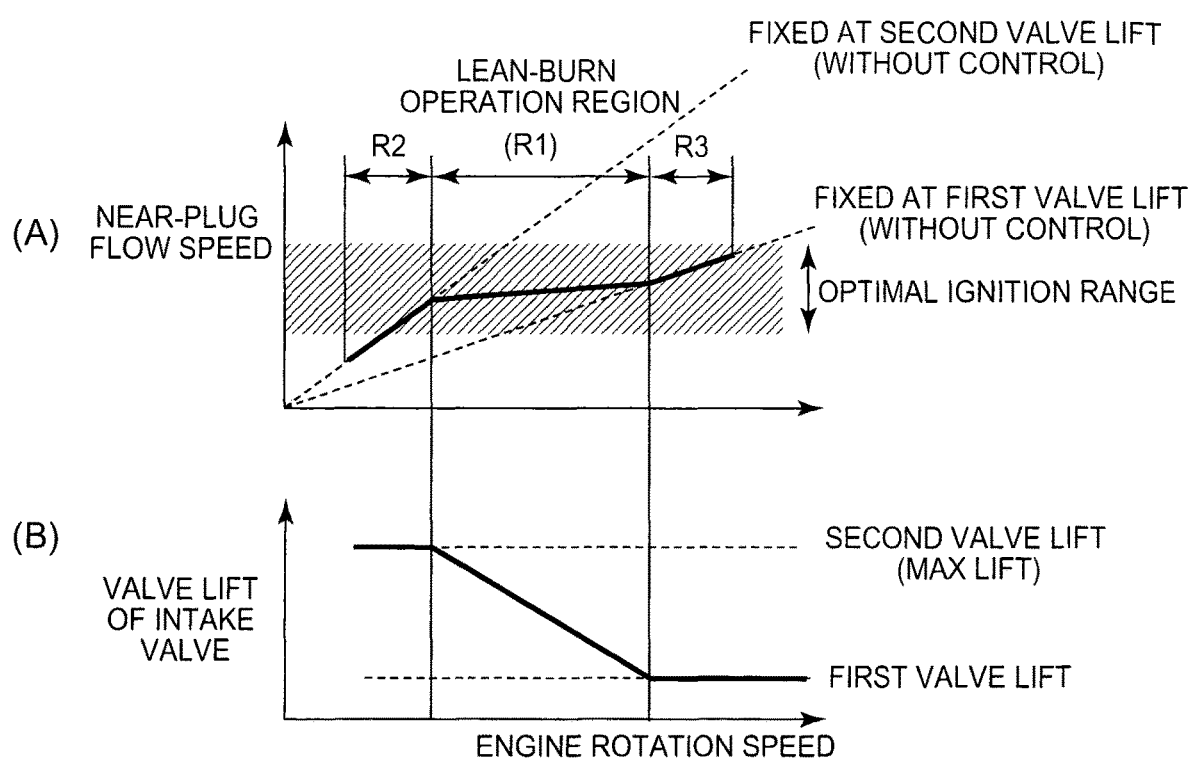
FIG. 37 shows graphs for illustrating characteristic control over the near-plug flow speed during ignition according to the sixth embodiment of the invention.

FIG. 37 shows graphs for illustrating a control example of the near-plug flow speed during ignition according to the sixth embodiment of the invention.

In this control example, in the first engine rotation speed region R1 within the first operation region in which the lean-burn operation is carried out, the valve lift of each intake valve 26 is controlled by the variable intake valve actuating device 64 so as to decrease as the engine rotation speed increases, as shown in FIG. 37(B). As indicated by the dashed line in FIG. 37(A), in the case shown in FIG. 37, if the valve lift of each intake valve 26 remains fixed at a second valve lift (for example, a maximum valve lift), the near-plug flow speed falls outside the optimal ignition range because of an increase in the gas flow speed, resulting from an increase in the engine rotation speed. Therefore, in the case of FIG. 37, in the first engine rotation speed region R1, the flow having an ω tumble flow pattern is strengthened by reducing the valve lift of each intake valve 26 with an increase in the engine rotation speed. In the case shown in FIG. 37, in the high rotation speed-side second engine rotation speed region R3, the valve lift of each intake valve 26 is fixed at a first valve lift smaller than the second valve lift, so the near-plug flow speed monotonously increases with an increase in the engine rotation speed.

As described above, by controlling the strength of the flow having an ω tumble flow pattern on the basis of a change in the engine rotation speed through control over the valve lift of each intake valve 26, it is possible to control a gas flow in each cylinder so that the following near-plug flow speed-engine rotation speed characteristic is obtained. In the near-plug flow speed-engine rotation speed characteristic, the ratio of a change in the near-plug flow speed during ignition to a change in the engine rotation speed within the first engine rotation speed region R1 in which the lean-burn operation is carried out is smaller than that in the second engine rotation speed region R2 or the second engine rotation speed region R3.

The internal combustion engine 60 that is assumed to include the intake ports 62a configured to obtain the tumble ratio that satisfies the condition of generating a tumble flow having an ω tumble flow pattern is described as an example. However, a method of controlling the near-plug flow speed during ignition by utilizing the protruded portions 66 and a change in the valve lift of each intake valve 26 according to the present embodiment may be configured as follows as long as the above-described near-plug flow speed-engine rotation speed characteristic is obtained. A change in the pattern of the tumble flow from the ordinary tumble flow pattern to the ω tumble flow pattern occurs because of a change in the valve lift of each intake valve 26 in the first engine rotation speed region R1 by applying the above control method to an internal combustion engine assumed to include intake ports configured to obtain a flow having an ordinary tumble flow pattern.

Figure 38:
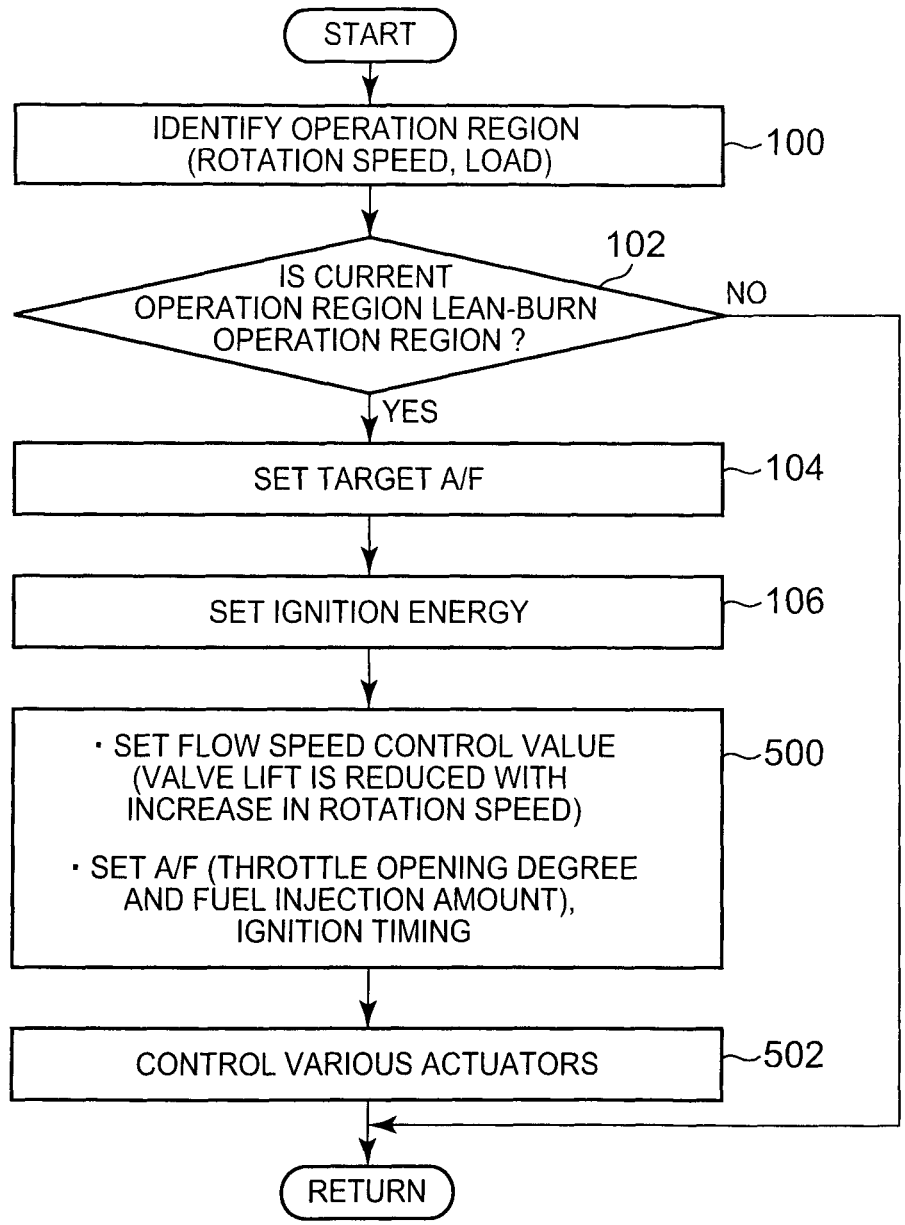
FIG. 38 is a flowchart of a routine that is executed according to the sixth embodiment of the invention.

FIG. 38 is a flowchart that shows a control routine that is executed by the ECU 40 in order to implement characteristic control according to the sixth embodiment of the invention. In FIG. 38, like step numbers denote the same steps as those of the steps shown in FIG. 26 in the third embodiment, and the description thereof is omitted or simplified.

In the routine shown in FIG. 38, after the ECU 40 sets the ignition energy in step 106, the ECU 40 sets the flow speed control value (a target valve lift of each intake valve 26 in the present embodiment) on the basis of the engine rotation speed, and sets respective target values of the throttle opening degree, fuel injection amount and ignition timing for achieving a required torque at the target air-fuel ratio in accordance with the predetermined map, or the like (step 500). More specifically, the ECU 40 stores a map (not shown) that defines the correlation between the engine rotation speed and the valve lift of each intake valve 26 as is set in the first engine rotation speed region R1 in FIG. 37(B), and calculates the target valve lift of each intake valve 26 so that the target valve lift decreases with an increase in the current engine rotation speed by consulting the map in step 500. Subsequently, the ECU 40 controls the various actuators (the throttle valve 22, the fuel injection valves 30, the ignition plugs 32 and the variable intake valve actuating device 64) in accordance with the set various target values (step 502).

With the above-described routine shown in FIG. 38, it is possible to obtain the above-described near-plug flow speed-engine rotation speed characteristic by utilizing a combination of the protruded portions 66 with control over the valve lift of each intake valve 26. With the method of controlling the gas flow in each cylinder according to the present embodiment, it is possible to keep the near-plug flow speed during ignition within the optimal ignition range irrespective of whether the engine rotation speed is high or low without using control over the tumble ratio itself (that is, without reducing a turbulence of in-cylinder gas, which is important for combustion). Therefore, it is possible to improve ignitability of air-fuel mixture during lean-burn operation while expanding a lean limit (improving fuel economy).

In the above-described sixth embodiment, the "gas flow control means" is implemented by the ECU 40 executing the processes of step 500 and step 502.

Next, a seventh embodiment of the invention will be described with reference to FIG. 39 to FIG. 42. FIG. 39 is a schematic view for illustrating the detailed configuration of each protruded portion 72 provided in an internal combustion engine 70 according to the seventh embodiment of the invention.

The internal combustion engine 70 according to the seventh embodiment is similarly configured to the above-described internal combustion engine 60 except that the protruded portions 72 are provided instead of the protruded portions 66 according to the sixth embodiment. Each protruded portion 72 in the present embodiment is formed on the wall surface of the combustion chamber 14 in correspondence with a corresponding one of the intake ports 62a provided two by two for each cylinder. Each protruded portion 72 surrounds the outlet of the corresponding intake port 62a only at a center-side portion (a portion near the ignition plug 32) of the combustion chamber 14.

Figure 40:
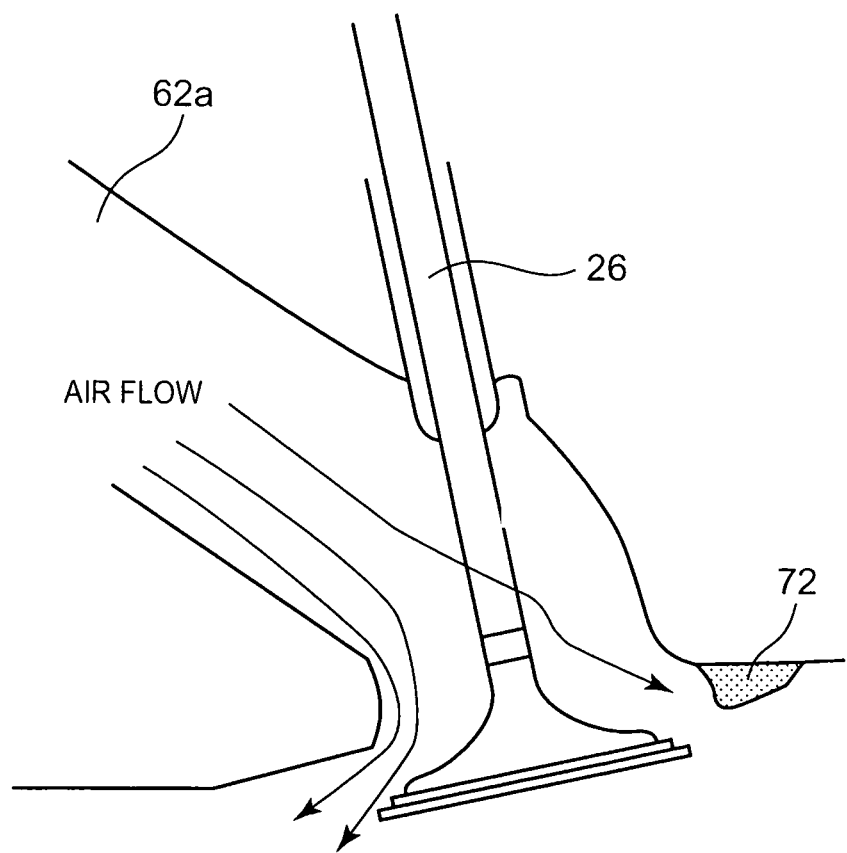
FIG. 40 is a cross-sectional view of a configuration around each intake port, taken along the line XL-XL in FIG. 39.

FIG. 40 is a cross-sectional view of a configuration around each intake port 62a, taken along the line XL-XL in FIG. 39. Because the protruded portion 72 formed as described above is provided, intake air flowing from each intake port 62a is difficult to flow toward the center-side portion of the combustion chamber 14 at which the protruded portion 72 is provided because of a narrow clearance, and is easy to flow toward the remaining portion at which no protruded portion 72 is provided, as shown in FIG. 40. Such a tendency is remarkable because the advantageous effect of each protruded portion 72 increases as the valve lift of the corresponding intake valve 26 reduces. In other words, by increasing the valve lift of each intake valve 26, the ratio of the flow rate of intake air toward the center side of the combustion chamber 14 within intake air flowing in from each intake port 62a is increased as compared to the case where the valve lift of each intake valve 26 is relatively small, with the result that it is possible to strengthen the flow having an ω tumble flow pattern.

In the present embodiment, the protruded portions 72 formed as described above are provided, and then, by increasing the valve lift of each intake valve 26 with the variable intake valve actuating device 64 in the case where the engine rotation speed is high as compared to the case where the engine rotation speed is low, the strength of the flow having an ω tumble flow pattern is controlled so that the ratio of a change in the near-plug flow speed during ignition to a change in the engine rotation speed within the first engine rotation speed region R1 is smaller than the ratio in the second engine rotation speed region R2 or the second engine rotation speed region R3 in order to cause the near-plug flow speed during ignition in the first engine rotation speed region R1 within the first operation region in which the lean-burn operation is carried out to fall within the optimal ignition range.

Figure 41:
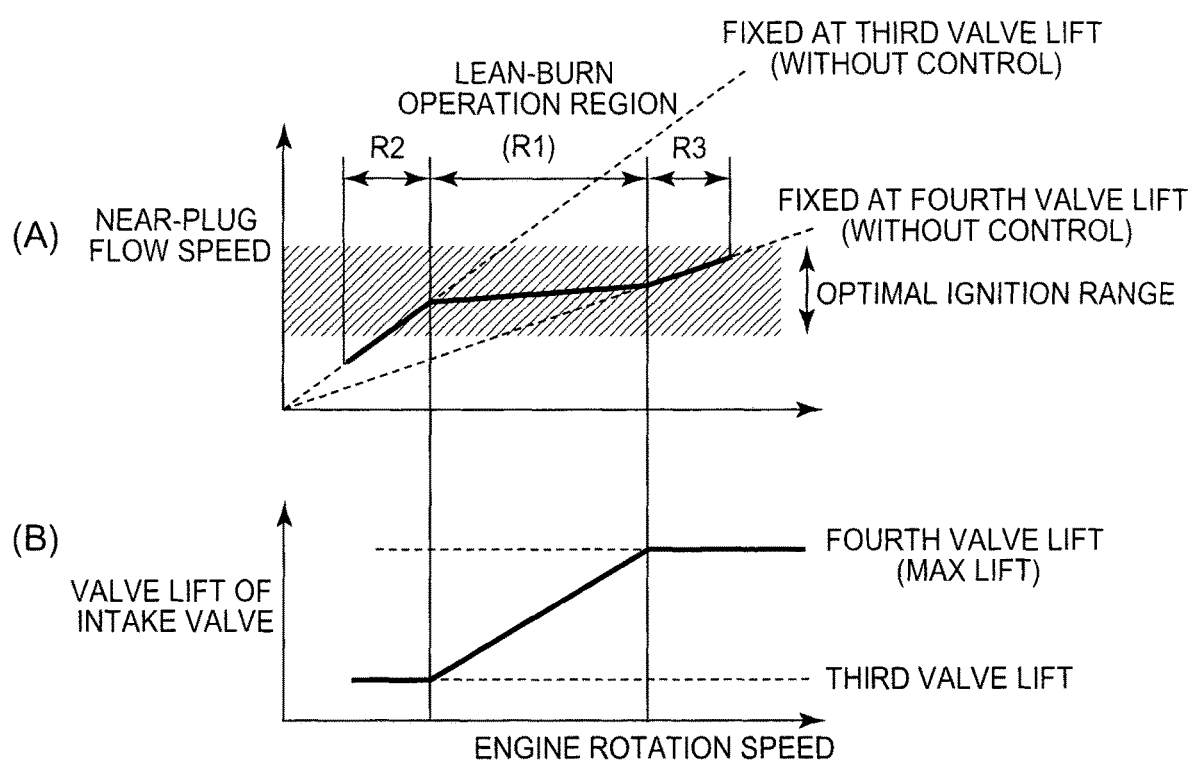
FIG. 41 shows graphs for illustrating characteristic control over the near-plug flow speed during ignition according to the seventh embodiment of the invention.

FIG. 41 shows graphs for illustrating a control example of the near-plug flow speed during ignition according to the seventh embodiment of the invention.

In this control example, in the first engine rotation speed region R1 within the first operation region in which the lean-burn operation is carried out, the valve lift of each intake valve 26 is controlled by the variable intake valve actuating device 64 so as to increase as the engine rotation speed increases, as shown in FIG. 41(B). As indicated by the dashed line in FIG. 41(A), in the case shown in FIG. 41, if the valve lift of each intake valve 26 remains fixed at a third valve lift, the near-plug flow speed falls outside the optimal ignition range because of an increase in the gas flow speed, resulting from an increase in the engine rotation speed. Therefore, in the case of FIG. 41, in the first engine rotation speed region R1, the flow having an ω tumble flow pattern is strengthened by increasing the valve lift of each intake valve 26 with an increase in the engine rotation speed. In the case shown in FIG. 41, in the high rotation speed-side second engine rotation speed region R3, the valve lift of each intake valve 26 is fixed at a fourth valve lift (for example, a maximum valve lift) larger than the third valve lift, so the near-plug flow speed monotonously increases with an increase in the engine rotation speed.

As described above, with the method according to the present embodiment as well, by controlling the strength of the flow having an ω tumble flow pattern on the basis of a change in the engine rotation speed through control over the valve lift of each intake valve 26, it is possible to control a gas flow in each cylinder so that the following near-plug flow speed-engine rotation speed characteristic is obtained. In the near-plug flow speed-engine rotation speed characteristic, the ratio of a change in the near-plug flow speed during ignition to a change in the engine rotation speed within the first engine rotation speed region R1 in which the lean-burn operation is carried out is smaller than the ratio in the second engine rotation speed region R2 or the second engine rotation speed region R3.

As in the case of the sixth embodiment, a method of controlling the near-plug flow speed during ignition by utilizing the protruded portions 72 and a change in the valve lift of each intake valve 26 according to the present embodiment may be configured as follows as long as the above-described near-plug flow speed-engine rotation speed characteristic is obtained. A change in the pattern of the tumble flow from the ordinary tumble flow pattern to the ω tumble flow pattern occurs because of a change in the valve lift of each intake valve 26 in the first engine rotation speed region R1 by applying the above control method to an internal combustion engine assumed to include intake ports configured to obtain a flow having an ordinary tumble flow pattern.

Figure 42:
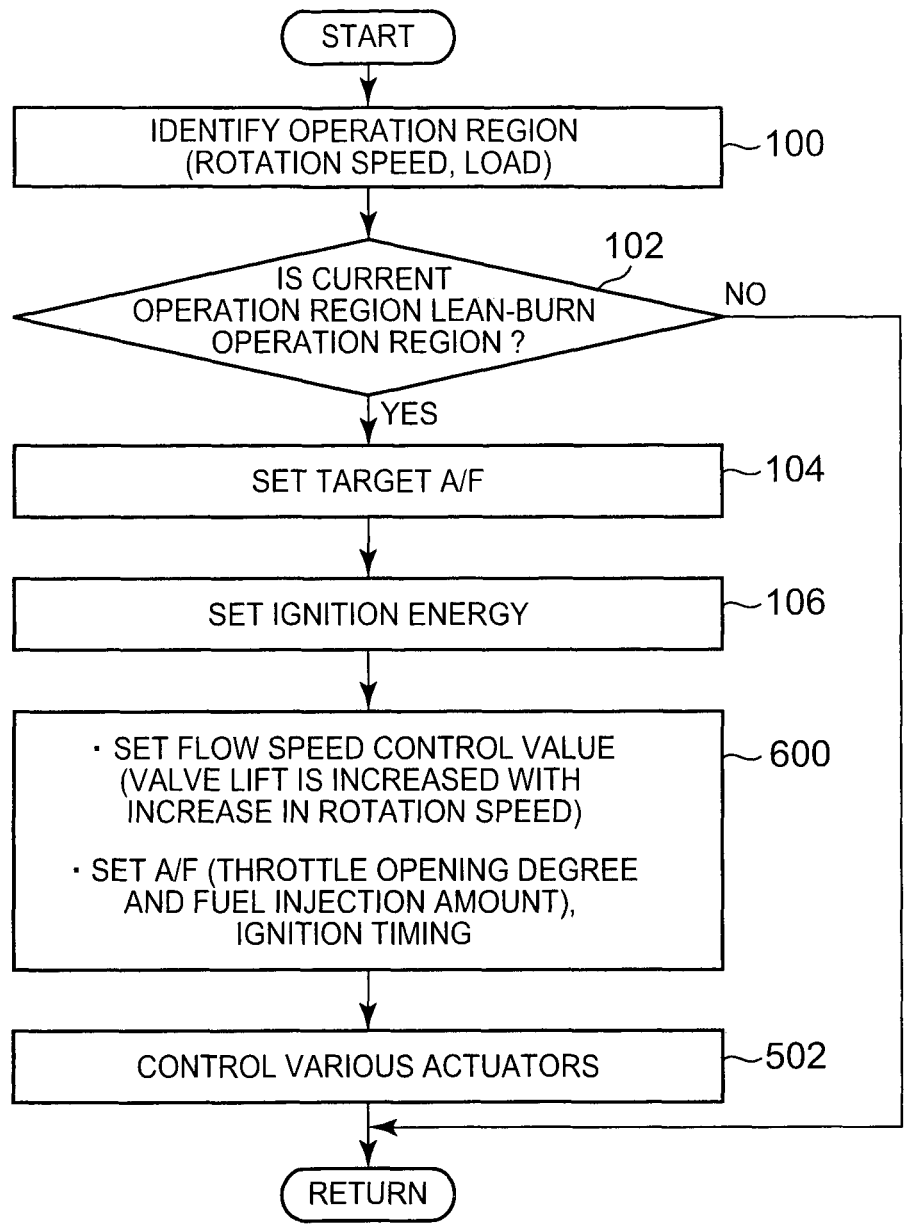
FIG. 42 is a flowchart of a routine that is executed according to the seventh embodiment of the invention.

FIG. 42 is a flowchart that shows a control routine that is executed by the ECU 40 in order to implement characteristic control according to the seventh embodiment of the invention. In FIG. 42, like step numbers denote the same steps as those of the steps shown in FIG. 38 in the sixth embodiment, and the description thereof is omitted or simplified.

In the routine shown in FIG. 42, after the ECU 40 determines the ignition energy in step 106, the ECU 40 sets the flow speed control value (a target valve lift of each intake valve 26 in the present embodiment) on the basis of the engine rotation speed, and sets respective target values of the throttle opening degree, fuel injection amount and ignition timing for achieving a required torque at the target air-fuel ratio in accordance with the predetermined map, or the like (step 600). More specifically, the ECU 40 stores a map (not shown) that defines the correlation between the engine rotation speed and the valve lift of each intake valve 26 as is set in the first engine rotation speed region R1 in FIG. 41(B), and calculates the target valve lift of each intake valve 26 so that the target valve lift increases with an increase in the current engine rotation speed by consulting the map in step 600.

With the above-described routine shown in FIG. 42, it is possible to obtain the above-described near-plug flow speed-engine rotation speed characteristic by utilizing a combination of the protruded portions 72 with control over the valve lift of each intake valve 26. With the method of controlling the gas flow in each cylinder according to the present embodiment, it is possible to keep the near-plug flow speed during ignition within the optimal ignition range irrespective of whether the engine rotation speed is high or low without using control over the tumble ratio itself (that is, without reducing a turbulence of in-cylinder gas, which is important for combustion). Therefore, it is possible to improve ignitability of air-fuel mixture during lean-burn operation while expanding a lean limit (improving fuel economy).

In the above-described seventh embodiment, the "gas flow control means" is implemented by the ECU 40 executing the processes of step 600 and step 502.

Incidentally, in the above-described first to fourth embodiments, each TCV 24 is used as an actuator for controlling the near-plug flow speed during ignition through control over the gas flow in the corresponding cylinder. However, control in these first to fourth embodiments is not limited to control over the tumble flow with each TCV 24, and may be, for example, control over a swirl flow (horizontal vortex flow) that is generated in each cylinder. Control over the swirl flow may be executed by, for example, using a swirl control valve (SCV) provided in the intake passage.

The method of controlling the near-plug flow speed during ignition by utilizing a tumble flow having an ω tumble flow pattern according to any one of the above-described fourth, sixth and seventh embodiments may be applied in order to implement control over the near-plug flow speed during ignition according to the above-described second embodiment.

As is assumed in the above-described third to seventh embodiments, in the case where the reversal timing of the flow direction of gas around the ignition plug 32 at the time of generating a tumble flow having an ω tumble flow pattern is later than the set range of ignition timing during lean-burn operation, strengthening the flow having an ω tumble flow pattern by increasing the degree of bias of the vortex center of the tumble flow leads to a decrease in the near-plug flow speed during ignition. In contrast, in the case where the reversal timing of the gas flow direction is earlier than the set range of ignition timing during lean-burn operation, strengthening the flow having an ω tumble flow pattern functions to increase the near-plug flow speed during ignition (however, the flow direction of gas is opposite to that in the above case). Control over the near-plug flow speed during ignition through control over the gas flow in each cylinder according to the invention may be applied to an internal combustion engine that assumes the latter case.

The relationship between the reversal timing of the gas flow direction and the ignition timing may possibly be changed by, for example, setting of the tumble ratio (control of each TCV 24, setting of a tumble port, or the like, on an actual machine). More specifically, the reversal timing may possibly be advanced by increasing the degree of bias of the vortex center of the tumble flow within the range of the tumble ratio suitable for generating a tumble flow having an ω tumble flow pattern. In such a case, the near-plug flow speed-engine rotation speed characteristics shown in FIG. 4, and the like, may be implemented by executing control for changing the reversal timing of the flow direction of gas around the ignition plug 32 at the time of generating a tumble flow having an ω tumble flow pattern on the basis of the engine rotation speed with the corresponding TCV 24, or the like. That is, in the case where the relationship between the reversal timing and the ignition timing assumes any one of the above-described two cases as well, causing the reversal timing to approach the ignition timing means reducing the near-plug flow speed during ignition (in absolute value). Therefore, in order to implement the above-described near-plug flow speed-engine rotation speed characteristic, the gas flow in each cylinder may be controlled so that the following reversal timing is obtained. The reversal timing approaches the ignition timing as the engine rotation speed increases in the first engine rotation speed region R1. However, as is already described with reference to FIG. 3, an excessively low near-plug flow speed during ignition is negative in terms of ensuring ignitability. Therefore, at the time of executing the above-described control, it is required to avoid setting of the ignition timing to the timing at which the near-plug flow speed falls outside the optimal ignition range because the near-plug flow speed is close to zero in absolute value near the reversal timing of the gas flow direction.

In the above-described first to seventh embodiments, the internal combustion engines 10, and the like, including the two intake valves 26 for each cylinder are described as an example. However, the invention may be applied to an internal combustion engine in which the number of intake valves per one cylinder is other than two as long as a pair of the intake valve and the exhaust valve are arranged with the ignition plug interposed therebetween.

What is claimed is:

1. An internal combustion engine comprising:
   at least one cylinder;
   an ignition plug configured to ignite an air-fuel mixture;
   an engine rotation speed sensor configured to detect an engine rotation speed;
   an air-fuel ratio sensor configured to detect an air-fuel ratio in the at least one cylinder;
   an temperature sensor configured to detect an in-cylinder temperature;
   an EGR valve configured to control an amount of EGR gas being introduced into the at least one cylinder;
   a tumble control valve configured to control a gas flow speed around the ignition plug; and
   an electronic control unit programmed to:
   execute a homogenous lean-burn operation of the internal combustion engine in a first operation region including a first engine rotation speed range, wherein in the first operation region, the air-fuel ratio is higher than a stoichiometric air-fuel ratio;
   execute a continuous operation of the internal combustion engine in a second operation region including a second engine rotation speed range at an air-fuel ratio lower than a target air-fuel ratio during the homogenous lean-burn operation; and
   control an opening degree of the tumble control valve such that a ratio of a change in the gas flow speed around the ignition plug during ignition to a change in the engine rotation speed in the first engine rotation speed range within the first operation region is made smaller than a ratio of a change in the gas flow speed around the ignition plug during ignition to a change in the engine rotation speed in the second engine rotation speed range within the second operation region in accordance with at least one of the air-fuel ratio in the at least one cylinder, an ignition energy supplied to the ignition plug, an EGR rate, and the in-cylinder temperature.

2. The internal combustion engine according to claim 1, wherein the electronic control unit is programmed to control the opening degree of the tumble control valve to reduce the ratio of the change in the gas flow speed around the ignition plug during ignition to the change in the engine rotation speed in the first engine rotation speed range when the air-fuel ratio in the at least one cylinder is high as compared to when the air-fuel ratio in the at least one cylinder is low.

3. The internal combustion engine according to claim 1, wherein the electronic control unit is programmed to control the opening degree of the tumble control valve to reduce the ratio of the change in the gas flow speed around the ignition plug during ignition to the change in the engine rotation speed in the first engine rotation speed range when the ignition energy supplied to the ignition plug is low as compared to when the ignition energy supplied to the ignition plug is high.

4. The internal combustion engine according to claim 1, wherein the electronic control unit is programmed to control the opening degree of the tumble control valve to reduce the ratio of the change in the gas flow speed around the ignition plug during ignition to the change in the engine rotation speed in the first engine rotation speed range when the EGR rate is high as compared to when the EGR rate is low.

5. The internal combustion engine according to claim 1, wherein the electronic control unit is programmed to control the opening degree of the tumble control valve to reduce the ratio of the change in the gas flow speed around the ignition plug during ignition to the change in the engine rotation speed in the first engine rotation speed range when the in-cylinder temperature is low as compared to when the in-cylinder temperature is high.

6. The internal combustion engine according to claim 2, wherein the electronic control unit is programmed to control the opening degree of the tumble control valve to reduce the gas flow speed around the ignition plug during ignition as the air-fuel ratio in the at least one cylinder increases.

7. The internal combustion engine according to claim 3, wherein the electronic control unit is programmed to control the opening degree of the tumble control valve to reduce the gas flow speed around the ignition plug during ignition as the ignition energy supplied to the ignition plug decreases.

8. The internal combustion engine according to claim 4, wherein the electronic control unit is programmed to control the opening degree of the tumble control valve to reduce the gas flow speed around the ignition plug during ignition as the EGR rate increases.

9. The internal combustion engine according to claim 5, wherein the electronic control unit is programmed to control the opening degree of the tumble control valve to reduce the gas flow speed around the ignition plug during ignition as the in-cylinder temperature decreases.

10. A control method for an internal combustion engine including at least one cylinder, an ignition plug configured to ignite an air-fuel mixture, an engine rotation speed sensor configured to detect an engine rotation speed, an air-fuel ratio sensor configured to detect an air-fuel ratio in the at least one cylinder, a temperature sensor configured to detect an in-cylinder temperature, an EGR valve configured to control an amount of EGR gas being introduced into the at least one cylinder, a tumble control valve configured to control a gas flow speed around the ignition plug, and an electronic control unit, the control method comprising:

executing, by the electronic control unit, a homogenous lean-burn operation of the internal combustion engine in a first operation region including a first engine rotation speed range, wherein in the first operation region, the air-fuel ratio is higher than a stoichiometric air-fuel ratio;

executing, by the electronic control unit, a continuous operation of the internal combustion engine in a second operation region including a second engine rotation speed range at an air-fuel ratio lower than a target air-fuel ratio during the homogenous lean-burn operation; and controlling, by the electronic control unit, an opening degree of the tumble control valve such that a ratio of a change in the gas flow speed around the ignition plug during ignition to a change in the engine rotation speed in the first engine rotation speed range within the first operation region is made smaller than a ratio of a change in the gas flow speed around the ignition plug during ignition to a change in the engine rotation speed in the second engine rotation speed range within the second operation region, wherein the controlling of the opening degree of the tumble control valve is based on at least one of the air-fuel ratio in the at least one cylinder, an ignition energy supplied to the ignition plug, an EGR rate, and the in-cylinder temperature.

11. An internal combustion engine comprising:

at least one cylinder;

an ignition plug configured to ignite an air-fuel mixture;

an engine rotation speed sensor configured to detect an engine rotation speed;

an air-fuel ratio sensor configured to detect an air-fuel ratio in the at least one cylinder;

an temperature sensor configured to detect an in-cylinder temperature;

an EGR valve configured to control an amount of EGR gas being introduced into the at least one cylinder;

a tumble control valve configured to control a gas flow speed around the ignition plug; and an electronic control unit programmed to:

execute a homogenous lean-burn operation of the internal combustion engine in a first operation region including a first engine rotation speed range, wherein in the first operation region, the air-fuel ratio is higher than a stoichiometric air-fuel ratio;

execute a continuous operation of the internal combustion engine in a second operation region including a second engine rotation speed range at an air-fuel ratio lower than a target air-fuel ratio during the homogenous lean-burn operation; and control an opening degree of the tumble control valve such that a ratio of a change in the gas flow speed around the ignition plug during ignition to a change in the engine rotation speed in the first engine rotation speed range within the first operation region is made smaller than a ratio of a change in the gas flow speed around the ignition plug during ignition to a change in the engine rotation speed in the second engine rotation speed range within the second operation region, wherein the control of the opening degree of the tumble control is directly based on at least one of the air-fuel ratio in the at least one cylinder, an ignition energy supplied to the ignition plug, an EGR rate, and the in-cylinder temperature.

* * * * *